United States Patent
Nakada

(10) Patent No.: US 10,630,989 B2
(45) Date of Patent: Apr. 21, 2020

(54) IMAGE PROCESSING APPARATUS AND IMAGE PROCESSING METHOD

(71) Applicant: SONY CORPORATION, Tokyo (JP)

(72) Inventor: Yu Nakada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/086,622

(22) PCT Filed: Mar. 14, 2017

(86) PCT No.: PCT/JP2017/010106
§ 371 (c)(1),
(2) Date: Sep. 20, 2018

(87) PCT Pub. No.: WO2017/169722
PCT Pub. Date: Oct. 5, 2017

(65) Prior Publication Data
US 2019/0052885 A1 Feb. 14, 2019

(30) Foreign Application Priority Data
Mar. 28, 2016 (JP) .................................. 2016-064242

(51) Int. Cl.
*H04N 19/132* (2014.01)
*H04N 19/44* (2014.01)
(Continued)

(52) U.S. Cl.
CPC ............ *H04N 19/132* (2014.11); *H04N 5/76* (2013.01); *H04N 9/8042* (2013.01);
(Continued)

(58) Field of Classification Search
CPC ................. H04N 19/46; H04N 19/587; H04N 21/234381
(Continued)

(56) References Cited

U.S. PATENT DOCUMENTS

| | | | |
|---|---|---|---|
| 2010/0238822 A1 | 9/2010 | Koyabu et al. | |
| 2012/0027086 A1 | 2/2012 | Mochizuki | |
| 2014/0354770 A1* | 12/2014 | Suh | H04N 21/4345 348/42 |

FOREIGN PATENT DOCUMENTS

| | | |
|---|---|---|
| CN | 101841708 A | 9/2010 |
| CN | 102348119 A | 2/2012 |

(Continued)

OTHER PUBLICATIONS

International Search Report and Written Opinion of PCT Application No. PCT/JP2017/010106, dated Apr. 18, 2017, 07 pages of English Translation and 07 pages of ISRWO.
International Preliminary Report on Patentability of PCT Application No. PCT/JP2017/010106, dated Oct. 11, 2018, 08 pages of English Translation and 04 pages of IPRP.

*Primary Examiner* — Dominic D Saltarelli
(74) *Attorney, Agent, or Firm* — Chip Law Group

(57) ABSTRACT

The present disclosure relates to an image processing apparatus and an image processing method that can improve performance at a time of performing special reproduction. A subsampling information determination section 204 decodes syntax per picture in a coded stream, and determines, from the decoded syntax (userdata of SEI), whether or not a picture which configures the coded stream is to be subsampled on the basis of subsampling information which is information associated with subsampling. A slice decoding section prohibits a slice from being decoded in a case in which the subsampling information determination section determines that the slice is to be subsampled. The present disclosure is applicable to, for example, an image processing apparatus that performs decoding.

14 Claims, 33 Drawing Sheets

(51) Int. Cl.
*H04N 19/587* (2014.01)
*H04N 5/76* (2006.01)
*H04N 19/46* (2014.01)
*H04N 9/804* (2006.01)
*H04N 19/174* (2014.01)
*H04N 19/70* (2014.01)

(52) U.S. Cl.
CPC ........... *H04N 19/174* (2014.11); *H04N 19/44* (2014.11); *H04N 19/46* (2014.11); *H04N 19/587* (2014.11); *H04N 19/70* (2014.11)

(58) Field of Classification Search
USPC .......................... 375/240.02, 240.21; 725/88
See application file for complete search history.

(56) References Cited

FOREIGN PATENT DOCUMENTS

| | | |
|---|---|---|
| JP | 08-098142 A | 4/1996 |
| JP | 08-98142 A | 4/1996 |
| JP | 2000-331421 A | 11/2000 |
| JP | 2006-157868 A | 6/2006 |
| JP | 2007-129489 A | 5/2007 |
| JP | 2008-016100 A | 1/2008 |
| JP | 2008-211474 A | 9/2008 |
| JP | 2010-074677 A | 4/2010 |
| JP | 2010-219983 A | 9/2010 |
| JP | 2012-050067 A | 3/2012 |

\* cited by examiner

FIG. 3

| DECODING ORDER | I | P | B | B | P | B | P | B | B | P | B | B |
|---|---|---|---|---|---|---|---|---|---|---|---|---|
| Disp. | 1 | 4 | 2 | 3 | 7 | 5 | 6 | 10 | 8 | 9 | 13 | 11 | 12 |
| Ref. | ◎ | ◎ | | | ◎ | | | ◎ | | | ◎ | | |
| SUBSAMPLING CYCLE 2 | ○ | × | × | ○ | ○ | ○ | × | × | × | ○ | ○ | ○ | × |
| 3 | ○ | ○ | × | × | ○ | × | × | ○ | × | × | ○ | × | × |
| 4 | ○ | × | × | × | × | ○ | × | × | × | ○ | ○ | × | × |
| 5 | ○ | × | × | × | × | × | ○ | × | × | × | × | ○ | × |

○ : DISPLAY   × : NOT DISPLAY

FIG. 4

| DISPLAY ORDER | I | B | B | P | B | B | P | B | B | P | B | B | P |
|---|---|---|---|---|---|---|---|---|---|---|---|---|---|
| Disp. | 1 | 2 | 3 | 4 | 5 | 6 | 7 | 8 | 9 | 10 | 11 | 12 | 13 |
| Ref. | ◎ | | | ◎ | | | ◎ | | | ◎ | | | ◎ |
| SUBSAMPLING CYCLE 2 | ○ | ✗ | ○ | ✗ | ○ | ✗ | ○ | ✗ | ○ | ✗ | ○ | ✗ | ○ |
| 3 | ○ | ✗ | ✗ | ○ | ✗ | ✗ | ○ | ✗ | ✗ | ○ | ✗ | ✗ | ○ |
| 4 | ○ | ✗ | ✗ | ✗ | ○ | ✗ | ✗ | ✗ | ○ | ✗ | ✗ | ✗ | ○ |
| 5 | ○ | ✗ | ✗ | ✗ | ✗ | ○ | ✗ | ✗ | ✗ | ○ | ✗ | ✗ | ✗ |

○: DISPLAY  ✗: NOT DISPLAY  ✗ (shaded): CAN BE SUBSAMPLED BEFORE DECODING

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/010106 filed on Mar. 14, 2017, which claims priority benefit of Japanese Patent Application No. JP 2016-064242 filed in the Japan Patent Office on Mar. 28, 2016. Each of the above-referenced applications is hereby incorporated herein by reference in its entirety.

TECHNICAL FIELD

The present disclosure relates to an image processing apparatus and an image processing method, and particularly relates to an image processing apparatus and an image processing method that improve performance at a time of performing special reproduction.

BACKGROUND ART

As video compression schemes, MPEG (Moving Picture Experts Group), H.264/MPEG-4 Part 10 (Advanced Video Coding, hereinafter referred to as "AVC"), and HEVC (High Efficiency Video Coding) have been widely used.

In a case of special reproduction such as thumbnail reproduction or N-speed fast-forward reproduction (where N is not necessarily an integer) using such a compression scheme, a subsampling process is performed by decoding AUs (Access Units) and then selecting pictures to be displayed.

Since the AUs to be subsampled are determined after reordering the AUs into a display order after decoding, it has been difficult to discriminate whether each AU is to be subsampled before decoding. Furthermore, in a case in which an AU to be decoded is the AU referred to during subsequent decoding, it is always necessary to decode the AU for preventing artifacts.

Generally, since a decoding order differs from a display order, it is difficult to confirm whether or not an AU is to be subsampled at a time of decoding; thus, by not decoding AUs that are not referred to only in a case in which this reference cycle matches a subsampling cycle, the AUs can be subsampled before decoding.

On the other hand, in a case in which the reference picture cycle differs from the subsampling cycle, it is necessary to confirm the display order and then subsample the AUs by performing certain computation after decoding syntax necessary to confirm the display order. PTL 1, for example, proposes a scheme for selecting pictures output from a decoder on the basis of a reproduction speed.

CITATION LIST

Patent Literature

[PTL 1]
JP 2006-157868A

SUMMARY

Technical Problem

As described above, in a case of performing special reproduction such as subsampling reproduction, it is required to decode unnecessary pictures, which disadvantageously causes a reduction in performance or a delay and an increase in a used amount of a memory.

The present disclosure has been made in the light of these circumstances and can improve performance at a time of performing special reproduction.

Solution to Problem

An image processing apparatus according to a first aspect of the present disclosure includes: a subsampling determination section that determines, from a coded stream, whether or not a slice which configures the coded stream is to be subsampled on the basis of subsampling information which is information associated with subsampling at a time of performing special reproduction; and a decoding section that prohibits the slice from being decoded in a case in which the subsampling determination section determines that the slice is to be subsampled.

The subsampling information is contained in userdata of the coded stream.

The subsampling information is contained in userdata of SEI (Supplemental Enhancement Information) of the coded stream.

The subsampling information is inserted into userdata at a time of generating the coded stream.

The image processing apparatus can further include: a header decoding section that decodes a slice header in slice data which configures the coded stream; and a display order confirming section that confirms a display order on the basis of time information acquired from a predetermined number of slice headers decoded by the header decoding section. The subsampling determination section can determine whether or not the slice data is to be subsampled on the basis of the display order confirmed by the display order confirming section.

An image processing method according to the first aspect of the present disclosure includes: by an image processing apparatus, determining, from a coded stream, whether or not a slice which configures the coded stream is to be subsampled on the basis of subsampling information which is information associated with subsampling at a time of performing special reproduction; and prohibiting the slice from being decoded in a case of determining that the slice is to be subsampled.

An image processing apparatus according to a second aspect of the present disclosure includes: a subsampling information generation section that generates subsampling information which is information associated with subsampling at a time of performing special reproduction; a coding section that codes image data and generates a coded stream; and an information insertion section that inserts the subsampling information generated by the subsampling information generation section into the coded stream generated by the coding section.

The information insertion section can insert the subsampling information generated by the subsampling information generation section into userdata of the coded stream.

The information insertion section can insert the subsampling information generated by the subsampling information generation section into userdata of SEI (Supplemental Enhancement Information) of the coded stream.

The subsampling information generation section can generate the subsampling information on the basis of a GOP (Group Of Picture) structure.

An image processing method according to the second aspect of the present disclosure includes: by an image processing apparatus, generating subsampling information which is information associated with subsampling at a time of performing special reproduction; coding image data and generating a coded stream; and inserting the generated subsampling information into the generated coded stream.

An image processing apparatus according to a third aspect of the present disclosure includes: a header decoding section that decodes a slice header in slice data which configures a coded stream; a display order confirming section that confirms a display order on the basis of time information acquired from a predetermined number of slice headers decoded by the header decoding section; a subsampling determination section that determines whether or not the slice data is to be subsampled at a time of performing special reproduction on the basis of the display order confirmed by the display order confirming section; and a decoding section that prohibits the slice data from being decoded in a case in which the subsampling determination section determines that the slice data is to be subsampled.

The time information is POC (Picture Order Count) information.

An image processing method according to the third aspect of the present disclosure includes: by an image processing apparatus, decoding a slice header in slice data which configures a coded stream; confirming a display order on the basis of time information acquired from a predetermined number of decoded slice headers; determining whether or not the slice data is to be subsampled at a time of performing special reproduction on the basis of the confirmed display order; and prohibiting the slice data from being decoded in a case of determining that the slice data is to be subsampled.

In the first aspect of the present disclosure, it is determined, from a coded stream, whether or not a slice which configures the coded stream is to be subsampled on the basis of subsampling information which is information associated with subsampling at a time of performing special reproduction. In addition, in a case of determining that the slice is to be subsampled, the slice is prohibited from being decoded.

In the second aspect of the present disclosure, subsampling information which is information associated with subsampling at a time of performing special reproduction is generated, image data is coded, and a coded stream is generated. In addition, the generated subsampling information is inserted into the generated coded stream.

In the third aspect of the present disclosure, a slice header in slice data which configures a coded stream is decoded, a display order is confirmed on the basis of time information acquired from a predetermined number of decoded slice headers, and it is determined whether or not the slice data is to be subsampled at a time of performing special reproduction on the basis of the confirmed display order. In addition, the slice data is prohibited from being decoded in a case in which it is determined that the slice data is to be subsampled.

Advantageous Effect of Invention

According to the present disclosure, it is possible to improve performance at a time of performing special reproduction.

It is noted that effects are not always limited to those described here but may be any of effects described in the present disclosure.

BRIEF DESCRIPTION OF DRAWINGS

FIG. 3 illustrates whether it is necessary to display pictures in a decoding order at subsampling cycles of 2 to 5.

FIG. 4 illustrates whether it is necessary to display pictures in a display order at subsampling cycles of 2 to 5.

DESCRIPTION OF EMBODIMENTS

Modes for carrying out the present disclosure (hereinafter, referred to as "embodiments") will be described hereinafter. It is noted that description will be given in the following order.

1. First Embodiment (Image Processing System)
2. Second Embodiment (Decoding Device)
3. Third Embodiment (Multiview Image Coding/Decoding System)
4. Fourth Embodiment (Hierarchical Image Coding/Decoding System)
5. Fifth Embodiment (Computer)
6. Sixth Embodiment (Application Examples)
7. Seventh Embodiment (Other Examples)

1. First Embodiment (Image Processing System)

Figure 1:
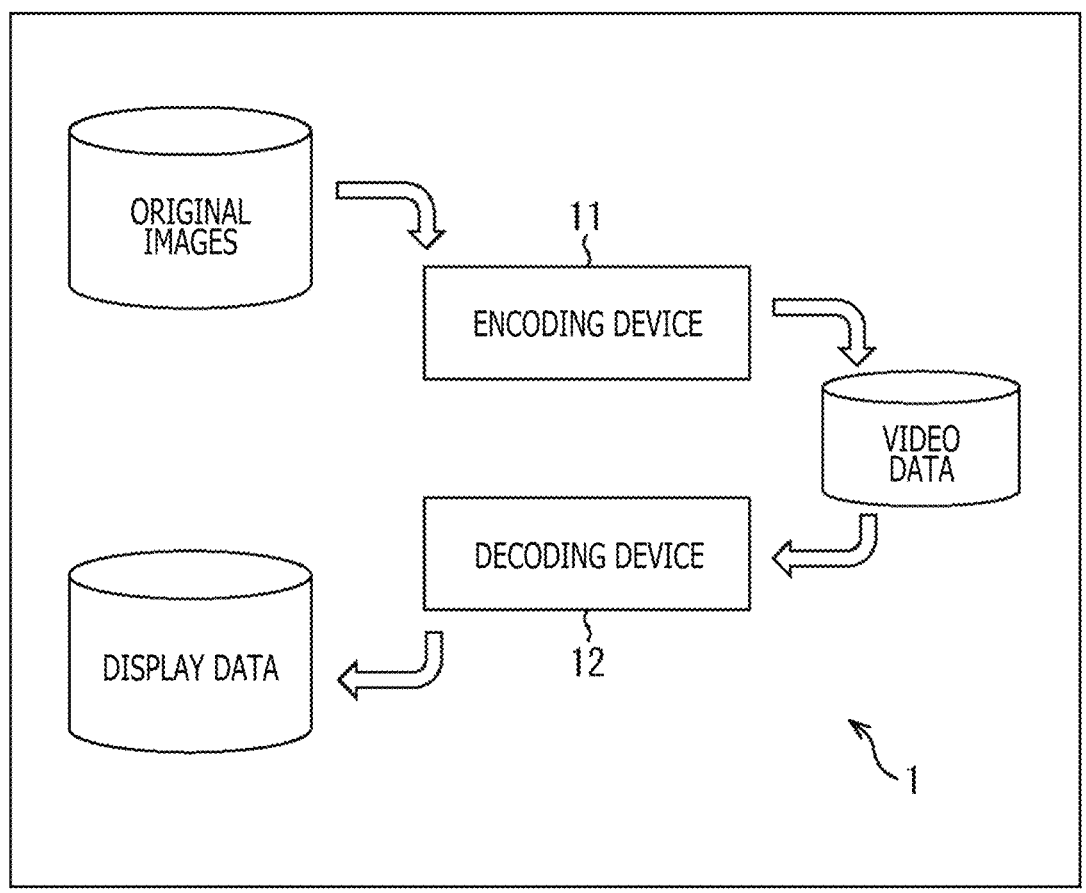
FIG. 1 illustrates an example of a configuration of an image processing system to which the present technique is applied.

FIG. 1 illustrates an example of a configuration of an image processing system according to the present technique.

In a case of performing special reproduction such as thumbnail reproduction or N-speed fast-forward reproduction (where N is not necessarily an integer), an image processing system 1 in the example of FIG. 1 performs a subsampling process for subsampling AUs (Access Units) by decoding the AUs and then selecting pictures to be displayed. The image processing system 1 determines whether each AU is necessary to decode during the subsampling process and decodes the AU in response to a determination result.

The image processing system 1 includes an encoding device 11 and a decoding device 12. The image processing system 1 employs, for example, as a coding scheme, MPEG (Moving Picture Experts Group), H.264/MPEG-4 Part 10 (Advanced Video Coding, hereinafter referred to as "AVC"), or HEVC (High Efficiency Video Coding).

The encoding device 11 captures an original images. The encoding device 11 codes the captured original images and generate video data. At that time, the encoding device 11 inserts subsampling availability information that indicates whether decoding is necessary during subsampling reproduction into userdata as needed. In a case of HEVC as the coding scheme, in particular, the subsampling availability information is inserted into userdata in SEI (Supplemental Enhancement Information).

The decoding device 12 receives the video data coded by the encoding device 11. The decoding device 12 reads the subsampling availability information from the input video data during the subsampling reproduction, decodes the video data on the basis of the subsampling availability information, and generates display data.

(Outline of Present Technique)

Figure 2:
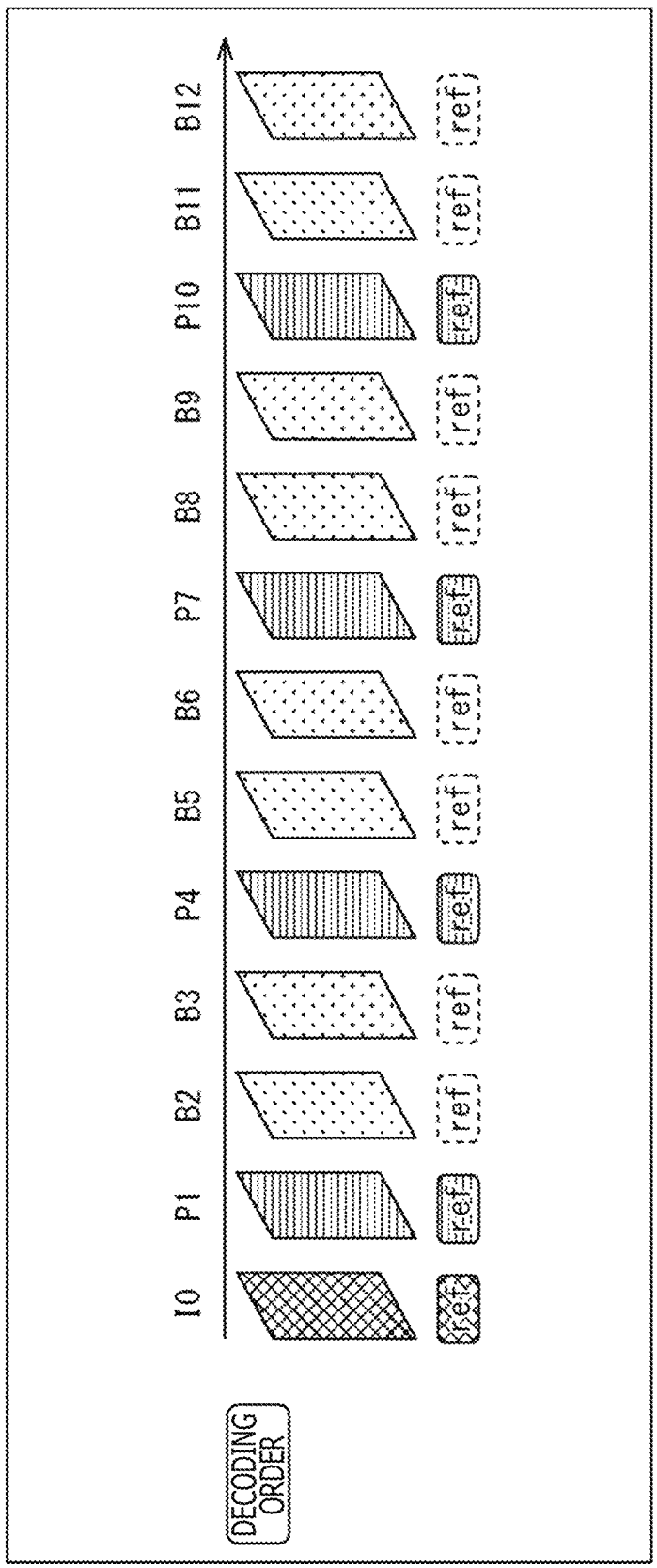
FIG. 2 illustrates an example of video data aligned in a decoding order.

FIG. 2 illustrates an example of video data aligned in a decoding order.

First, as illustrated in FIG. 2, an example of video data in the decoding order such as I, P, B, B, P, B, B, . . . at a reference picture cycle of 3 and necessary to reorder before display will be described.

An ordinary decoding device can grasp whether or not each picture (slice) is to be subsampled by adding a subsampling cycle after finishing decoding pictures and reordering the pictures into a display order.

FIGS. 3 and 4 illustrate whether it is necessary to display pictures in the example of FIG. 2 in a case of subsampling cycles of 2 to 5. FIG. 3 illustrates an example in a decoding order, and FIG. 4 illustrates an example in a display order. In the examples of FIGS. 3 and 4, a number in Disp. indicates a turn in the display order and a circle in Ref. indicates that the picture is a reference picture. Furthermore, in the subsampling cycles 2 to 4, a circle indicates a picture that is displayed and a cross indicates a picture (AU) that is not displayed. Moreover, in the example of the display order of FIG. 4, a hatched cross indicates a picture (AU) that can be subsampled before decoding.

As illustrated in FIG. 3, the subsampling cycle has no regularity in the decoding order, and it is difficult to discriminate whether or not each picture is to be subsampled at this time. On the other hand, as illustrated in FIG. 4, it is easy to determine whether or not each picture is to be subsampled if the pictures are reordered into the display order. However, at this point, decoding of all AUs is finished and, as a result, even the AUs unnecessary to decode are decoded.

In the example of FIG. 4, the AUs with crosses are to be subsampled, among which the AUs with hatched crosses are not referred to and not to be displayed; thus, it can be understood that the AUs with hatched crosses are unnecessary to decode.

Using the present technique, by contrast, makes it possible to determine whether each AU is necessary to decode before decoding and to decode only the AUs necessary to decode.

Specifically, the N-bit subsampling availability information that indicates whether decoding is necessary during subsampling reproduction is added to userdata at a time of coding the video data. By doing so, in a case of reproduction with subsampling at intervals of n (at a subsampling cycle of n), it is possible to grasp whether each AU is necessary to decode simply by referring to the subsampling availability information of bit (n−1). It is noted that this information may be 16 bits if used for the subsampling reproduction.

Figure 5:
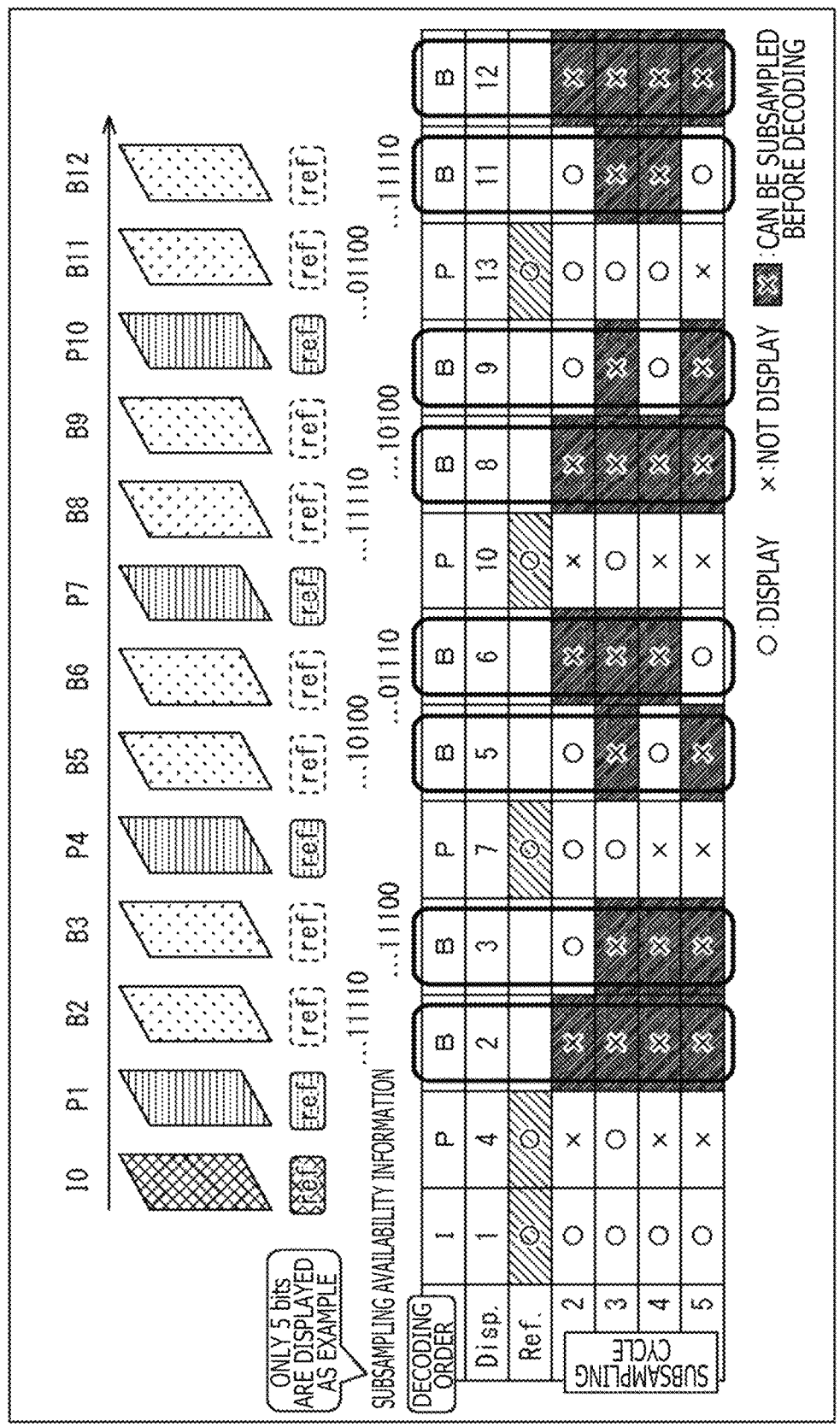
FIG. 5 illustrates an example of paying attention to LSB-justified five bits in subsampling availability information.

FIG. 5 illustrates an example of paying attention to LSB-justified five bits among 16 bits of the subsampling availability information in a case of the subsampling cycles n of 2, 3, 4, and 5. In this case, the subsampling availability information associated with, for example, B2 is " . . . 11110" and bits 1, 2, 3, and 4 are turned to 1; thus, it can be understood that the picture B2 is unnecessary to decode in a case of reproduction with subsampling at intervals of 2, 3, 4, and 5.

Furthermore, the subsampling availability information associated with, for example, B9, is " . . . 10100" and only bits 2 and 4 are turned to 1; thus, it can be understood that the picture B9 is unnecessary to decode at a time of subsampling at intervals of 3 and 5.

For the sake of understanding, B pictures are described as pictures to be subsampled by way of example; however, only the B pictures are not always to be subsampled but the present technique is also applicable to P pictures that are not referred to.

(Example of Configuration of Encoding Device)

Figure 6:
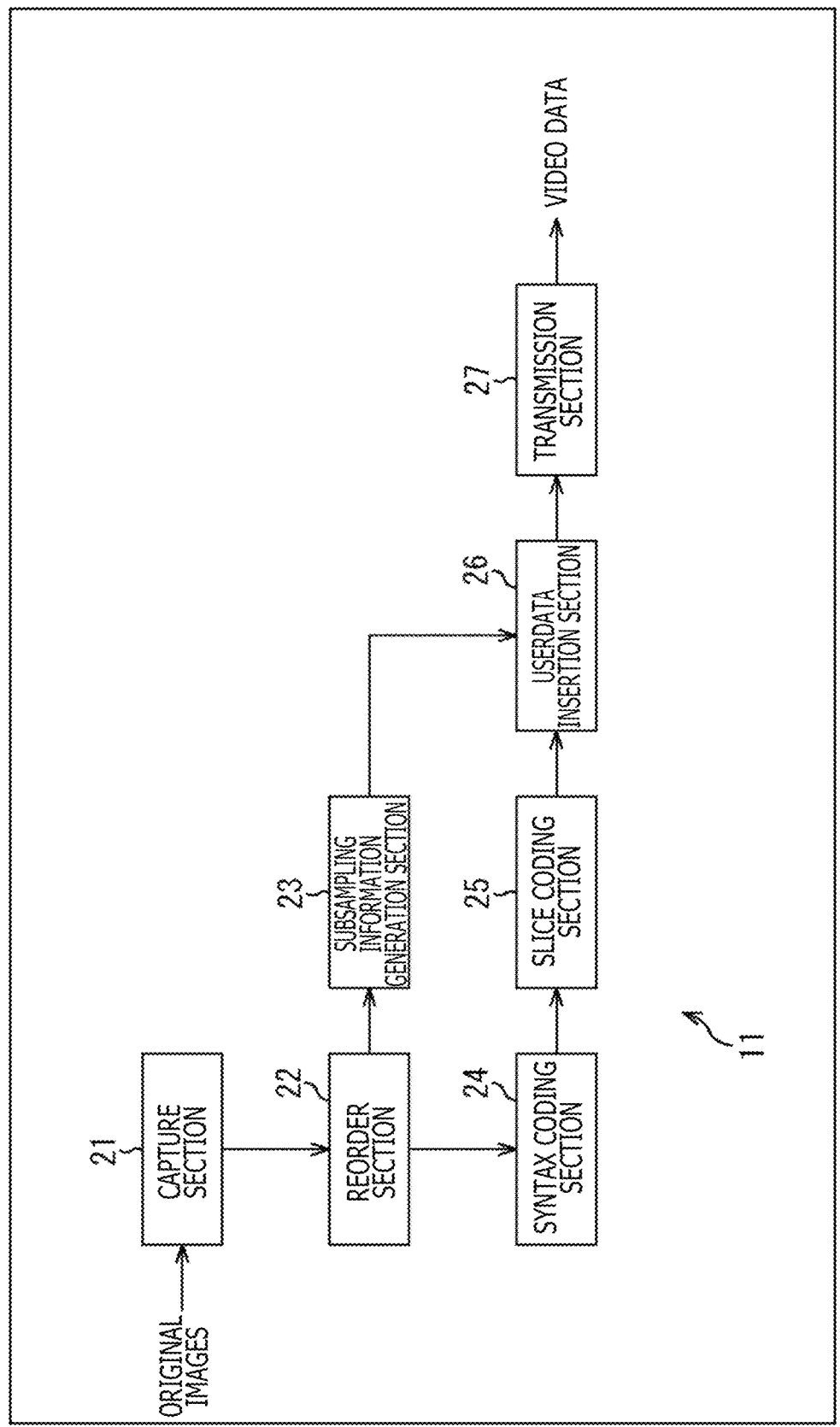
FIG. 6 is a block diagram illustrating an example of a configuration of an encoding device.

FIG. 6 is a block diagram illustrating an example of a configuration of the encoding device of FIG. 1. In the example of FIG. 6, the present technique will be described while taking a case of applying the present technique to HEVC (High Efficiency Video Coding)-compliant image coding/decoding by way of example.

The encoding device 11 includes a capture section 21, a reorder section 22, a subsampling information generation section 23, a syntax coding section 24, a slice coding section 25, a userdata insertion section 26, and a transmission section 27.

The capture section 21 captures original images and outputs the captured original images to the reorder section 22. The reorder section 22 reorders the images in response to an M-value. In other words, the reorder section 22 reorders the images in frames in a display order into an order for coding in response to the M-value. The reorder section 22 outputs the reordered original images and reorder information to the syntax coding section 24. The reorder section 22 also supplies the reorder information to the subsampling information generation section 23.

The subsampling information generation section 23 generates subsampling availability information (hereinafter, also simply referred to as "subsampling information") on the basis of a reference relation confirmed by reordering. In other words, the subsampling information generation section 23 generates userdata containing the subsampling availability information and supplies the userdata containing the subsampling availability information to the userdata insertion section 26.

The syntax coding section 24 codes higher-level syntax, for example, an SPS (Sequence Parameter Set), a PPS (Picture Parameter Set), and an SEI, and outputs the coded higher-level syntax as well as the original images to the slice coding section 25. The slice coding section 25 codes slice data regarding the original images in conformance with, for example, HEVC. The slice coding section 25 generates a coded stream configured with the coded higher-level syntax and the coded slice data and outputs the coded stream to the userdata insertion section 26.

The userdata insertion section 26 inserts the userdata containing the subsampling availability information into the SEI out of the coded higher-level syntax in the coded stream, and then outputs video data configured with the coded higher-level syntax and the coded slice data (coded stream) to the transmission section 27. The transmission section 27 transmits the video data to the decoding device 12.

(Description of Coding Unit)

Figure 7:
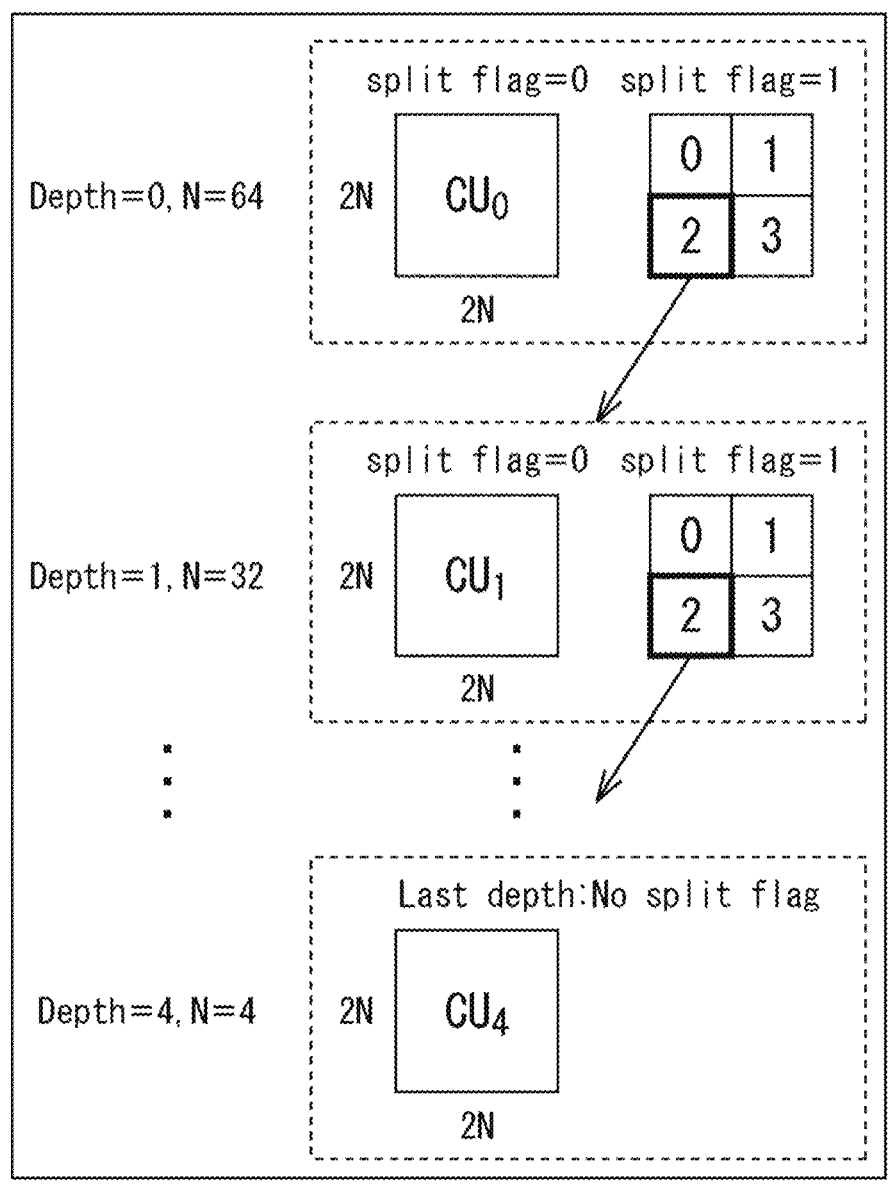
FIG. 7 is an illustrative diagram of an example of a configuration of a coding unit.

FIG. 7 is an illustrative diagram of a Coding UNIT (CU) that is a coding unit in the HEVC scheme.

Since the HEVC scheme is targeted at large-frame images such as UHD (Ultra High Definition) images at 4000 pixels× 2000 pixels, it is not optimum to fix a size of the coding unit to 16 pixels×16 pixels. Therefore, the HEVC scheme defines the CU as the coding unit.

The CU plays a similar role to a macroblock in the AVC scheme. Specifically, the CU is split into PUs or into TUs.

It is noted, however, that the size of the CU is a square represented by a power of two variable per sequence. Specifically, the CU is set by splitting an LCU that is a CU of a largest size into two in a horizontal direction and a vertical direction by an arbitrary number of times in such a manner that the LCU is not smaller than an SCU (Smallest Coding Unit) that is a CU at a smallest size. In other words, it is the size of the CU that is a size of an arbitrary hierarchy when the LCU is hierarchized so that a higher hierarchical size becomes a quarter of the size of a lower hierarchy until the LCU is equal to the SCU.

In FIG. 7, for example, the size of the LCU is 128 and the size of the SCU is 8. Therefore, the LCU has hierarchical depths (Depths) of 0 to 4, and the number of hierarchical depths is five. In other words, the number of splits corresponding to the CU is any of 0 to 4.

It is noted that information for assigning the sizes of the LCU and the SCU is contained in the SPS. Moreover, the number of splits corresponding to the CU is assigned by split_flag that represents whether to further split the CU in each hierarchy.

A size of the TU can be assigned using split_transform_flag similarly to split_flag for the CU. Maximum numbers of splits of the TU during inter prediction and that during intra prediction are assigned as max_transform_hierarchy_depth_inter and max_transform_hierarchy_depth_intra by the SPS, respectively.

Moreover, it is defined in the present specification that a CTU (Coding Tree Unit) is a unit that contains CTBs (Coding Tree Blocks) configured with LCUs and parameters used when the CTB is processed on a LCU-by-LCU basis (level). Furthermore, it is defined that each CU configuring the CTU is a unit that contains CBs (Coding Blocks) and parameters used when the CB is processed on a CU-by-CU basis (level).

(Mode Selection)

Meanwhile, it is important to select an appropriate prediction mode for achieving higher coding efficiency under the AVC and HEVC coding schemes.

Examples of a selection method include a method implemented in reference software called JM (Joint Model) for H.264/MPEG-4 AVC (released at http://iphome.hhi.de/suehring/tml/index.htm).

The JM can select one of two mode determination methods that are High Complexity Mode and Low Complexity Mode to be described below. In any of the mode determination methods, cost function values related to respective prediction modes are calculated and the prediction mode having a smallest cost function value is selected as an optimum mode for the blocks or macroblocks.

A cost function in High Complexity Mode is represented by the following Equation (1).

$$\text{Cost}(\text{Mode}\epsilon\Omega)=D+\lambda*R \quad (1)$$

Here, $\Omega$ denotes a universal set of candidate modes for coding blocks or macroblocks, and D denotes difference energy between a decoded image and an input image in a case of coding in a prediction mode of interest. $\lambda$ denotes Lagrange multipliers given as a function of quantization parameters. R denotes a total code amount including orthogonal transform coefficients in a case of coding in the mode.

In other words, to perform coding in High Complexity Mode, it is necessary to perform a temporary encoding process to compute the parameters D and R in all candidate modes once, which requires a larger amount of computation.

A cost function in Low Complexity Mode is represented by the following Equation (2).

$$\text{Cost}(\text{Mode}\epsilon\Omega)=D+QP2\text{Quant}(QP)*\text{HeaderBit} \quad (2)$$

Here, D denotes difference energy between a predicted image and an input image unlike D in the case of High Complexity Mode. QP2Quant (QP) is given as a function of quantization parameters QP, and HeaderBit denotes a code amount, which does not include the orthogonal transform coefficients and which is related to information belonging to Header such as motion vectors and modes.

In other words, in Low Complexity Mode, it is necessary to perform a prediction process in relation to each candidate mode but unnecessary to perform up to a coding process since a decoded image is not required. Owing to this, Low Complexity Mode can realize mode selection with a lower amount of computation than that of High Complexity Mode.

(Example of Configuration of Slice Coding Section)

Figure 8:
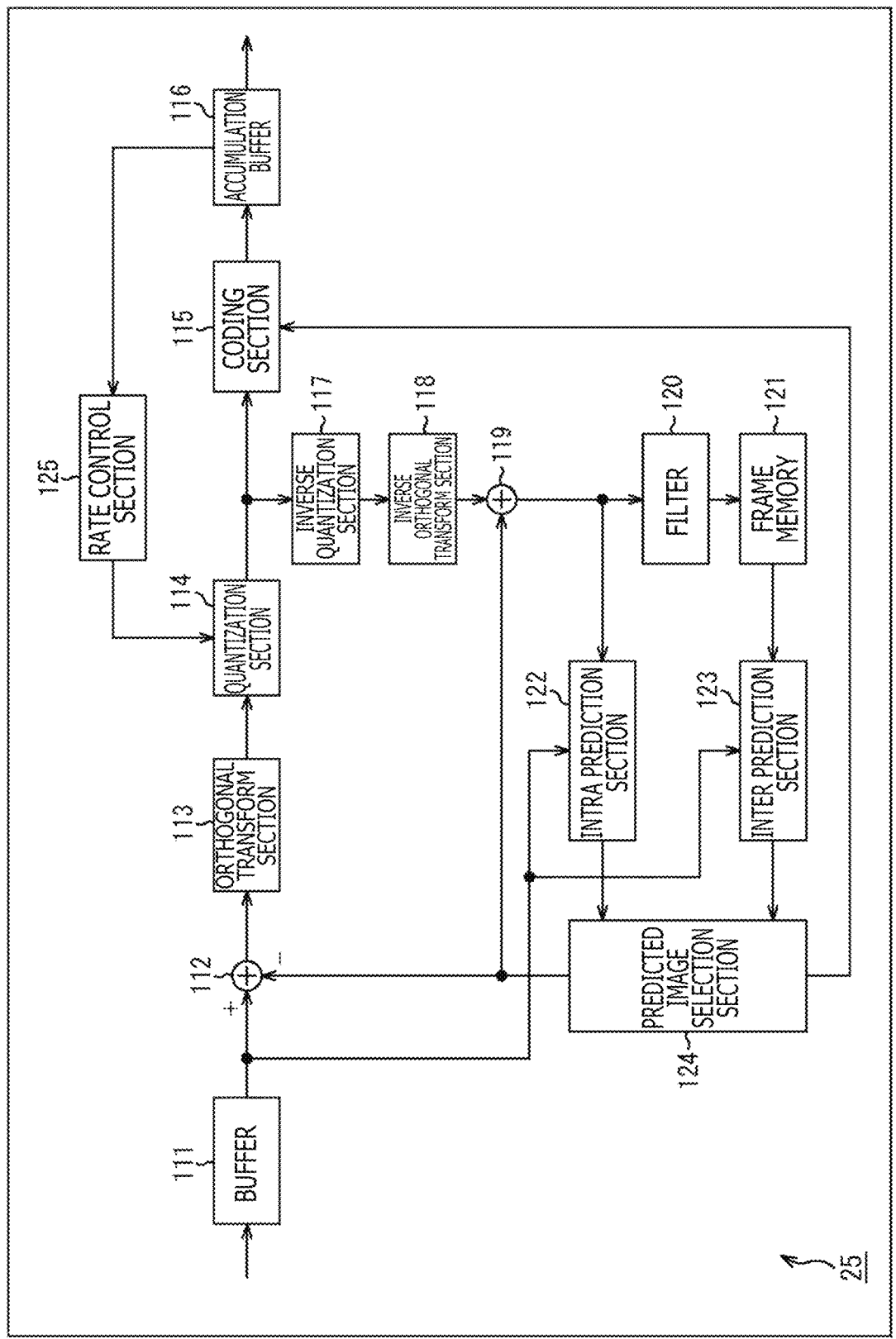
FIG. 8 is a block diagram illustrating an example of a configuration of a slice coding section.

FIG. 8 is a block diagram illustrating an example of a configuration of the slice coding section 25.

The slice coding section 25 of FIG. 8 has a buffer 111, a computing section 112, an orthogonal transform section 113, a quantization section 114, a coding section 115, an accumulation buffer 116, an inverse quantization section 117, an inverse orthogonal transform section 118, and an addition section 119. The slice coding section 25 has also a filter 120, a frame memory 121, an intra prediction section 122, an inter prediction section 123, a predicted image selection section 124, and a rate control section 125.

Images in units of frames input as the object to be coded are subjected to A/D conversion by the A/D conversion section, which is not depicted, and images that are digital signals after conversion are output to the buffer 111.

The buffer 111 temporarily stores the images in units of frames and supplies the images to the computing section 112, the intra prediction section 122, and the inter prediction section 123.

The computing section 112 codes the images by subtracting predicted images supplied from the predicted image selection section 124 from the images supplied from the buffer 111. The computing section 112 outputs resultant images to the orthogonal transform section 113 as residual information (difference). It is noted that in a case in which no predicted images are supplied from the predicted image selection section 124, the computing section 112 outputs the images read from the buffer 111 as they are to the orthogonal transform section 113 as the residual information.

The orthogonal transform section 113 performs an orthogonal transform process on the residual information from the computing section 112 in units of TUs. The orthogonal transform section 113 supplies an orthogonal transform result after the orthogonal transform process to the quantization section 114.

The quantization section 114 quantizes the orthogonal transform process result supplied from the orthogonal transform section 113. The quantization section 114 supplies a quantization value obtained as a result of quantization to the coding section 115.

The coding section 115 acquires information that indicates an optimum intra prediction mode (hereinafter, referred to as "intra prediction mode information") from the intra prediction section 122. The coding section 115 also acquires information that indicates an optimum inter prediction mode (hereinafter, referred to as "inter prediction mode information"), information that identifies motion vectors and reference images, and the like from the inter prediction section 123. The coding section 115 further acquires offset filter information associated with an offset filter from the filter 120.

The coding section 115 performs lossless coding such as variable-length coding or arithmetic coding on the quantization value supplied from the quantization section 114.

Moreover, the coding section 115 performs lossless coding on the intra prediction mode information, the inter prediction mode information, the motion vectors, the information that identifies the reference images, the offset filter information, and the like as coding information associated with coding. The coding section 115 supplies the coding information and quantization value which have been subjected to the lossless coding to the accumulation buffer 116 to be stored therein as coded data.

It is noted that the coding information having been subjected to the lossless coding may serve as header information (for example, a slice header) associated with the losslessly coded quantization value.

The accumulation buffer 116 temporarily stores the coded data supplied from the coding section 115. The accumulation buffer 116 also supplies the stored coded data to the userdata insertion section 26 of FIG. 6 as the coded stream.

The quantization value output from the quantization section 114 is also input to the inverse quantization section 117. The inverse quantization section 117 inversely quantizes the quantization value. The inverse quantization section 117 supplies an orthogonal transform process result obtained as a result of inverse quantization to the inverse orthogonal transform section 118.

The inverse orthogonal transform section 118 performs an inverse orthogonal transform process on the orthogonal transform process result supplied from the inverse quantization section 117 in units of TUs. Examples of an inverse orthogonal transform scheme include an IDCT (inverse discrete cosine transform) and an IDST (inverse discrete sine transform). The inverse orthogonal transform section 118 supplies residual information obtained as a result of the inverse orthogonal transform process to the addition section 119.

The addition section 119 adds up the residual information supplied from the inverse orthogonal transform section 118 and the predicted images supplied from the predicted image selection section 124 and decodes the residual information and the predicted images. The addition section 119 supplies the decoded images to the intra prediction section 122 and the filter 120.

The filter 120 performs a filter process on the decoded images supplied from the addition section 119. Specifically, the filter 120 performs in sequence a deblocking filter process and a sample adaptive offset filter (SAO (Sample adaptive offset)) process on the decoded images. The filter 120 supplies filter-processed, coded pictures to the frame memory 121. The filter 120 also supplies information that indicates a type of the performed sample adaptive offset filter process and offset to the coding section 115 as offset filter information.

The frame memory 121 accumulates the images supplied from the filter 120. On the other hand, the images that are accumulated in the frame memory 121 and that have been subjected to the filter processes are output to the inter prediction section 123 as reference images.

The intra prediction section 122 performs an intra prediction process using peripheral images from the addition section 119 in units of PUs in all intra prediction mode candidates. The intra prediction section 122 decides an intra prediction mode having the smallest cost function value as an optimum intra prediction mode.

The intra prediction section 122 then supplies predicted images generated in the optimum intra prediction mode and the corresponding cost function value to the predicted image selection section 124. In a case of being notified by the predicted image selection section 124 to select predicted images generated in the optimum intra prediction mode, the intra prediction section 122 supplies the intra prediction mode information to the coding section 115. It is noted that the intra prediction mode is a mode that represents a PU size, a prediction direction, and the like.

The inter prediction section 123 performs motion prediction/compensation processes in inter prediction modes. Specifically, the inter prediction section 123 detects motion vectors in units of PUs in the inter prediction modes on the basis of the images supplied from the buffer 111 and the reference images read from the frame memory 121. In addition, the inter prediction section 123 performs the compensation process on the reference images in units of PUs on the basis of the motion vectors, thereby generating predicted images.

At this time, the inter prediction section 123 calculates the cost function values for all the inter prediction modes on the basis of the images supplied from the buffer 111 and the predicted images, and decides the inter prediction mode having the smallest cost function value as an optimum inter prediction mode. The inter prediction section 123 then supplies the cost function value of the optimum inter prediction mode and the corresponding predicted images to the predicted image selection section 124. In addition, in a case of being notified by the predicted image selection section 124 to select the predicted images generated in the optimum inter prediction mode, the inter prediction section 123 also outputs the inter prediction mode information, the corresponding motion vectors, information that identifies the reference images, and the like to the coding section 115. It is noted that the inter prediction mode is a mode that represents the PU size and the like.

The predicted image selection section 124 decides the optimum intra prediction mode or the optimum inter prediction mode having the smaller corresponding cost function value as an optimum prediction mode on the basis of the cost function values supplied from the intra prediction section 122 and the inter prediction section 123. The predicted image selection section 124 supplies the predicted images in the optimum prediction mode to the computing section 112 and the addition section 119. The predicted image selection section 124 also notifies the intra prediction section 122 or the inter prediction section 123 to select the predicted images in the optimum prediction mode.

The rate control section 125 controls a rate of a quantization operation performed by the quantization section 114 on the basis of the coded data accumulated in the accumulation buffer 116 so that overflow or underflow does not occur.

(Operation Performed by Encoding Device)

The coding process performed by the encoding device 11 will next be described with reference to a flowchart of FIG. 9.

In Step S11, the capture section 21 captures original images from a previous stage which is not depicted. The capture section 21 outputs the captured images to the reorder section 22. In Step S12, the reorder section 22 reorders the original images in response to the M-value and outputs the reordered original images and the reorder information to the syntax coding section 24. The reorder section 22 also supplies the reorder information to the subsampling information generation section 23.

In Step S13, the subsampling information generation section 23 generates the userdata containing the subsampling availability information on the basis of the reference relation confirmed by reordering. The subsampling information generation section 23 supplies the generated userdata containing the subsampling availability information to the userdata insertion section 26.

In Step S14, the syntax coding section 24 codes the higher-level syntax, for example, the SPS (Sequence Parameter Set), the PPS (Picture Parameter Set), and the SEI, and outputs the coded higher-level syntax as well as the original images to the slice coding section 25.

In Step S15, the slice coding section 25 codes the slice data regarding the original images in conformance with, for example, HEVC and generates the coded stream. It is noted that details of this slice data coding process will be described later with reference to FIG. 10. Since the slice data is coded by Step S15, the slice coding section 25 outputs the coded higher-level syntax and the coded slice data (coded stream) to the userdata insertion section 26.

In Step S16, the userdata insertion section 26 inserts the userdata containing the subsampling availability information into the SEI out of the coded higher-level syntax. The userdata insertion section 26 then outputs the coded higher-level syntax and the coded slice data to the transmission section 27 as the video data. The transmission section 27 transmits the video data to the decoding device 12.

Figure 9:
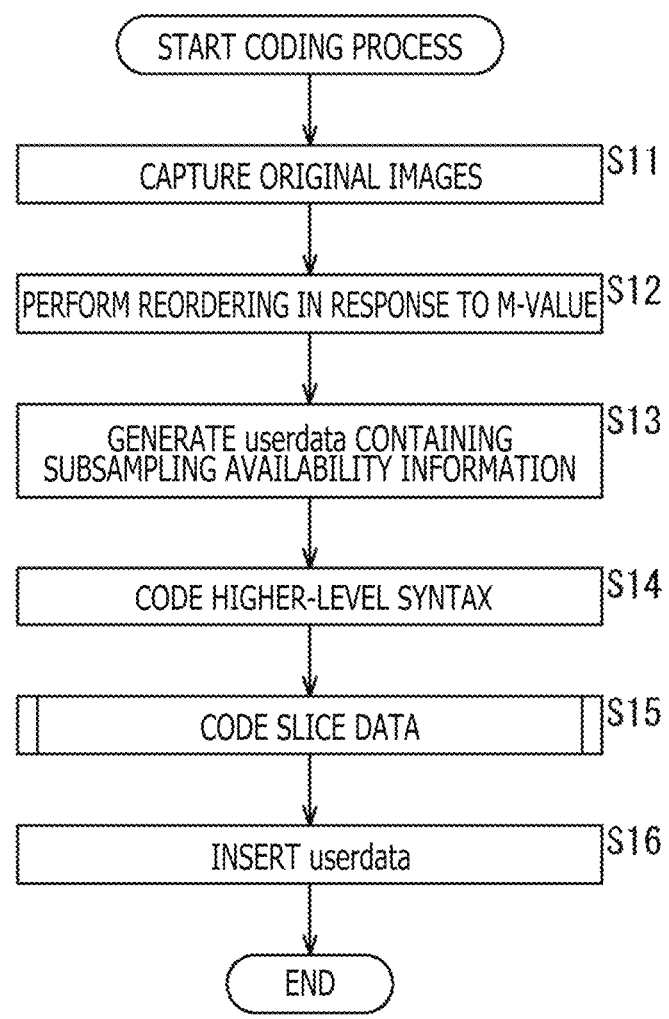
FIG. 9 is a flowchart describing a coding process by the encoding device of FIG. 6.

While the subsampling availability information is generated in Step S13 and the userdata is inserted in Step S16 in the example of FIG. 9, generation of the subsampling availability information and insertion of the userdata may be executed at any timing once the reference relation is confirmed by reordering. Since an insertion process does not depend on a bit generation amount by coding, the insertion process can be executed at any timing.

Figure 10:
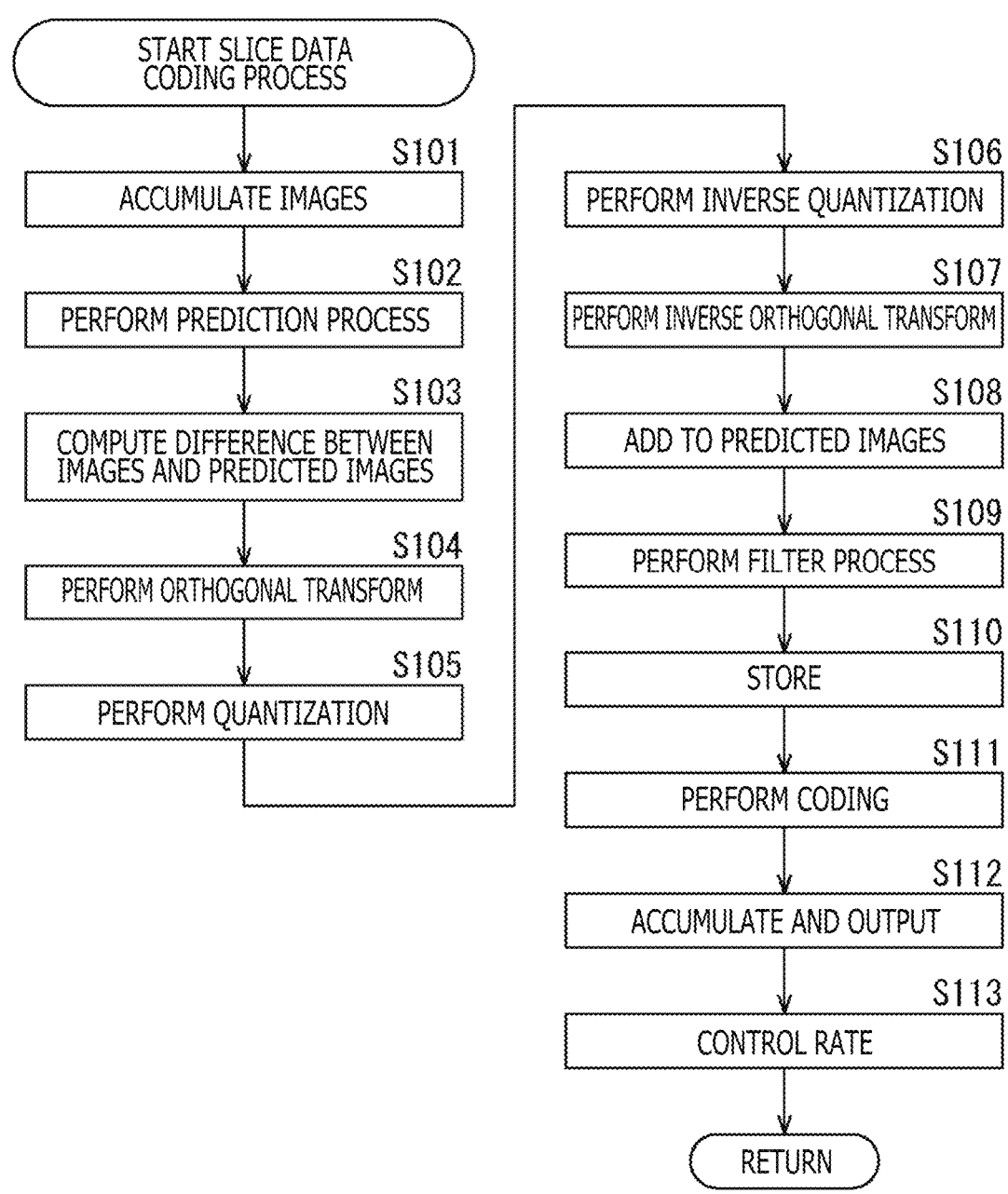
FIG. 10 is a flowchart describing a slice data coding process in Step S15 of FIG. 9.

A slice data coding process in Step S15 of FIG. 9 will next be described with reference to a flowchart of FIG. 10.

The images in units of frames input as the object to be coded are subjected to the A/D conversion by the A/D conversion section, which is not depicted, and the images that are digital signals after conversion are output to the buffer 111.

In Step S101, the buffer 111 temporarily stores the images in units of frames and supplies the images to the computing section 112, the intra prediction section 122, and the inter prediction section 123.

In Step S102, the intra prediction section 122 and the inter prediction section 123 each perform a prediction process. In other words, the intra prediction section 122 performs the intra prediction process in units of PUs in all the intra prediction modes. In other words, the intra prediction section 122 calculates cost function values for all the intra prediction modes on the basis of the images from the computing section 119 and the predicted images generated as a result of the intra prediction process. In addition, the intra prediction section 122 decides the intra prediction mode having the smallest cost function value as the optimum intra prediction mode. The intra prediction section 122 supplies the predicted images generated in the optimum intra prediction mode and the corresponding cost function value to the predicted image selection section 124.

The inter prediction section 123 performs the motion prediction/compensation processes in units of PUs in all the inter prediction modes. Furthermore, the inter prediction section 123 calculates the cost function values for all the inter prediction modes on the basis of the images supplied from the buffer 111 and the predicted images, and decides the inter prediction mode having the smallest cost function value as the optimum inter prediction mode. The inter prediction section 123 then supplies the cost function value of the optimum inter prediction mode and the corresponding predicted images to the predicted image selection section 124.

The predicted image selection section 124 decides the optimum intra prediction mode or the optimum inter prediction mode having the smaller cost function value as the optimum prediction mode on the basis of the cost function values supplied from the intra prediction section 122 and the inter prediction section 123. The predicted image selection section 124 supplies the predicted images in the optimum prediction mode to the computing section 112 and the addition section 119.

In a case of determining that the optimum prediction mode is the optimum inter prediction mode, the predicted image selection section 124 notifies the inter prediction section 123 to select the predicted images generated in the optimum inter prediction mode. The inter prediction section 123 then supplies the inter prediction mode information, the motion vectors, and the information that identifies the reference images to the coding section 115. On the other hand, in a case of determining that the optimum prediction mode is not the optimum inter prediction mode, that is, the optimum prediction mode is the optimum intra prediction mode, the predicted image selection section 124 notifies the intra prediction section 122 to select the predicted images generated in the optimum intra prediction mode. The intra prediction section 122 then supplies the intra prediction mode information to the coding section 115.

In Step S103, the computing section 112 codes the images by subtracting the predicted images supplied from the predicted image selection section 124 from the images supplied from the buffer 111. The computing section 112 outputs the resultant images to the orthogonal transform section 113 as the residual information.

In Step S104, the orthogonal transform section 113 performs the orthogonal transform process on the residual information in units of TUs. The orthogonal transform section 113 supplies the orthogonal transform result after the orthogonal transform process to the quantization section 114.

In Step S105, the quantization section 114 quantizes the orthogonal transform process result supplied from the orthogonal transform section 113. The quantization section 114 supplies the quantization value obtained as a result of quantization to the coding section 115 and the inverse quantization section 117.

In Step S106, the inverse quantization section 117 inversely quantizes the quantization value from the quantization section 114. The inverse quantization section 117 supplies the orthogonal transform process result obtained as a result of inverse quantization to the inverse orthogonal transform section 118.

In Step S107, the inverse orthogonal transform section 118 performs the inverse orthogonal transform process on the orthogonal transform process result supplied from the inverse quantization section 117 in units of TUs. The inverse orthogonal transform section 118 supplies the residual information obtained as a result of the inverse orthogonal transform process to the addition section 119.

In Step S108, the addition section 119 adds up the residual information supplied from the inverse orthogonal transform section 118 and the predicted images supplied from the predicted image selection section 124 and decodes the residual information and the predicted images. The addition section 119 supplies the decoded images to the filter 120 and the intra prediction section 122.

In Step S109, the filter 120 performs a deblocking filter process on the decoded images supplied from the addition section 119.

In Step S110, the filter 120 performs the sample offset filter process on the decoded images after the deblocking filter process. The filter 120 supplies resultant images to the frame memory 121. Furthermore, the filter 120 supplies the offset filter information to the coding section 115 for every LCU.

The frame memory 121 accumulates the images supplied from the filter 120. The images that are accumulated in the frame memory 121 and that have been subjected to the filter processes are output to the inter prediction section 123 as the reference images.

In Step S111, the coding section 115 performs coding. In other words, the coding section 115 codes the quantization value supplied from the quantization section 114 and generates the coded data. It is noted that the coding section 115 also codes, as the coding information, the intra prediction mode information or the inter prediction mode information, the motion vectors, the information that identifies the reference images, the offset filter information, and the like.

In Step S112, the accumulation buffer 116 temporarily accumulates the coded data supplied from the coding section 115. The accumulation buffer 116 also supplies the stored coded data to the userdata insertion section 26 of FIG. 6 as the coded stream.

In Step S113, the rate control section 125 controls the rate of the quantization operation performed by the quantization section 114 on the basis of the coded data accumulated in the accumulation buffer 116 so that overflow or underflow does not occur.

(Example of Configuration of Encoding Device)

Figure 11:
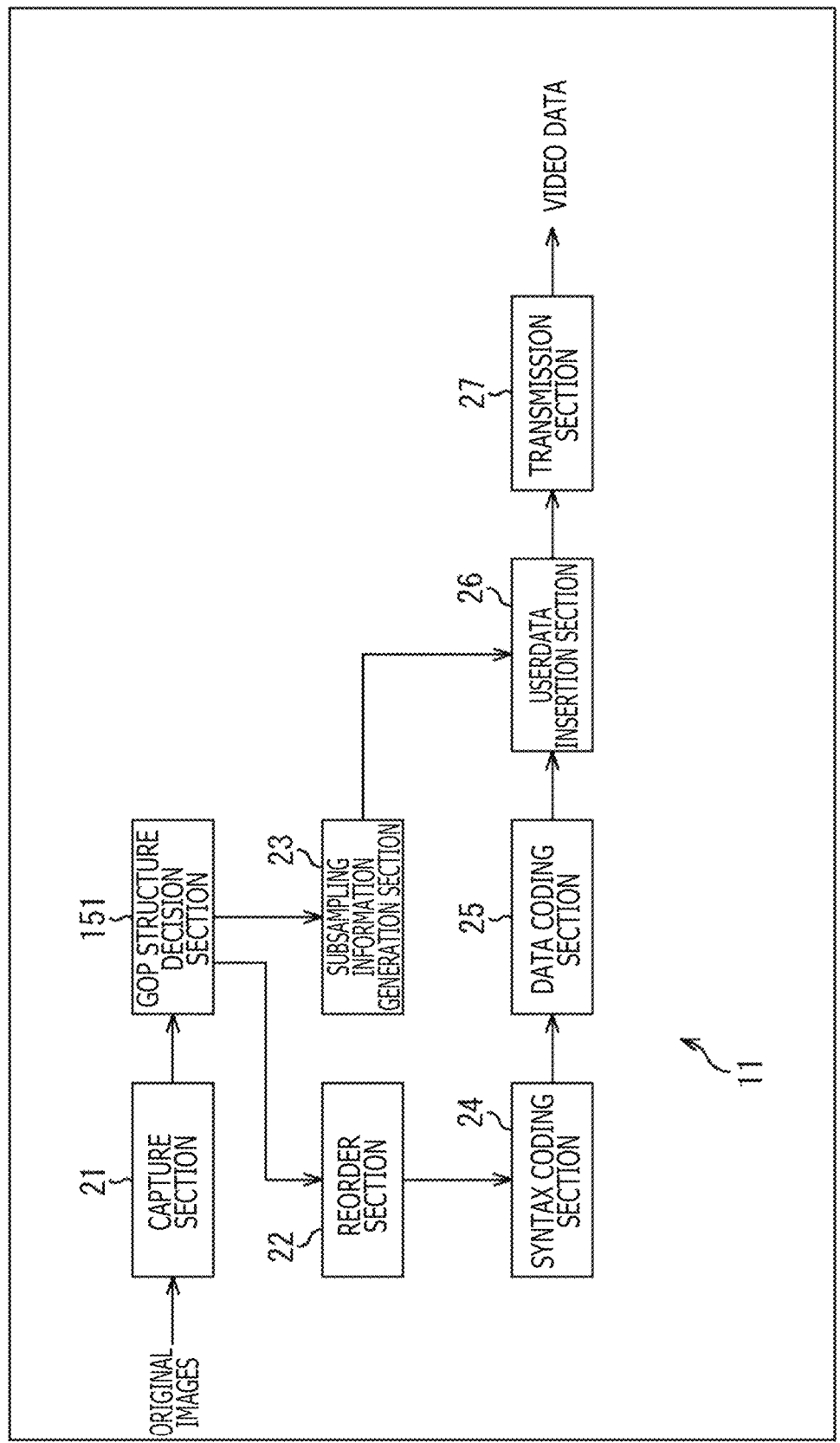
FIG. 11 is a block diagram illustrating another example of the configuration of the encoding device.

FIG. 11 is a block diagram illustrating another example of the configuration of the encoding device 11.

The encoding device 11 of FIG. 11 and the encoding device 11 of FIG. 6 have in common that the encoding device 11 includes the capture section 21, the reorder section 22, the subsampling information generation section 23, the syntax coding section 24, the slice coding section 25, the userdata insertion section 26, and the transmission section 27.

The encoding device 11 of FIG. 11 differs from the encoding device 11 of FIG. 6 in that a GOP (Group Of Picture) structure decision section 151 is additionally provided.

In other words, the capture section 21 outputs the captured original images to the GOP structure decision section 151. The GOP structure decision section 151 confirms a GOP structure for reordering, and supplies information associated with the confirmed GOP structure and the original images to the reorder section 22. The GOP structure decision section 151 also supplies the information associated with the confirmed GOP structure to the subsampling information generation section 23.

The reorder section 22 reorders the images in frames in the display order into the order for coding in response to the GOP structure confirmed by the GOP structure decision section 151 and the M-value. The reorder section 22 outputs the reordered original images and the reorder information to the syntax coding section 24.

The subsampling information generation section 23 generates the subsampling availability information on the basis of the GOP structure confirmed by the GOP structure decision section 151. In other words, the subsampling information generation section 23 generates the userdata containing the subsampling availability information and supplies the userdata containing the subsampling availability information to the userdata insertion section 26.

(Operation Performed by Encoding Device)

Next, the coding process performed by the encoding device 11 of FIG. 11 will be described with reference to a flowchart of FIG. 12.

In Step S151, the capture section 21 captures the original images from the previous stage which is not depicted. The capture section 21 outputs the captured original images to the GOP structure decision section 151. In Step S152, the GOP structure decision section 151 confirms the GOP structure for reordering, and supplies the information associated with the confirmed GOP structure and the original images to the reorder section 22. Further, the GOP structure decision section 151 also supplies the information associated with the confirmed GOP structure to the subsampling information generation section 23.

In Step S153, the subsampling information generation section 23 generates the subsampling availability information on the basis of the GOP structure confirmed by the GOP structure decision section 151. In other words, the subsampling information generation section 23 generates the userdata containing the subsampling availability information and supplies the userdata containing the subsampling availability information to the userdata insertion section 26.

In Step S154, the subsampling information generation section 23 generates the subsampling availability information on the basis of the GOP structure confirmed by the GOP structure decision section 151. In other words, the subsampling information generation section 23 generates the userdata containing the subsampling availability information and supplies the userdata containing the subsampling availability information to the userdata insertion section 26.

Since processes from Steps S155 to S157 are basically similar to those from Steps S14 to S16 of FIG. 9, description thereof will be omitted.

Figure 12:
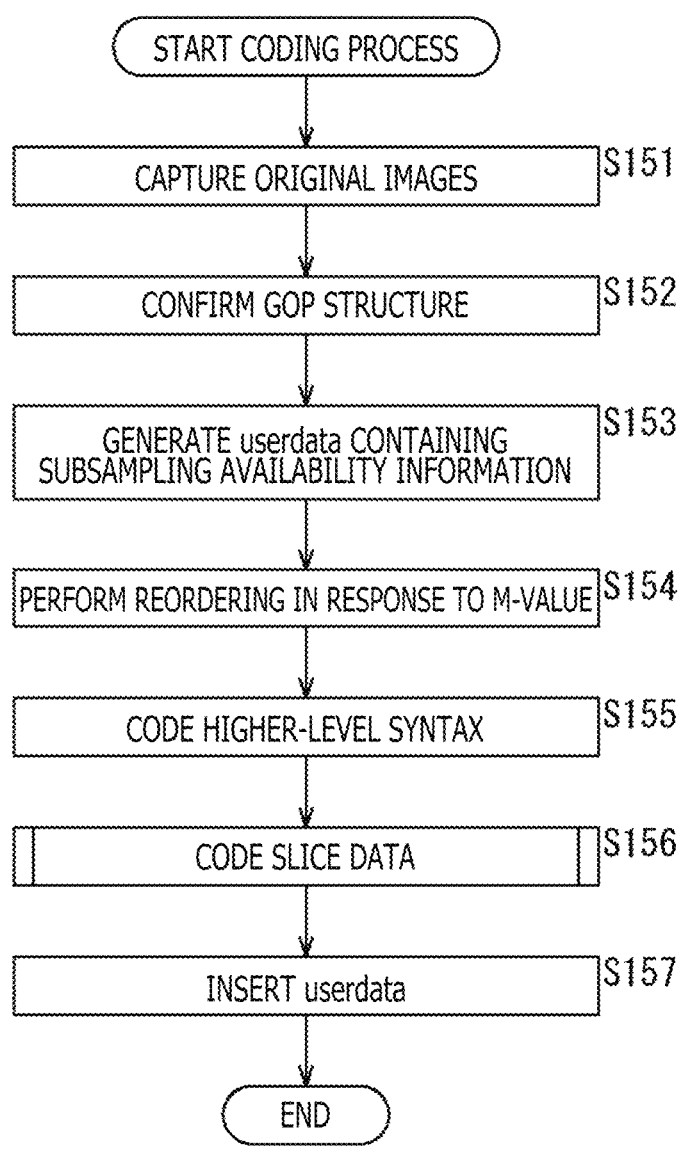
FIG. 12 is a flowchart describing a coding process by the encoding device 11 of FIG. 11.

While the subsampling availability information is generated in Step S13 and the userdata is inserted in Step S16 in the example of FIG. 12, the generation of the subsampling availability information and the insertion of the userdata may be executed at any timing once the reference relation is confirmed by reordering, more specifically, once the GOP structure is confirmed for reordering. Since the insertion process does not depend on the bit generation amount by coding, the insertion process can be executed at any timing.

(Example of Configuration of Decoding Device)

Figure 13:
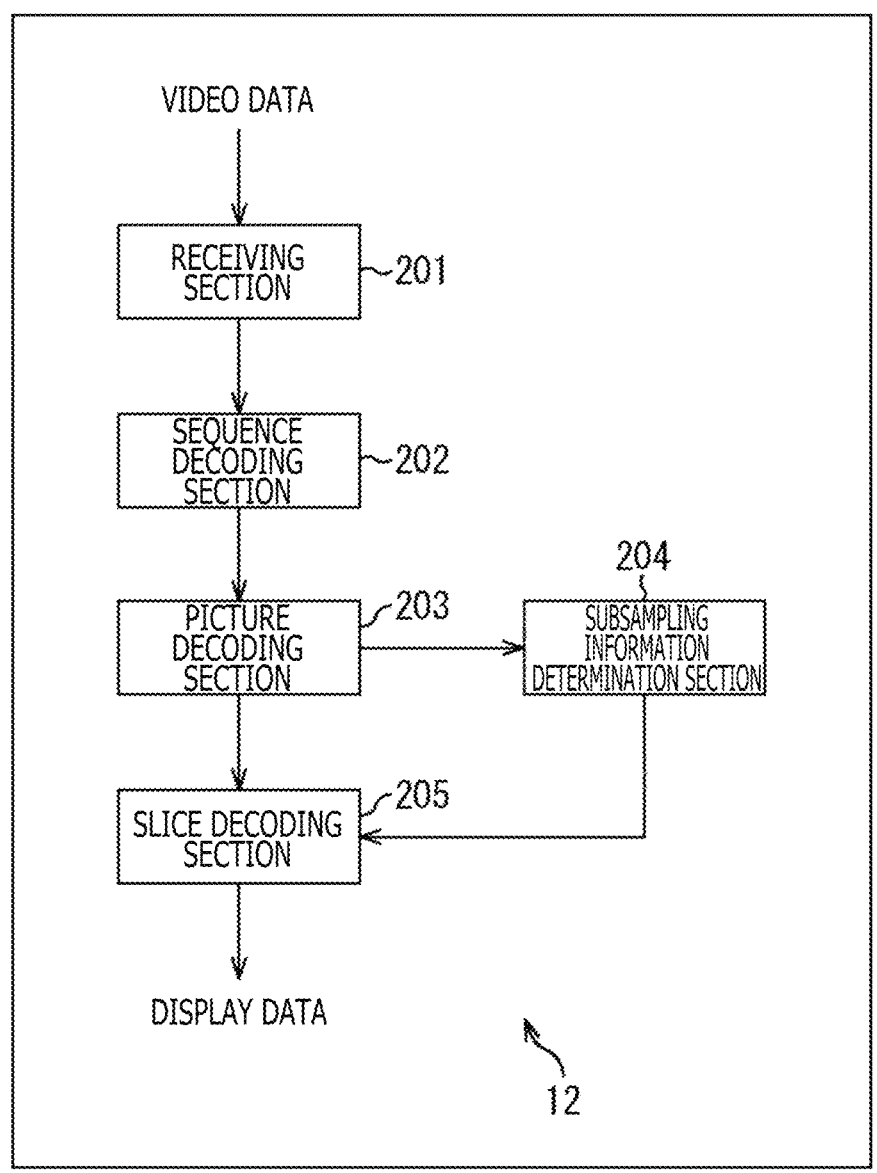
FIG. 13 is a block diagram illustrating an example of a configuration of a decoding device.

FIG. 13 is a block diagram illustrating an example of a configuration of the decoding device 12.

The decoding device 12 includes a receiving section 201, a sequence decoding section 202, a picture decoding section 203, a subsampling information determination section 204, and a slice decoding section 205.

For example, the receiving section 201 receives the video data from the encoding device 11 and supplies the received video data to the sequence decoding section 202. The sequence decoding section 202 decodes parameters per sequence (for example, the SPS) of the video data, and supplies the decoded parameters per sequence and the video data to the picture decoding section 203.

The picture decoding section 203 decodes parameters per picture (for example, the PPS (Picture Parameter Set) and the SEI) of the video data, and supplies the decoded parameters per picture, the parameters per sequence, and the video data to the slice decoding section 205. At that time, the picture decoding section 203 determines whether or not the userdata is present in the SEI and whether or not the userdata contains the subsampling availability information. In a case of determining that the userdata contains the subsampling availability information, the picture decoding section 203 acquires the subsampling availability information and supplies the subsampling availability information to the subsampling information determination section 204.

The subsampling information determination section 204 determines whether or not the AU to be processed is an AU to be subsampled while referring to the subsampling availability information.

In a case of determining that the AU to be processed is not the AU to be subsampled, the subsampling information determination section 204 controls the slice decoding section 205 to decode corresponding slice data. In a case of determining that the AU to be processed is the AU to be subsampled, the subsampling information determination section 204 moves to a process on a next picture. In other words, the picture to be subsampled is prohibited from being decoded.

In a case of determining that the userdata is not present in the SEI or the userdata does not contain the subsampling availability information, the picture decoding section 203 causes the slice decoding section 205 to decode the corresponding slice data.

The slice decoding section 205 decodes the video data from the picture decoding section 203 under control of the subsampling information determination section 204, and outputs display data obtained as a result of decoding to a rear stage, which is, for example, a display device such as an LCD.

(Example of Configuration of Slice Decoding Section)

Figure 14:
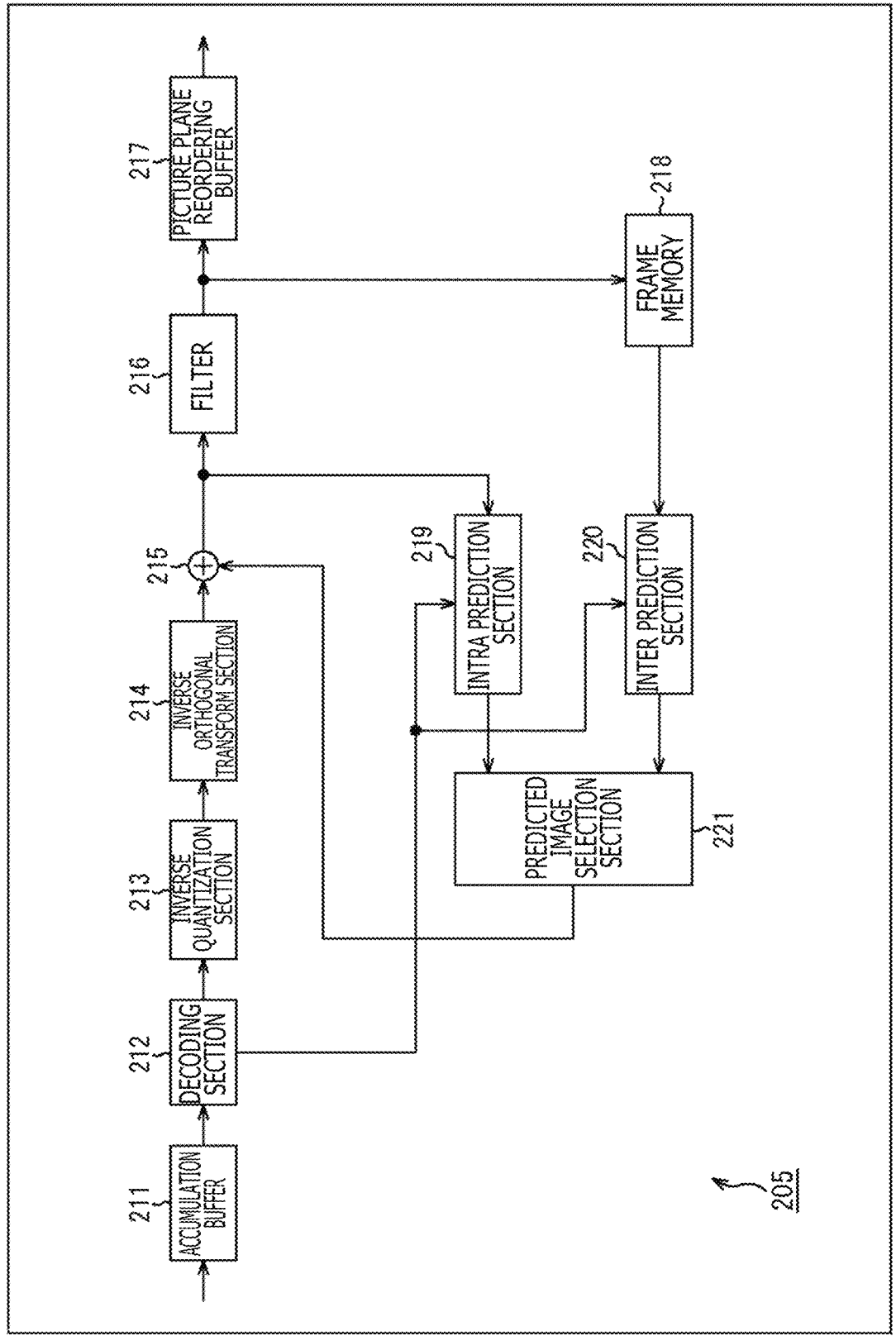
FIG. 14 is a block diagram illustrating an example of a configuration of a slice decoding section of FIG. 13.

FIG. 14 is a block diagram illustrates an example of a configuration of the slice decoding section 205 of FIG. 13.

The slice decoding section 205 of FIG. 14 has an accumulation buffer 211, a decoding section 212, an inverse quantization section 213, an inverse orthogonal transform section 214, an addition section 215, a filter 216, and a picture plane reordering buffer 217. The slice decoding section 205 has also a frame memory 218, an intra prediction section 219, an inter prediction section 220, and a predicted image selection section 221.

The accumulation buffer 211 in the slice decoding section 205 receives and accumulates the video data from the picture decoding section 203 of FIG. 13. The accumulation buffer 211 supplies the accumulated video data to the decoding section 212.

The decoding section 212 obtains the quantization value and the coding information by performing lossless decoding such as variable-length decoding or arithmetic decoding on the video data from the accumulation buffer 211. The decoding section 212 supplies the quantization value to the inverse quantization section 213.

Furthermore, the decoding section 212 supplies the intra prediction mode information or the like as the coding information to the intra prediction section 219. The decoding section 212 supplies the motion vectors, the inter prediction mode information, the information that identifies the reference images, and the like to the inter prediction section 220.

Moreover, the decoding section 212 supplies the intra prediction mode information or the inter prediction mode information as the coding information to the predicted image selection section 221. The decoding section 212 supplies the offset filter information as the coding information to the filter 216.

Figure 18:
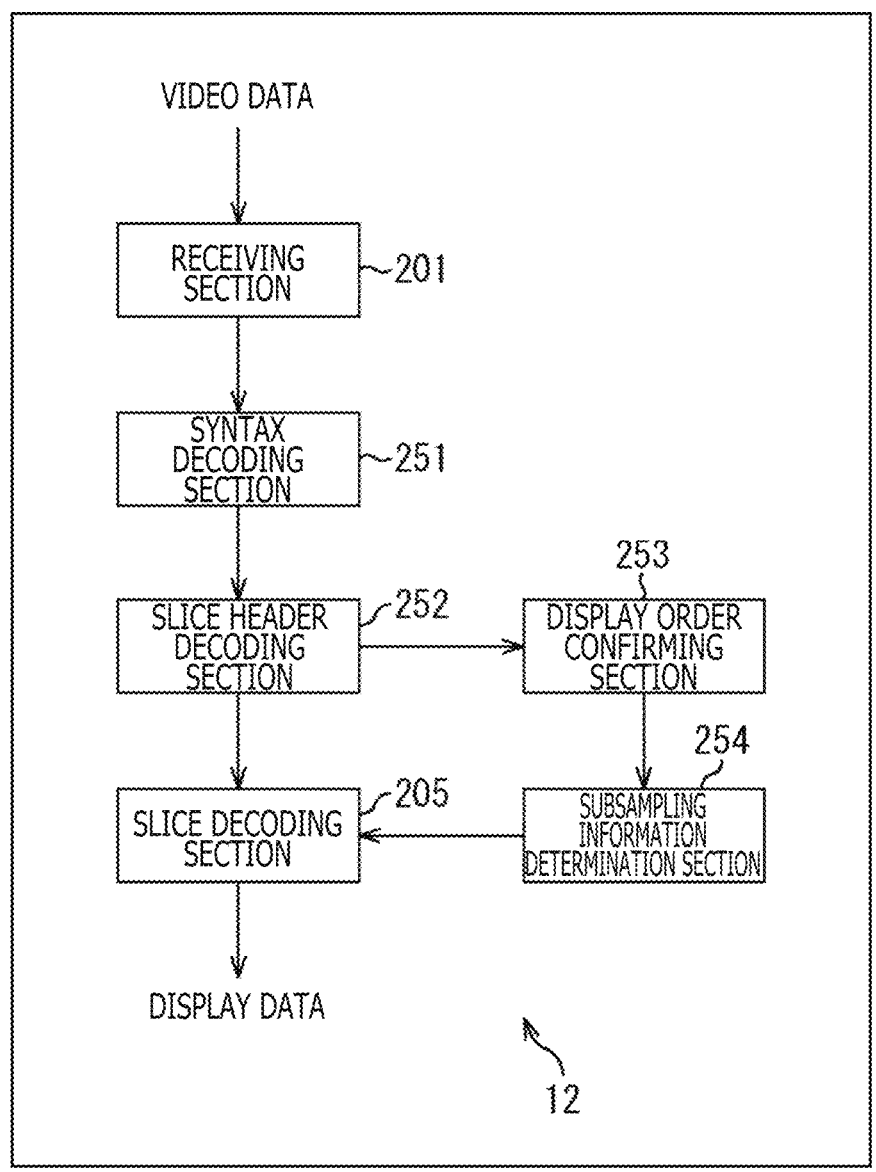
FIG. 18 is a block diagram illustrating an example of a configuration of a decoding device.

The inverse quantization section 213, the inverse orthogonal transform section 214, the addition section 215, the filter 216, the frame memory 218, the intra prediction section 219, and the inter prediction section 220 perform similar processes to those performed by the inverse quantization section 117, the inverse orthogonal transform section 118, the addition section 119, the filter 120, the frame memory 121, the intra prediction section 122, and the inter prediction section 123 of FIG. 18, respectively, thereby decoding the images.

Specifically, the inverse quantization section 213 is configured similarly to the inverse quantization section 117 of FIG. 8. The inverse quantization section 213 inversely quantizes the quantization value from the decoding section 212 in units of TUs. The inverse quantization section 213 supplies a resultant orthogonal transform process result to the inverse orthogonal transform section 214.

The inverse orthogonal transform section 214 is configured similarly to the inverse orthogonal transform section 118 of FIG. 8. The inverse orthogonal transform section 214 performs an inverse orthogonal transform process on the orthogonal transform process result supplied from the inverse quantization section 213. The inverse orthogonal transform section 214 supplies residual information obtained as a result of the inverse orthogonal transform process to the addition section 215.

The addition section 215 adds up the residual information supplied from the inverse orthogonal transform section 214 and the predicted images supplied from the predicted image selection section 221 and decodes the residual information and the predicted images. The addition section 215 supplies the decoded images to the filter 216 and the intra prediction section 219.

The filter 216 performs an adaptive deblocking filter process on the decoded images supplied from the addition section 215. The filter 216 performs the sample adaptive offset filter process of a type represented by the offset filter information from the decoding section 212 on the resultant images for every LCU using offset represented by the offset filter information. The filter 216 supplies the images that have been subjected to the sample adaptive offset filter process to the frame memory 218 and the picture plane reordering buffer 217.

The picture plane reordering buffer 217 stores the images supplied from the filter 216 in units of frames. The picture plane reordering buffer 217 reorders the stored images in units of frames in the order for coding into the original display order, performs, for example, D/A conversion on the images in units of frames as needed, and outputs the resultant images to a rear stage.

The frame memory 218 accumulates the images supplied from the filter 216. The images that are accumulated in the frame memory 218 and that have been subjected to the filter processes are supplied to the inter prediction section 220 as the reference images.

The intra prediction section 219 performs the intra prediction process using peripheral images read from the addition section 215 in the optimum intra prediction mode indicated by the intra prediction mode information supplied from the decoding section 212. The intra prediction section 219 supplies predicted images generated as a result of the intra prediction process to the predicted image selection section 221.

The inter prediction section 220 reads the reference images identified by the information that is supplied from the decoding section 212 and that identifies the reference images, from the frame memory 218. The inter prediction section 220 performs a motion compensation process in the optimum inter prediction mode indicated by the inter prediction mode information supplied from the decoding section 212 using the motion vectors and the reference images supplied from the decoding section 212. The inter prediction section 220 supplies the resultant predicted images generated to the predicted image selection section 221.

In a case in which the intra prediction mode information is supplied to the predicted image selection section 221 from the decoding section 212, the predicted image selection section 221 supplies the predicted images supplied from the intra prediction section 219 to the addition section 215. On the other hand, in a case in which the inter prediction mode information is supplied to the predicted image selection section 221 from the decoding section 212, the predicted image selection section 221 supplies the predicted images supplied from the inter prediction section 220 to the addition section 215.

(Operations Performed by Decoding Device)

Figure 15:
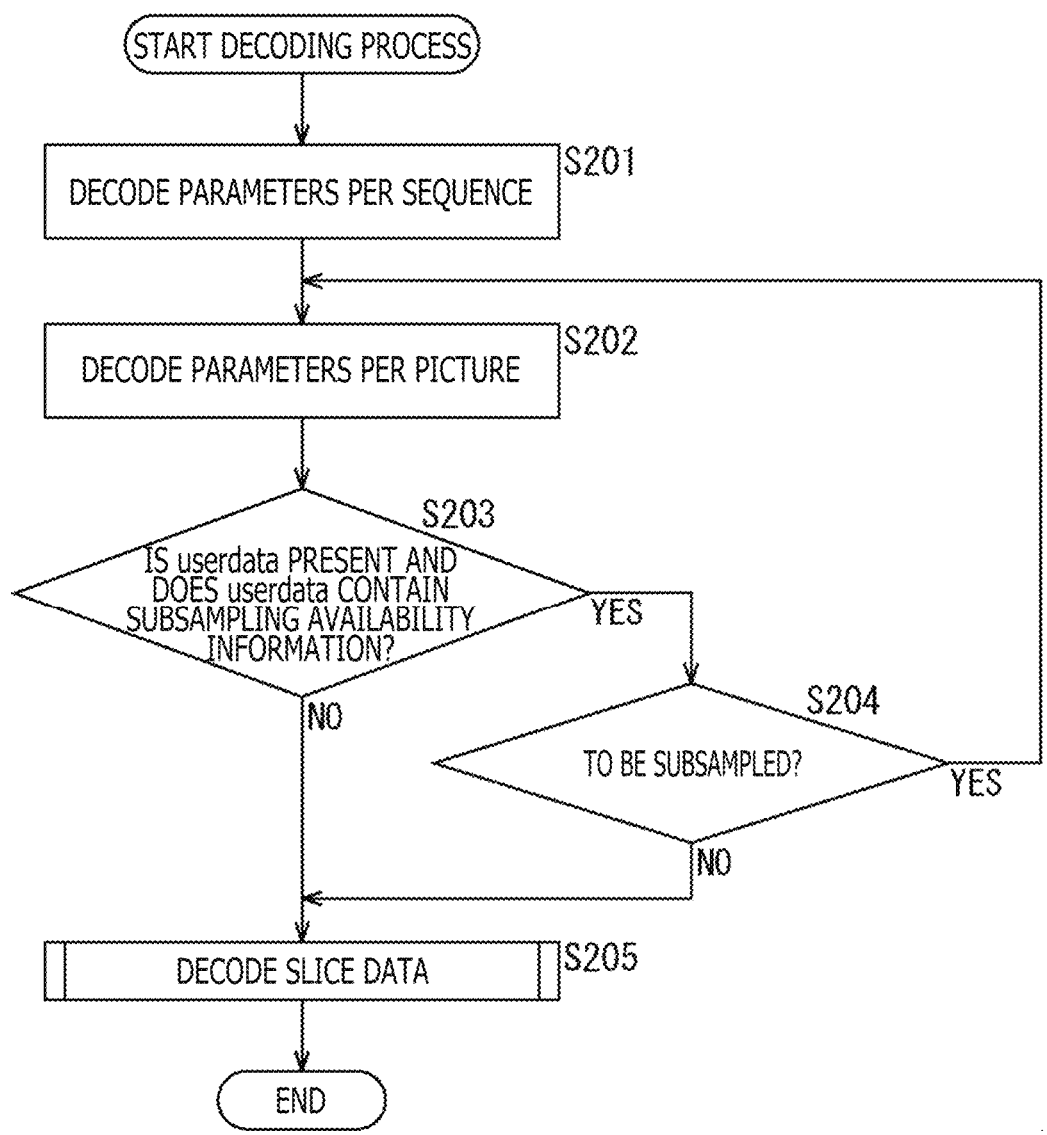
FIG. 15 is a flowchart describing a decoding process by the decoding device of FIG. 13.

A decoding process performed by the decoding device 12 will next be described with reference to a flowchart of FIG. 15.

For example, the receiving section 201 receives the video data from the encoding device 11 and supplies the received video data to the sequence decoding section 202.

In Step S201, the sequence decoding section 202 decodes the parameters per sequence (for example, the SPS) of the video data, and supplies the decoded parameters per sequence and the video data to the picture decoding section 203.

In Step S202, the picture decoding section 203 decodes the parameters per picture (for example, the PPS (Picture Parameter Set) and the SEI) of the video data, and supplies the decoded parameters per picture, the parameters per sequence, and the video data to the slice decoding section 205.

In Step S203, the picture decoding section 203 determines whether or not userdata is present in the SEI and whether or not the userdata contains the subsampling availability information. In a case of determining in Step S203 that the userdata is present and that the userdata contains the subsampling availability information, the process goes to Step S204. The picture decoding section 203 acquires the subsampling availability information and supplies the subsampling availability information to the subsampling information determination section 204.

In Step S204, the subsampling information determination section 204 determines whether or not the AU currently being processed is to be subsampled while referring to the subsampling availability information. In a case of determining in Step S204 that the AU to be processed is the AU to be subsampled, the process returns to Step S202 and moves to a process on the next picture. In other words, the slice determined to be subsampled is prohibited from being decoded.

In a case of determining in Step S204 that the AU to be processed is not the AU to be subsampled, the process goes to Step S205. Furthermore, in a case of determining in Step S203 that the userdata is not present or that the userdata is present but does not contain the subsampling availability information, the process goes to Step S205.

In Step S205, the slice decoding section 205 decodes the video data from the picture decoding section 203 under control of the subsampling information determination section 204. It is noted that details of this decoding process will be described later with reference to next FIG. 16. The display data obtained as a result of decoding by Step S205 is output to, a display device such as the LCD.

Figure 16:
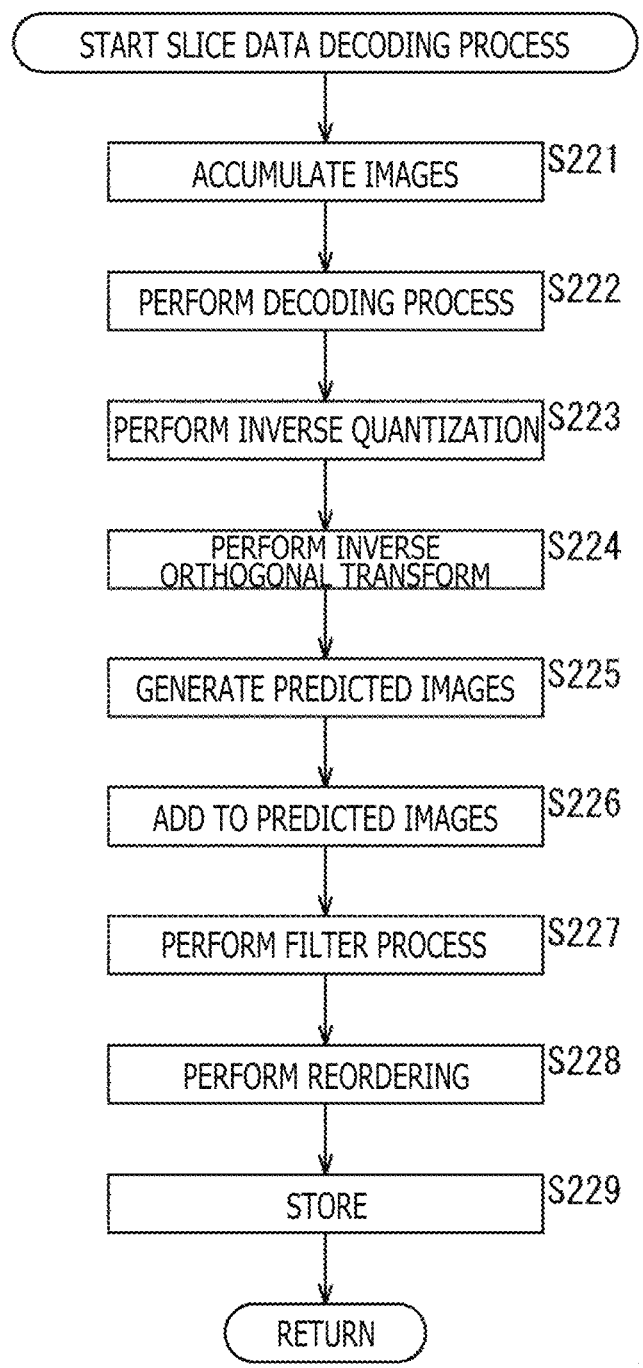
FIG. 16 is a flowchart describing slice data decoding in Step S205 of FIG. 15.

Decoding of slice data in Step S205 of FIG. 15 will next be described with reference to a flowchart of FIG. 16.

In Step S221, the accumulation buffer 211 (FIG. 14) in the slice decoding section 205 receives and accumulates the coded data in units of frames from the picture decoding section 203 of FIG. 13. The accumulation buffer 211 supplies the accumulated coded data to the decoding section 212.

In Step S222, the decoding section 212 decodes the coded data from the accumulation buffer 211 and acquires the quantization value and the coding information. The decoding section 212 supplies the quantization value to the inverse quantization section 213.

Furthermore, the decoding section 212 supplies the intra prediction mode information or the like as the coding information to the intra prediction section 219. The decoding section 212 supplies the motion vectors, the inter prediction mode information, the information that identifies the reference images, and the like to the inter prediction section 220.

Moreover, the decoding section 212 supplies the intra prediction mode information or the inter prediction mode information as the coding information to the predicted image selection section 221. The decoding section 212 supplies the offset filter information as the coding information to the filter 216.

In Step S223, the inverse quantization section 213 inversely quantizes the quantization value from the decoding section 212. The inverse quantization section 213 supplies an orthogonal transform process result obtained as a result of inverse quantization to the inverse orthogonal transform section 214.

In Step S224, the inverse orthogonal transform section 214 performs the inverse orthogonal transform process on the orthogonal transform process result supplied from the inverse quantization section 213.

In Step S225, the intra prediction section 219 or the inter prediction section 220 generates predicted images. In other words, in a case of determining that the inter prediction mode information is supplied from the decoding section 212, the inter prediction section 220 reads the reference images on the basis of the reference image identification information supplied from the decoding section 212, performs the motion compensation process in the optimum inter prediction mode indicated by the inter prediction mode information using the motion vectors and the reference images, and generates the predicted images. The inter prediction section 220 supplies the predicted images generated as a result of the process to the addition section 215 via the predicted image selection section 221, and the process goes to Step S226.

On the other hand, in a case of determining that the intra prediction mode information is supplied to the intra prediction section 219, the intra prediction section 219 performs an intra prediction process in the intra prediction mode indicated by the intra prediction mode information using the peripheral images from the addition section 215. The intra prediction section 219 supplies the predicted images generated as a result of the intra prediction process to the addition section 215 via the predicted image selection section 221, and the process goes to Step S226.

In Step S226, the addition section 215 adds up the residual information supplied from the inverse orthogonal transform section 214 and the predicted images supplied from the predicted image selection section 221, thereby decoding the residual information and the predicted images. The addition section 215 supplies the decoded images to the filter 216 and the intra prediction section 219.

In Step S227, the filter 216 performs the deblocking filter process on the images supplied from the addition section 215, and performs the sample adaptive offset filter process on the resultant images for every LCU on the basis of the offset filter information supplied from the decoding section 212. The filter 216 supplies the images that have been subjected to the sample adaptive offset filter process to the frame memory 218 and the picture plane reordering buffer 217.

In Step S228, the frame memory 218 accumulates the images supplied from the addition section 215 and the images supplied from the filter 216. The images that are accumulated in the frame memory 218 and that have been subjected to the filter processes are supplied to the inter prediction section 220 via a switch 142 as the reference images.

In Step S227, the picture plane reordering buffer 217 stores the images supplied from the filter 216 in units of frames, reorders the images in units of frames in the stored order for coding into the original display order, performs the D/A conversion on the images in units of frames, and outputs the resultant images to the rear stage, for example, the LCD.

As described so far, according to the present technique, the encoding side inserts the subsampling availability information into the userdata; thus, the decoding side can grasp whether each AU is to be subsampled before decoding and minimize decoding of the video data. As a result, other processes can be performed and it is, therefore, possible to improve performance.

It is noted that the present technique is to insert the information associated with subsampling into the userdata during coding. The subsampling information is inserted into the userdata for ordinary video data as described above. In addition, in a case of multiview coding, subsampling availability information associated with paired AUs is inserted, and in a case of hierarchical coding, subsampling information associated with the AUs in higher-level hierarchies is inserted. It is thereby possible to realize the effects of the present technique for various streams. In the case of the multiview coding or the hierarchical coding, a larger information volume than 16 bits described above is required.

Furthermore, while an example of inserting the subsampling availability information into the userdata has been described above, an insertion location is not limited to the userdata but may be an arbitrary location if it is possible to determine whether the AU is to be subsampled before decoding in the location.

2. Second Embodiment (Outline of Present Technique)

An example of minimizing decoding of video data by exercising ingenuity in a decoding order of the already coded video data will next be described.

Figure 17:
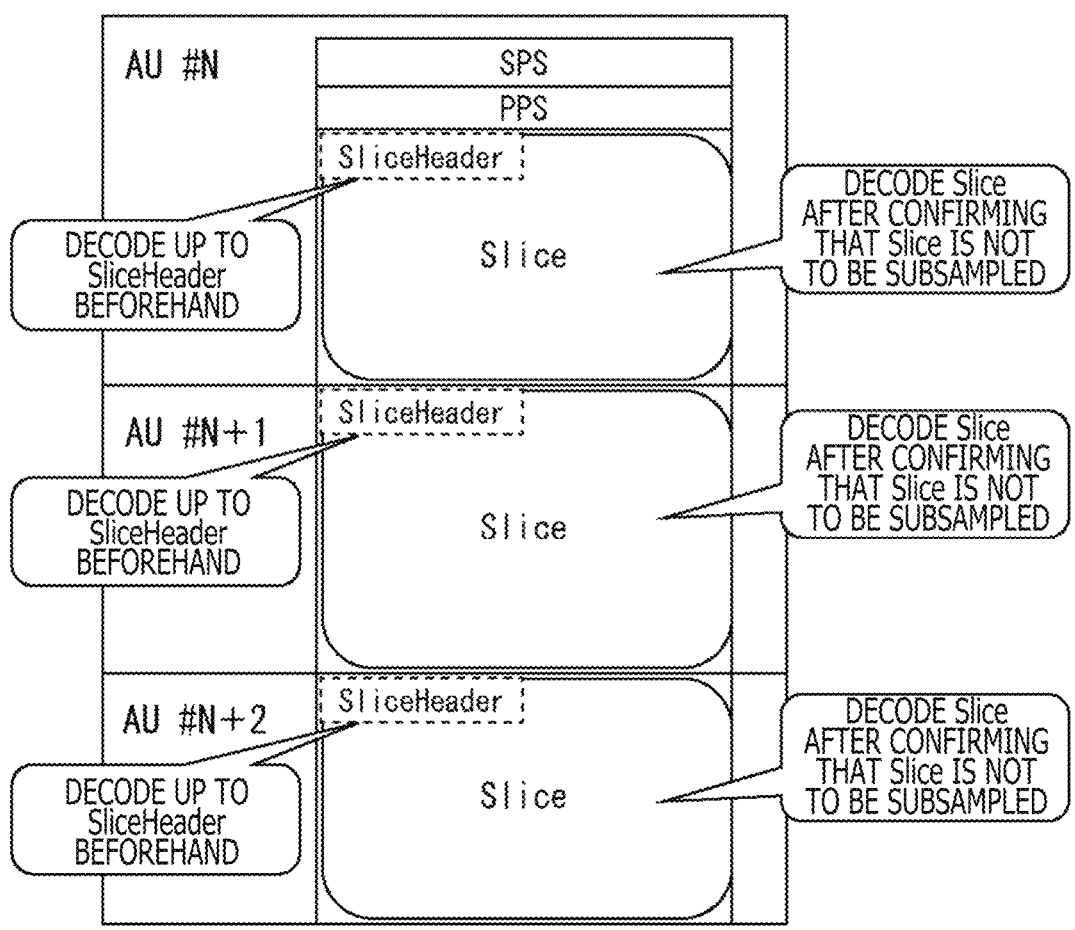
FIG. 17 is an illustrative diagram of a decoding order according to the present technique.

In other words, as illustrated in FIG. 17, each AU is configured with an SPS, a PPS, and slice data in this order. Therefore, the SPSs to slice headers of AUs by as much as a DPB capacity are decoded ahead of slice bodies, POC (Picture Order Count) values (time information) are computed, and the display order is confirmed, whereby it is determined whether or not each AU is to be subsampled beforehand without decoding the slice body. This enables only slices that are not to be subsampled to be decoded, making it possible to minimize the decoding of the video data.

(Example of Configuration of Decoding Device)

FIG. 18 is a block diagram illustrating an example of a configuration of the decoding device 12.

The decoding device 12 of FIG. 18 and the decoding device 12 of FIG. 13 have in common that the decoding device includes the receiving section 201 and the slice decoding section 205.

The decoding device 12 of FIG. 18 differs from the decoding device 12 of FIG. 13 in that the sequence decoding section 202 and the picture decoding section 203 are replaced by a syntax decoding section 251 and a slice header decoding section 252, the subsampling information determination section 204 is replaced by a subsampling information determination section 254, and a display order confirming section 253 is added.

In other words, for example, the receiving section 201 receives the video data from the encoding device 11 and supplies the received video data to the syntax decoding section 251. The sequence decoding section 251 decodes higher-level syntax parameters (for example, the SPS, the PPS, and the SEI) of the video data, and supplies the decoded higher-level syntax parameters and the video data to the slice header decoding section 252.

The slice header decoding section 252 decodes the slice headers (for example, the SPS, the PPS, and the SEI) of the video data, and supplies the decoded higher-level syntax parameters, the decoded slice headers, and the video data to the display order confirming section 253 and the slice decoding section 205.

The display order confirming section 253 waits until the POC values present in the slice headers are complete by as much as a MaxDPB capacity. In a case in which it is determined that the POC values are complete by as much as the MaxDPB capacity, the POC values complete by as much as the MaxDPB capacity are reordered in an ascending order; thus, the display order confirming section 253 confirms the display order. The display order confirming section 253 supplies the confirmed display order to the subsampling information determination section 254.

The subsampling information determination section 254 determines, in order from the leading AU, whether or not each AU is to be subsampled from the assigned number of AUs to be subsampled. In a case in which the AU is to be subsampled, the subsampling information determination section 254 prohibits the slice decoding section 205 from decoding the slice and determines whether the next AU is to be subsampled. On the other hand, in a case in which the AU is not to be subsampled, the subsampling information determination section 254 causes the slice decoding section 205 to decode the slice of the AU.

The slice header decoding section 205 decodes the video data from the slice header decoding section 252 and outputs display data obtained as a result of decoding to the rear stage, which is, for example, the display device such as the LCD under control of the subsampling information determination section 254.

It is noted that after decoding the slice of one AU, the slice header decoding section 252 decodes the slice header of the next AU for which the slice header is not decoded yet; thus, the POC values by as much as the MaxDPB capacity are always computed. Furthermore, the syntax information decoded beforehand is sometimes used at a time of decoding slices; therefore, the decoded syntax information is retained in the slice decoding section 205.

(Operations Performed by Decoding Device)

Figure 19:
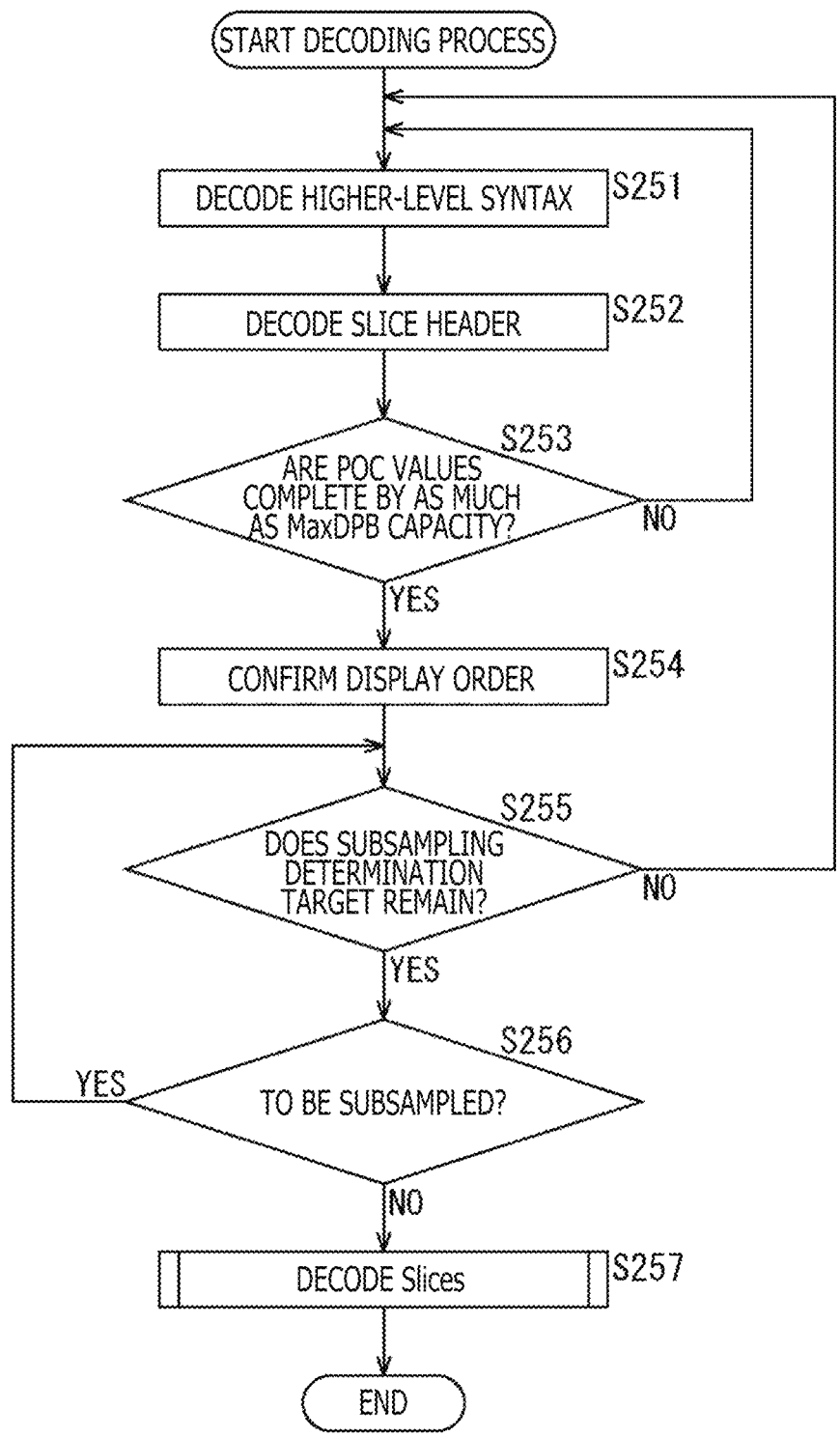
FIG. 19 is a flowchart describing a decoding process by the decoding device of FIG. 18.

A decoding process performed by the decoding device 12 of FIG. 18 will next be described with reference to a flowchart of FIG. 19.

For example, the receiving section 201 receives the video data from the encoding device 11 and supplies the received video data to the syntax decoding section 251. In Step S251, the syntax decoding section 251 decodes the higher-level syntax parameters (for example, the SPS, the PPS, and the SEI) of the video data, and supplies the decoded higher-level syntax parameters and the video data to the slice header decoding section 252.

In Step S252, the slice header decoding section 252 decodes the slice headers (for example, the SPS, the PPS, and the SEI) of the video data, and supplies the decoded higher-level syntax parameters, the decoded slice headers, and the video data to the slice header decoding section 252 and the display order confirming section 253.

In Step S253, the display order confirming section 253 determines whether or not the POC values in the slice headers are complete by as much as the MaxDPB capacity. In a case of determining in Step S253 that the POC values are complete by as much as the MaxDPB capacity, the process goes to Step S254, in which the display order confirming section 253 confirms the display order by reordering the POC values by as much as the MaxDPB capacity in the ascending order. In a case of determining in Step S253 that the POC values are not complete by as much as the MaxDPB capacity, the process goes to Step S251, and the processes in and after Step S251 are repeated.

The display order confirming section 253 supplies the confirmed display order to the subsampling information determination section 254.

The subsampling information determination section 254 determines, in order from the leading AU, whether or not each AU is to be subsampled from the assigned number of AUs to be subsampled. In Step S255, the subsampling information determination section 254 determines whether or not a subsampling determination target remains.

In a case in which the subsampling information determination section 254 determines that the subsampling determination target does not remain in Step S255, the process returns to Step S251 and the processes in and after Step S251 are repeated.

In a case in which the subsampling information determination section 254 determines that the subsampling determination target remains in Step S255, the process goes to Step S256. In Step S256, the subsampling information determination section 254 determines, in order from the leading AU, whether or not each AU is to be subsampled from the assigned number of AUs to be subsampled.

In a case in which the subsampling information determination section 254 determines in Step S256 that the AU is to be subsampled, then the subsampling information determination section 254 prohibits the slice decoding section 205 from decoding the AU, the process returns to Step S255, and the processes in and after Step S255 are repeated on the next AU.

In a case in which the subsampling information determination section 254 determines in Step S256 that the AU is not to be subsampled, the process goes to Step S257. In Step S257, the subsampling information determination section 254 causes the slice decoding section 205 to decode the slices. Since the slice decoding process in Step S257 is basically similar to the slice decoding process described above with reference to FIG. 16, description thereof will be omitted.

The slice header decoding section 205 decodes the video data from the slice header decoding section 252 and outputs the display data obtained as a result of decoding to the rear stage, which is, for example, the display device such as the LCD under control of the subsampling information determination section 254.

The present technique decodes up to the syntax corresponding to the AUs by a sufficient number and necessary for subsampling beforehand without decoding all the AUs; thus, the present technique determines whether or not each AU is to be subsampled ahead of decoding of the slice data body, thereby making it possible to suppress decoding of the data regarding the slice bodies that account for a large portion of the decoding process to the data only if necessary.

Owing to this, it is possible to realize effects of the present technique for various streams by additionally using information such as view_id in a case of multiview coding, or information such as dependency_id in a case of hierarchical coding as the basis for determination.

In a case of the second embodiment, it is necessary to decode the syntax to some extent, compared with the case of the first embodiment; however, since not the slice headers but the subsequent data (slices) accounts for a large portion of the process during reproduction, the second embodiment can similarly exhibit sufficient effects.

In a case in which reproduction according to the first embodiment cannot be performed, the second embodiment can be employed. For example, in a case in which the decoding device can acquire the subsampling availability information described above in the first embodiment from the video data, a determination process according to the first embodiment is performed. In a case in which the decoding device cannot acquire the subsampling availability information described above in the first embodiment from the video data, then, as described in the second embodiment, the display order can be confirmed on the basis of the POC values by as much as the MaxDPB capacity only for the slice headers, and it can be determined whether each AU is to be subsampled.

According to the present technique, in a case of performing the thumbnail reproduction, the fast forward reproduction, or reverse fast forward reproduction, it is possible to dispense with decoding of AUs that are originally unnecessary to decode.

It is thereby possible to realize an improvement in performance, a reduction in delay, and a reduction in memory usage.

Since the resolution and data of video themselves have made explosive growth in recent years, It is considered that those effects are rapidly enhanced.

In the description given so far, the HEVC-compliant scheme is used as the coding scheme. However, the present technique is not limited to the embodiments but is applicable to the AVC, MPEG, and other coding/decoding schemes.

3. Third Embodiment (Application to Multiview Image Coding/Decoding System)

Figure 20:
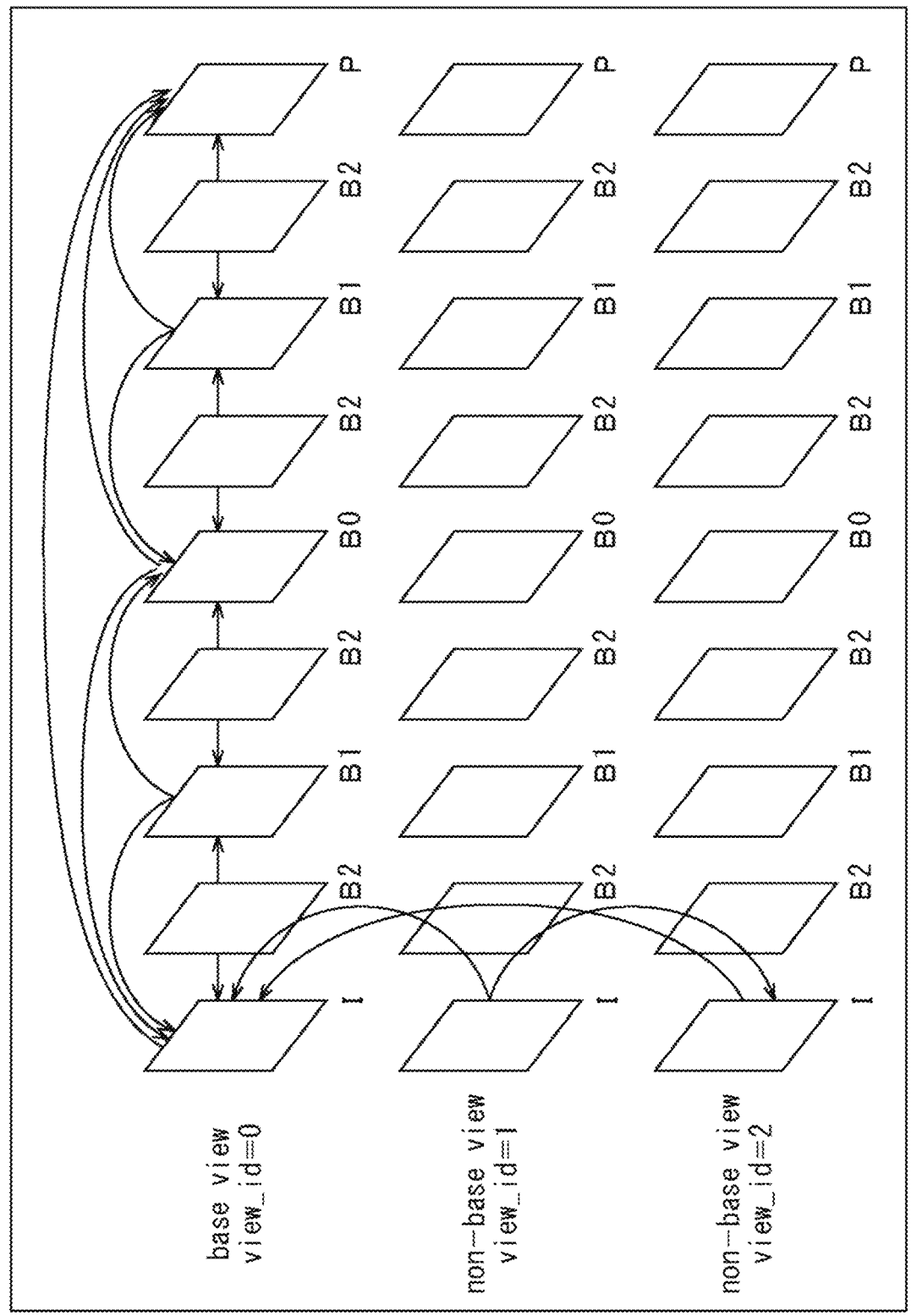
FIG. 20 illustrates an example of a multiview image coding scheme.

A series of processes described above can be applied to a multiview image coding/decoding system. FIG. 20 illustrates an example of a multiview image coding scheme.

As illustrated in FIG. 20, multiview images include images from a plurality of views. The plurality of views of these multiview images include a base view for which coding/decoding is performed using the images only from the own view without using information associated with other views and non-base views for which coding/decoding is performed using the information associated with the other views. Coding/decoding regarding each non-base view may be performed using information associated with the base view or using information associated with the other non-base view.

In a case of coding/decoding the multiview images as in the example of FIG. 20, the multiview images are coded per view. In addition, in a case of decoding coded data obtained in that way, the coded data regarding the views is decoded, individually (that is, for every view). A method described in each of the embodiments described above may be applied to the coding/decoding of the images from the views. Applying such a method makes it possible to improve performance at a time of performing special reproduction. In other words, in a case of multiview images, it is similarly possible to improve the performance at a time of performing special reproduction.

(Multiview Image Coding/Decoding System)

Figure 21:
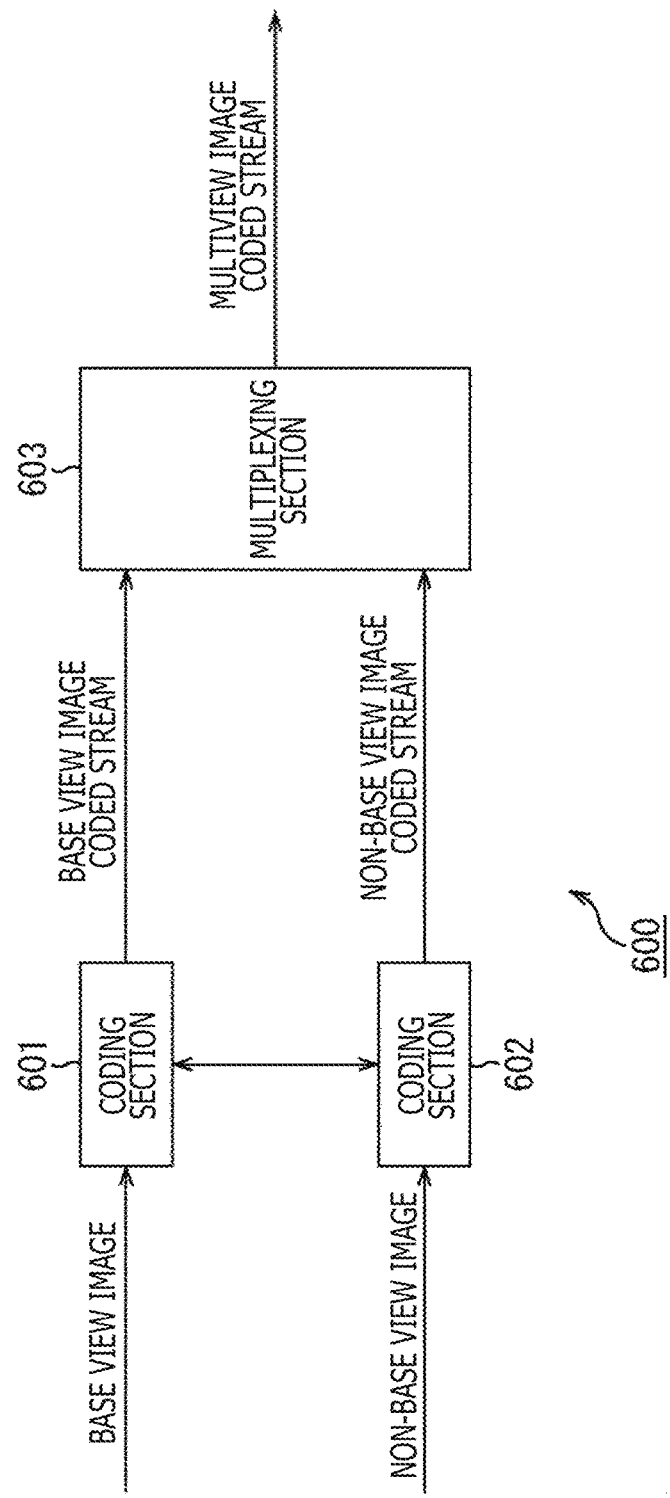
FIG. 21 illustrates an example of a configuration of a multiview image encoding device to which the present disclosure is applied.

FIG. 21 illustrates a multiview image encoding device in the multiview image coding/decoding system that performs coding/decoding of multiview images described above. As illustrated in FIG. 21, a multiview image encoding device 600 has a coding section 601, a coding section 602, and a multiplexing section 603.

The coding section 601 codes base view images and generates a base view image coded stream. The coding section 602 codes non-base view images and generates a non-base view image coded stream. The multiplexing section 603 multiplexes the base view image coded stream generated by the coding section 601 with the non-base view image coded stream generated by the coding section 602, and generates a multiview image coded stream.

Figure 22:
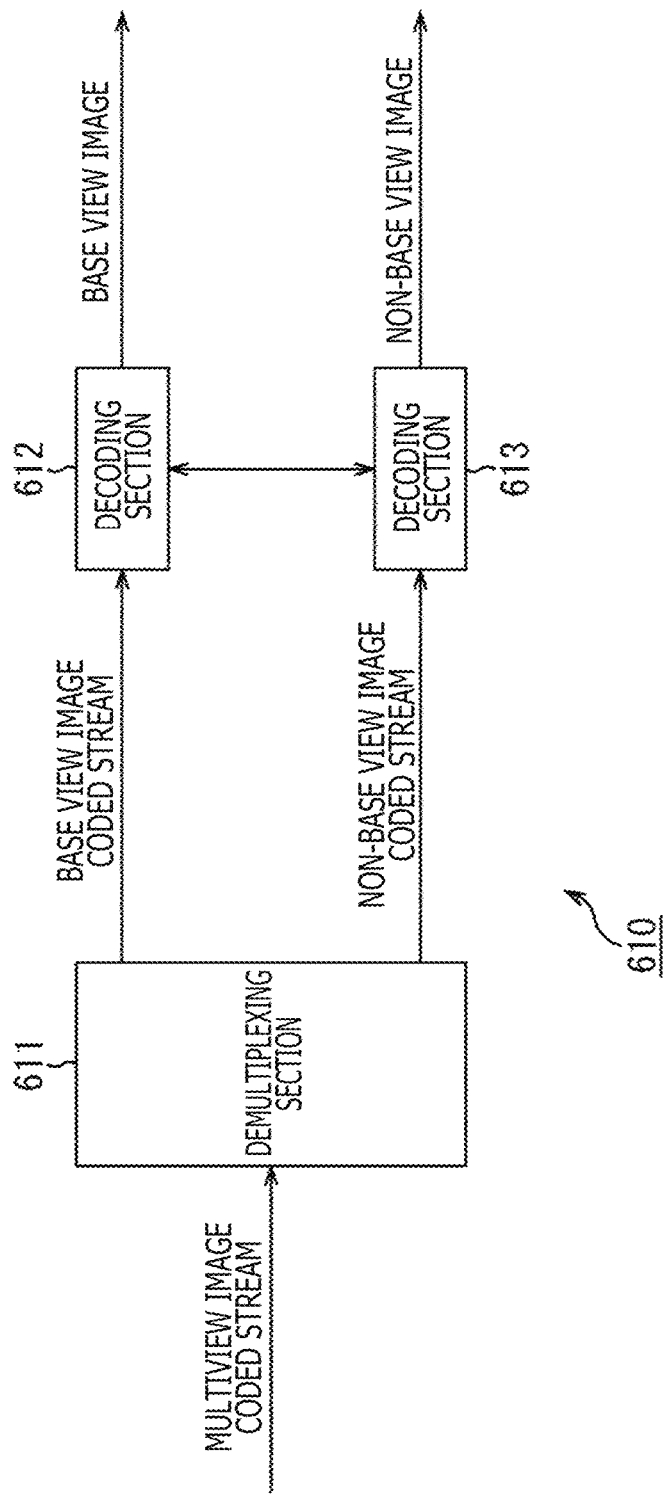
FIG. 22 illustrates an example of a configuration of a multiview image decoding device to which the present disclosure is applied.

FIG. 22 illustrates a multiview image decoding device that performs decoding of the multiview images described above. As illustrated in FIG. 22, a multiview image decoding device 610 has a demultiplexing section 611, a decoding section 612, and a decoding section 613.

The demultiplexing section 611 demultiplexes the multiview image coded stream obtained by multiplexing the base view image coded stream with the non-base view image coded stream, and extracts the base view image coded stream and the non-base view image coded stream. The decoding section 612 decodes the base view image coded stream extracted by the demultiplexing section 611 and obtains the base view images. The decoding section 613 decodes the non-base view image coded stream extracted by the demultiplexing section 611 and obtains the non-base view images.

For example, in such a multiview image coding/decoding system, the encoding device 11 described in each of the above embodiments may be applied as each of the coding sections 601 and 602 in the multiview image encoding device 600. This makes it possible to apply the method described in each of the above embodiments to the coding of the multiview images. In other words, it is possible to improve performance at a time of performing special reproduction. In addition, for example, the decoding device 12 described in each of the above embodiments may be applied as each of the decoding sections 612 and 613 in the multiview image decoding device 610. This makes it possible to similarly apply the method described in each of the above embodiments to the decoding of the multiview image coded data. In other words, it is possible to improve performance at a time of performing special reproduction.

4. Fourth Embodiment (Application to Hierarchical Image Coding/Decoding System)

Figure 23:
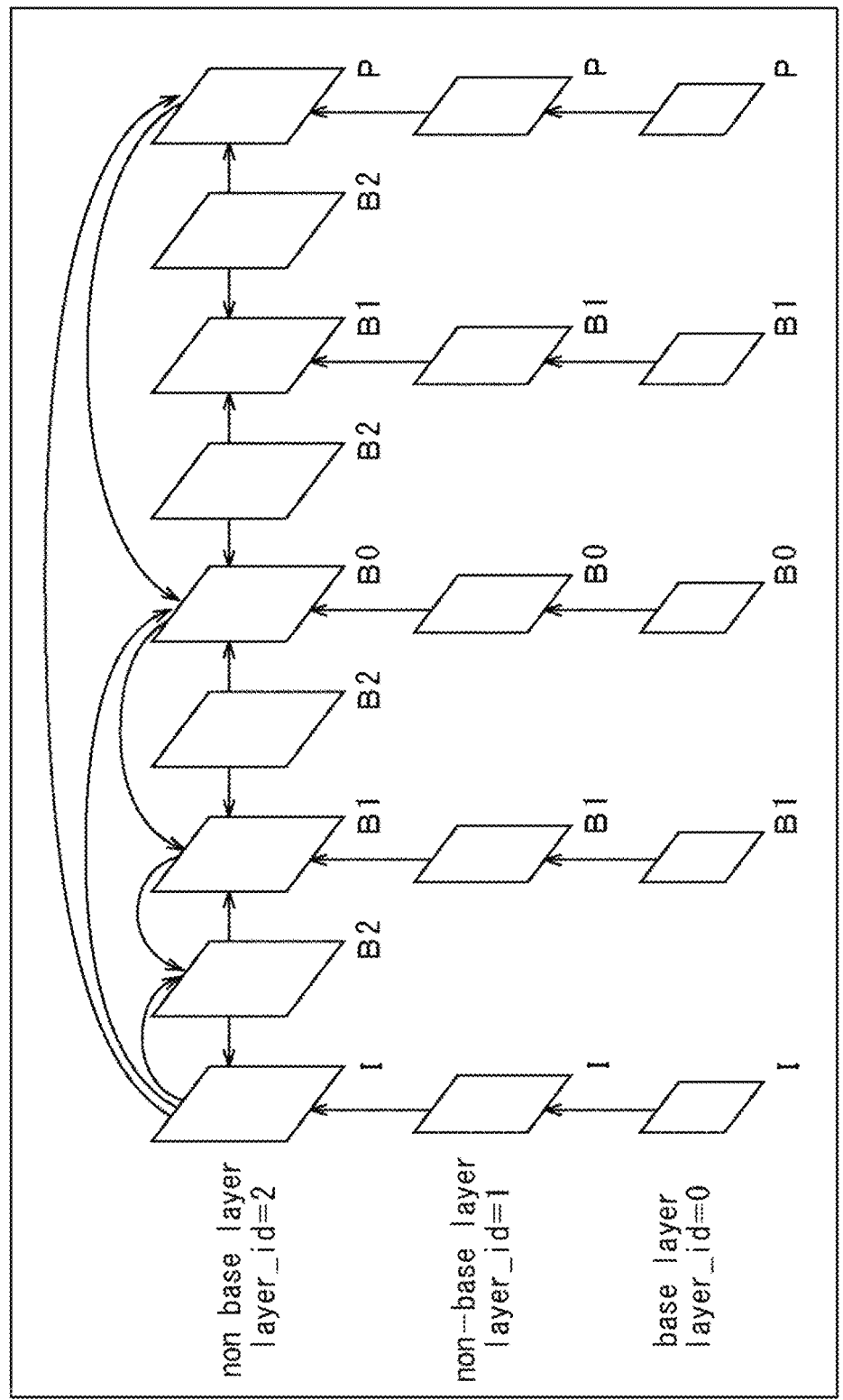
FIG. 23 illustrates an example of a hierarchical image coding scheme.

A series of processes described above can be also applied to a hierarchical image coding (scalable coding)/decoding system. FIG. 23 illustrates an example of a hierarchical image coding scheme.

Hierarchical image coding (scalable coding) divides images into those in a plurality of layers (hierarchizes images) and codes the images per layer so that image data has a scalability function with respect to a predetermined parameter. As for hierarchical image decoding, hierarchical image coding (scalable decoding), as opposed to the hierarchical image coding, is decoding corresponding to the hierarchical image coding.

As illustrated in FIG. 23, in image hierarchization, one image is divided into a plurality of images (in layers) with a predetermined parameter having a scalability function as a basis. In other words, the hierarchized images (hierarchical images) include images in a plurality of hierarchies having different values of the predetermined parameter. The plurality of layers of the hierarchical images include a base layer for which coding/decoding is performed using the images only in the base layer itself without using images in other layers, and non-base layers (also referred to as "enhancement layers") for which coding/decoding is performed using images in the other layers. Each non-base layer may use the images in the base layer or the images in the other non-base layer.

Generally, each non-base layer includes difference image data (difference data) between the images in the layer itself and those in the other layers for reducing redundancy. For example, in a case of hierarchizing one image into images in two hierarchies of the base layer and the non-base layer (also referred to as "enhancement layer"), images at a lower quality than that of original images are obtained only from data regarding the base layer, and combining the data regarding the base layer with data regarding the non-base layer makes it possible to obtain the original images (that is, high-quality images).

In this way, hierarchizing the image makes it possible to easily obtain images at various qualities depending on circumstances. To a terminal, for example, a cellular telephone with a low processing capability, image compression information associated only with the base layer is transmitted to reproduce video at a low spatial/temporal resolution or a low picture quality. To a terminal, for example, a television or a personal computer with a high processing capability, image compression information associated with not only the base layer but also the enhancement layer is transmitted to reproduce video at a high spatial/temporal resolution or a high picture quality. In this way, it is possible to transmit the image compression information in response to the capability of the terminal or a network from a server without performing a transcoding process.

In a case of coding/decoding the hierarchical images as in the example of FIG. 23, the hierarchical images are coded per layer. In addition, in a case of decoding coded data obtained in that way, the coded data regarding the layers is decoded, individually (that is, for every layer). The method described in each of the above embodiments may be applied to such coding/decoding regarding the layers. Applying such a method makes it possible to improve performance at a time of performing special reproduction. In other words, in a case of hierarchical images, it is similarly possible to improve the performance at a time of performing special reproduction.

(Scalable Parameter)

In such hierarchical image coding/hierarchical image decoding (scalable coding/scalable decoding), an arbitrary parameter having the scalability function may be used. For example, a spatial resolution may be used as the parameter (spatial scalability). In a case of this spatial scalability, the image resolution varies depending on layers.

Alternatively, as the parameter that achieves such scalability, a temporal resolution may be applied (temporal scalability). In a case of this temporal scalability, a frame rate varies depending on layers.

In another alternative, as the parameter that achieves such scalability, a signal to noise ratio (SNR), for example, may be applied (SNR scalability). In a case of this SNS scalability, the SN ratio varies depending on layers.

The parameter that achieves the scalability may be a parameter other than those taken by way of example above. For example, there is bit depth scalability with which it is possible to obtain images of ten bits by adding the enhancement layer to the base layer, which is configured with images of eight bits.

In addition, there is chroma scalability with which it is possible to obtain component images of 4:2:2 format by adding the enhancement layer to the base layer configured with component images of 4:2:0 format.

Figure 24:
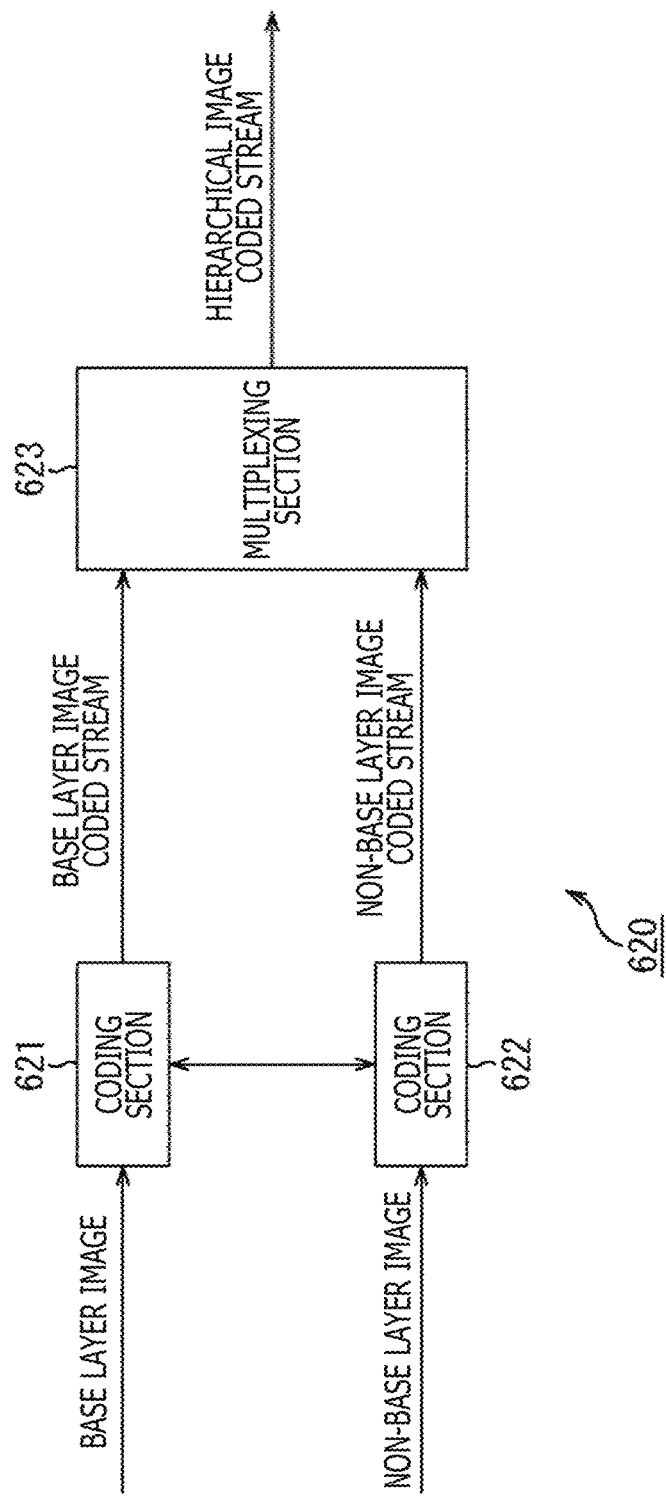
FIG. 24 illustrates an example of a configuration of a hierarchical image encoding device to which the present disclosure is applied.

FIG. 24 illustrates a hierarchical image encoding device in a hierarchical image coding/decoding system that perform coding/decoding of hierarchical images described above. As illustrated in FIG. 24, a hierarchical image encoding device 620 has a coding section 621, a coding section 622, and a multiplexing section 623.

The coding section 621 codes base layer images and generates a base layer image coded stream. The coding section 622 codes non-base layer images and generates a non-base layer image coded stream. The multiplexing section 623 multiplexes the base layer image coded stream generated by the coding section 621 with the non-base layer image coded stream generated by the coding section 622, and generates a hierarchical image coded stream.

Figure 25:
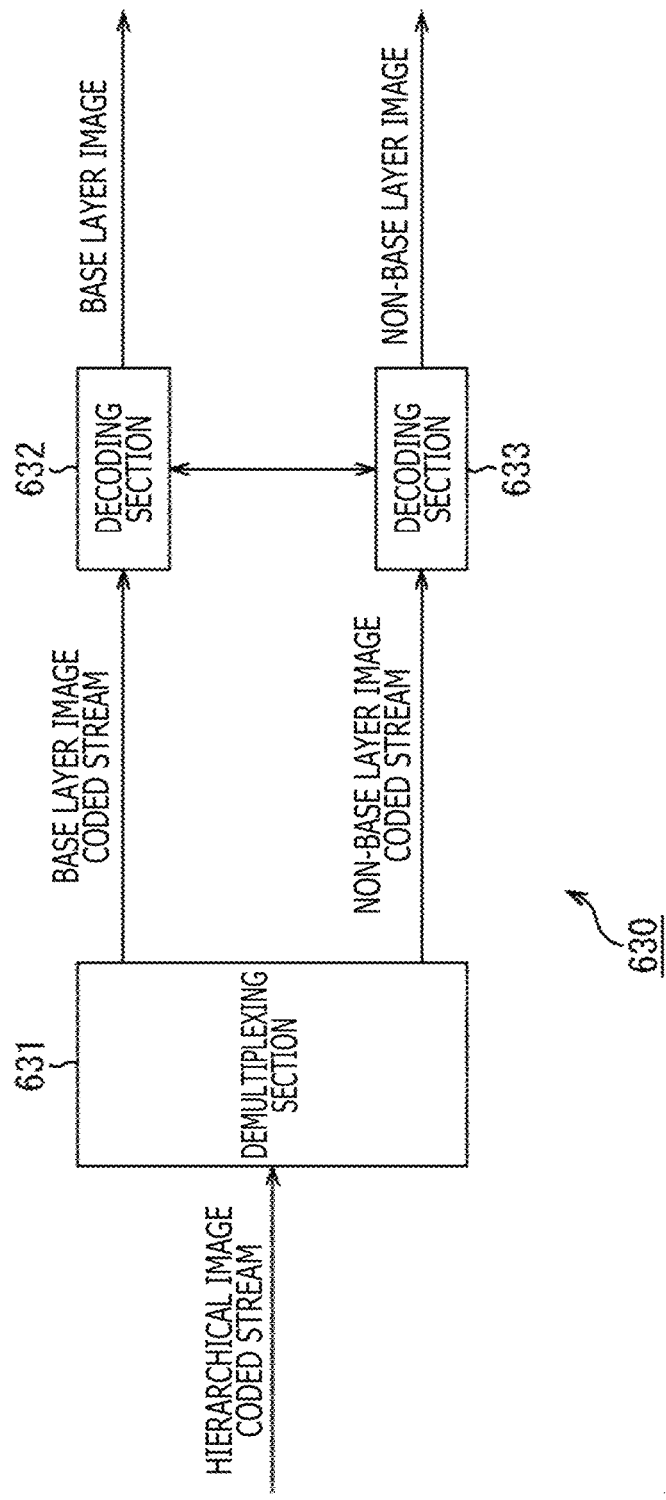
FIG. 25 illustrates an example of a configuration of a hierarchical image decoding device to which the present disclosure is applied.

FIG. 25 illustrates a hierarchical image decoding device that performs decoding of the hierarchical images described above. As illustrated in FIG. 25, a hierarchical image decoding device 630 has a demultiplexing section 631, a decoding section 632, and a decoding section 633.

The demultiplexing section 631 demultiplexes the hierarchical image coded stream obtained by multiplexing the base layer image coded stream with the non-base layer image coded stream, and extracts the base layer image coded stream and the non-base layer image coded stream. The decoding section 632 decodes the base layer image coded stream extracted by the demultiplexing section 631 and obtains the base layer images. The decoding section 633 decodes the non-base layer image coded stream extracted by the demultiplexing section 631 and obtains the non-base layer images.

For example, in such a hierarchical image coding/decoding system, the encoding device 11 described in each of the above embodiments may be applied as each of the coding sections 621 and 622 in the hierarchical image encoding device 620. This makes it possible to similarly apply the method described in each of the above embodiments to the coding of the hierarchical images. In other words, it is possible to improve performance at a time of performing special reproduction. In addition, for example, the decoding device 12 described in each of the above embodiments may be applied as each of the decoding sections 632 and 633 in the hierarchical image decoding device 630. This makes it possible to similarly apply the method described in each of the above embodiments to the decoding of the hierarchical image coded data. In other words, it is possible to improve performance at a time of performing special reproduction.

5. Fifth Embodiment (Computer)

A series of processes described above can be either executed by hardware or executed by software. When a series of processes is executed by software, a program constituting the software is installed into a computer. Here, types of the computer include a computer incorporated into dedicated hardware, a computer, for example, a general-purpose personal computer, capable of executing various functions by installing various programs into the computer, and the like.

Figure 26:
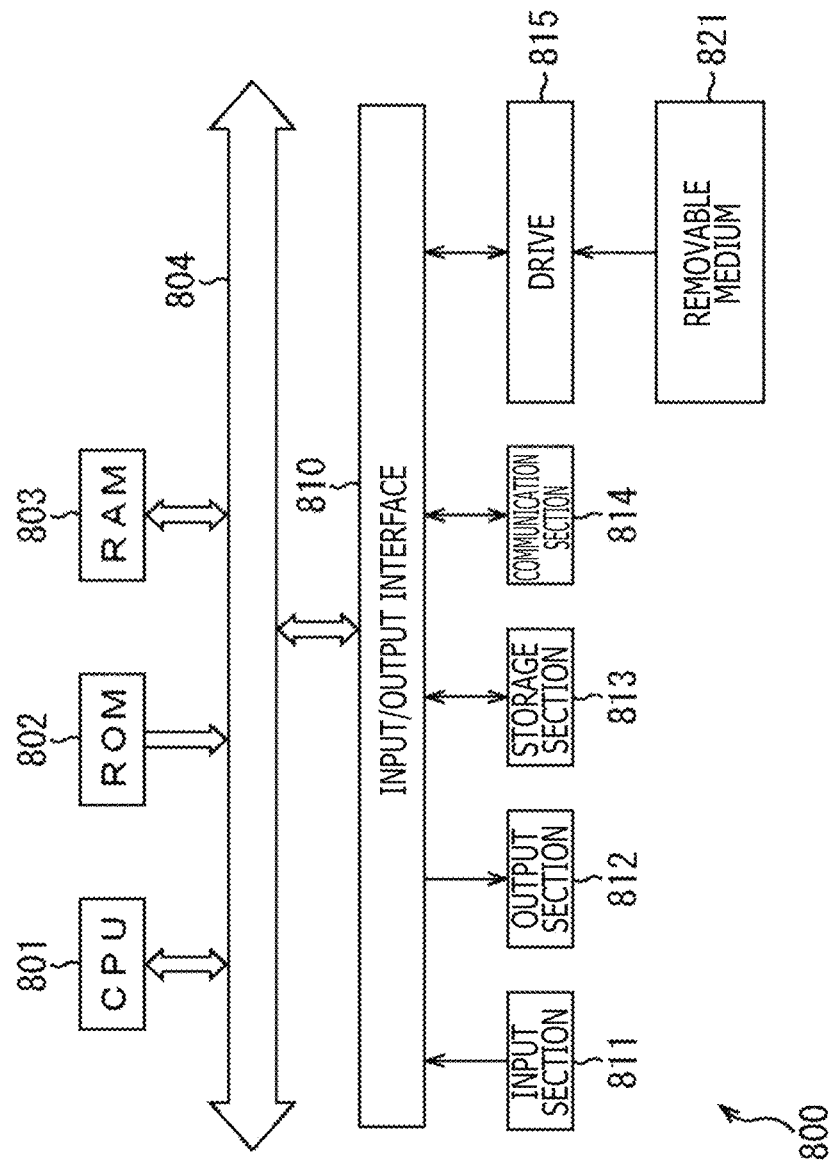
FIG. 26 is a block diagram illustrating an example of a configuration of computer hardware.

FIG. 26 is a block diagram illustrating an example of a configuration of the hardware of the computer executing a series of processes described above by a program.

In a computer 800 illustrated in FIG. 26, a CPU (Central Processing Unit) 801, a ROM (Read Only Memory) 802, and a RAM (Random Access Memory) 803 are mutually connected by a bus 804.

An input/output interface 810 is also connected to the bus 804. An input section 811, an output section 812, a storage section 813, a communication section 814, and a drive 815 are connected to the input/output interface 810.

The input section 811 is configured from a keyboard, a mouse, a microphone, a touch panel, an input terminal, and the like. The output section 812 is configured from a display, a loudspeaker, an output terminal, and the like. The storage section 813 is configured from a hard disk, a RAM disk, a nonvolatile memory, and the like. The communication section 814 is configured from a network interface and the like. The drive 815 drives a removable medium 821 such as a magnetic disk, an optical disk, a magneto-optical disk or a semiconductor memory.

In the computer configured as described above, the CPU 801 loads a program stored in, for example, the storage section 813 to the RAM 803 via the input/output interface 810 and the bus 804 and executes the program, whereby a series of processes described above is performed. The RAM 803 also stores data necessary for the CPU 801 to execute various processes, and the like.

The program executed by the computer (CPU 801) can be applied by, for example, recording the program in the removable medium 821 serving as a package medium or the like. In that case, the program can be installed into the storage section 813 via the input/output interface 810 by attaching the removable medium 821 to the drive 815.

Alternatively, the program can be provided via a wired or wireless transmission medium such as a local area network, the Internet, or a digital satellite service. In that case, the program can be received by the communication section 814 and installed into the storage section 813.

In another alternative, this program can be installed into the ROM 802 or the storage section 813 in advance.

6. Sixth Embodiment (Applications of Present Technique)

The encoding device 11 and the decoding device 12 according to the embodiments described above can be applied to various electronic devices such as a transmitter and a receiver in, for example, satellite broadcasting, wired broadcasting such as cable TV broadcasting, delivery on the Internet, and delivery to terminals by cellular communication, a recording device that records images into media such as an optical disc, a magnetic disc, and a flash memory, and a reproducing device that reproduces images from these storage media. Four application examples will be described below.

(First Application Example: Television Receiving Set)

Figure 27:
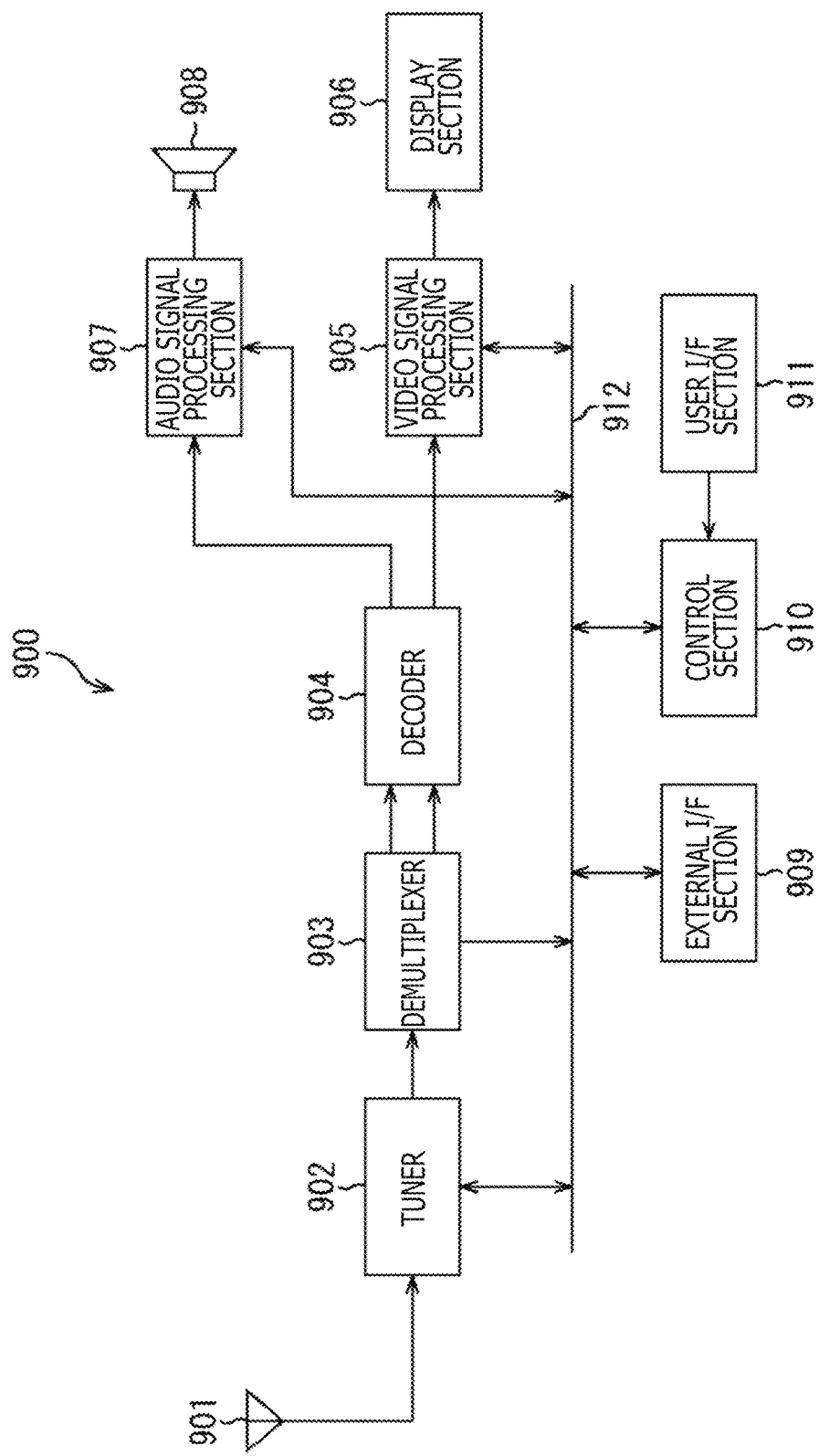
FIG. 27 illustrates an example of a schematic configuration of a television device to which the present disclosure is applied.

FIG. 27 illustrates an example of a schematic configuration of a television device to which the embodiments described above are applied. A television device 900 includes an antenna 901, a tuner 902, a demultiplexer 903, a decoder 904, a video picture signal processing section 905, a display section 906, an audio signal processing section 907, a loudspeaker 908, an external interface (I/F) section 909, a control section 910, a user interface (I/F) section 911, and a bus 912.

The tuner 902 extracts a signal in a desired channel from a broadcast signal received via the antenna 901, and demodulates the extracted signal. The tuner 902 then outputs a coded bit stream obtained by demodulation to the demultiplexer 903. In other words, the tuner 902 acts, in the television device 900, as a transmission section that receives a coded stream in which images are coded.

The demultiplexer 903 demultiplexes a video picture stream and an audio stream of a program to be viewed from the coded bit stream, and outputs the demultiplexed streams to the decoder 904. In addition, the demultiplexer 903 extracts auxiliary data such as an EPG (Electronic Program Guide) from the coded bit stream, and supplies the extracted data to the control section 910. It is noted that the demultiplexer 903 may descramble the coded bit stream in a case in which the coded bit stream is scrambled.

The decoder 904 decodes the video picture stream and the audio stream input from the demultiplexer 903. The decoder 904 outputs video picture data generated by a decoding process to the video picture signal processing section 905. The decoder 904 also outputs audio data generated by the decoding process to the audio signal processing section 907.

The video picture signal processing section 905 reproduces the video picture data input from the decoder 904, and causes the display section 906 to display video pictures. Furthermore, the video picture signal processing section 905 may cause the display section 906 to display an application screen supplied via a network. Moreover, the video picture signal processing section 905 may perform an additional process such as noise removal on the video picture data depending on a setting. Further, the video picture signal processing section 905 may generate an image of a GUI (Graphical User Interface) such as a menu, a button, or a cursor, and superimpose the generated image on output images.

The display section 906 is driven by a drive signal supplied from the video picture signal processing section 905, and displays video pictures or images on a video picture surface of a display device (for example, a liquid crystal display, a plasma display, or an OELD (Organic Electro Luminescence Display) (organic EL display)).

The audio signal processing section 907 performs a reproduction process such as D/A conversion or amplification on the audio data input from the decoder 904, and causes the loudspeaker 908 to output audio therefrom. Additionally, the audio signal processing section 907 may perform an additional process such as noise removal on the audio data.

The external interface section 909 is an interface that connects the television device 900 to an external device or the network. For example, the video picture stream or the audio stream received via the external interface section 909 may be decoded by the decoder 904. In other words, like the tuner 902, the external interface section 909 acts, in the television device 900, as a transmission section that receives the coded stream in which images are coded.

The control section 910 has a processor such as a CPU and memories such as a RAM and a ROM. The memories store a program executed by the CPU, program data, EPG data, and data acquired via the network. The program stored by the memories is read and executed by the CPU at a time of, for example, activating the television device 900. The CPU executes the program, thereby controlling operations performed by the television device 900 in response to an operation signal input from, for example, the user interface section 911.

The user interface section 911 is connected to the control section 910. The user interface section 911 has, for example, a button and a switch for a user to operate the television device 900, a receiving section that receives a remote control signal, and the like. The user interface section 911 detects user's operation via these constituent elements to generate the operation signal, and outputs the generated operation signal to the control section 910.

The bus 912 mutually connects the tuner 902, the demultiplexer 903, the decoder 904, the video picture signal processing section 905, the audio signal processing section 907, the external interface section 909, and the control section 910.

In the television device 900 in this way, the decoder 904 may have functions of the decoding device 12 described above. In other words, the decoder 904 may decode the coded data by the method described in each of the above embodiments. By doing so, the television device 900 can improve performance at a time of performing special reproduction.

Additionally, in the television device 900 configured in this way, the video picture signal processing section 905 may be able to, for example, code the image data supplied from the decoder 904 and output the obtained coded data to outside of the television device 900 via the external interface section 909. In addition, the video picture signal processing section 905 may have functions of the encoding device 11 described above. In other words, the video picture signal processing section 905 may code the image data supplied from the decoder 904 by the method described in each of the above embodiments. By doing so, the television device 900 can improve performance at a time of performing special reproduction.

(Second Application Example: Cellular Telephone)

Figure 28:
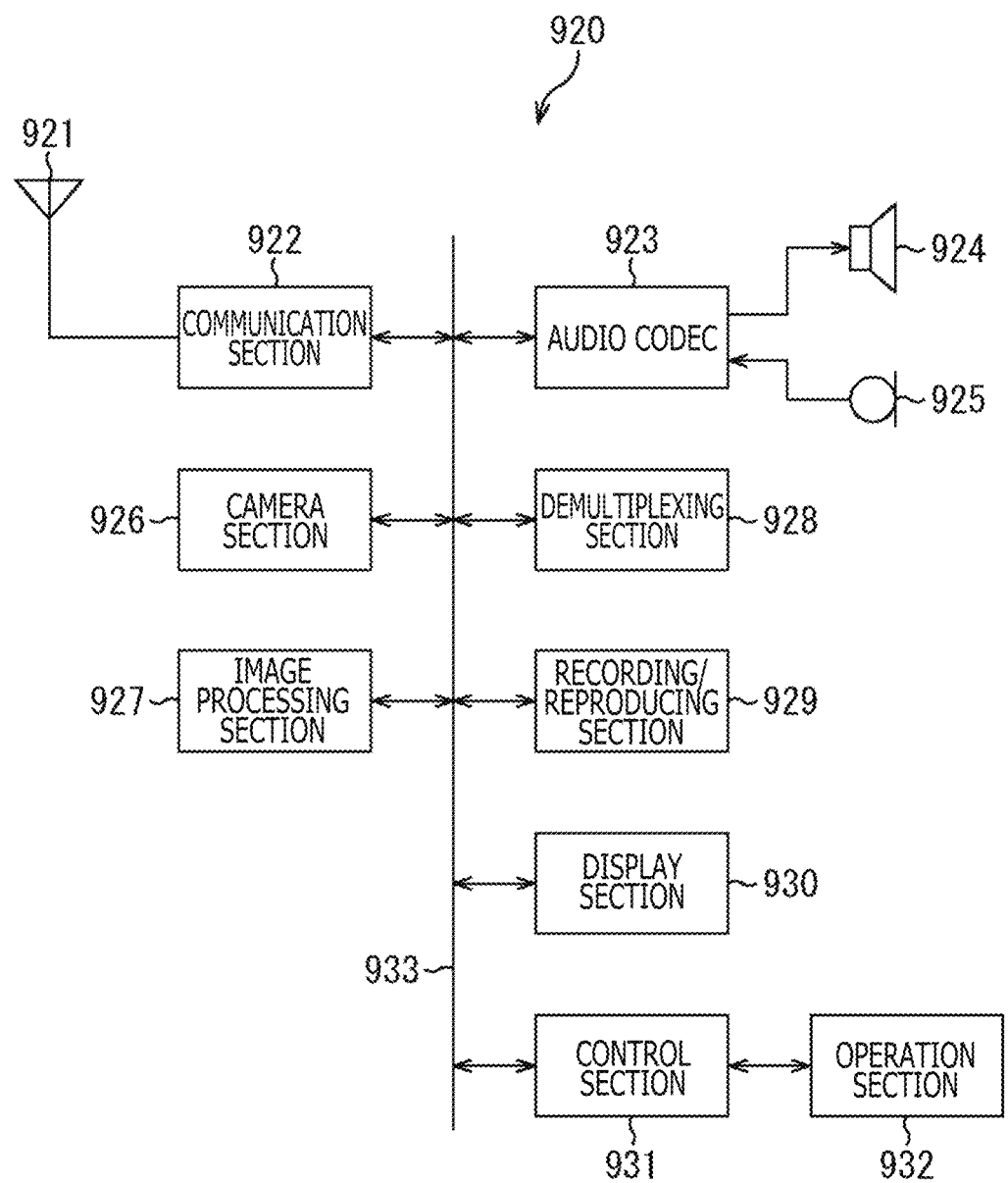
FIG. 28 illustrates an example of a configuration of a cellular telephone to which the present disclosure is applied.

FIG. 28 illustrates an example of a schematic configuration of a cellular telephone to which the embodiments described above are applied. The cellular telephone 920 includes an antenna 921, a communication section 922, an audio codec 923, a loudspeaker 924, a microphone 925, a camera section 926, an image processing section 927, a demultiplexing section 928, a recording/reproducing section 929, a display section 930, a control section 931, an operation section 932, and a bus 933.

The antenna 921 is connected to the communication section 922. The loudspeaker 924 and the microphone 925 are connected to the audio codec 923. The operation section 932 is connected to the control section 931. The bus 933 mutually connects the communication section 922, the audio codec 923, the camera section 926, the image processing section 927, the demultiplexing section 928, the recording/reproducing section 929, the display section 930, and the control section 931.

The cellular telephone 920 performs operations such as transmission and reception of audio signals, transmission and reception of electronic mail or image data, capturing of images, and recording of data in various operation modes that include a voice call mode, a data communication mode, a photographing mode, and a video telephone mode.

In the voice call mode, an analog audio signal generated by the microphone 925 is supplied to the audio codec 923. The audio codec 923 converts the analog audio signal into audio data, and performs A/D conversion and compression on the resultant audio data. The audio codec 923 then outputs the compressed audio data to the communication section 922. The communication section 922 codes and modulates the audio data and generate a transmission signal. The communication section 922 then transmits the generated transmission signal to a base station (not depicted) via the antenna 921. Furthermore, the communication section 922 amplifies a radio signal received via the antenna 921, performs frequency-conversion on the amplified radio signal, and acquires a received signal. The communication section 922 then demodulates and decodes the received signal to generate audio data, and outputs the generated audio data to the audio codec 923. The audio codec 923 decompresses the audio data, performs D/A conversion on the resultant audio data, and generates an analog audio signal. The audio codec 923 then outputs the generated audio signal to the loudspeaker 924 to cause the loudspeaker 924 to output audio.

Furthermore, in the data communication mode, the control section 931, for example, generates character data that constitutes electronic mail in response to user's operation via the operation section 932. In addition, the control section 931 causes the display section 930 to display characters. In addition, the control section 931 generates electronic mail data in response to user's transmission instruction via the operation section 932, and outputs the generated electronic mail data to the communication section 922. The communication section 922 codes and modulates the electronic mail data and generates a transmission signal. The communication section 922 then transmits the generated transmission signal to a base station (not depicted) via the antenna 921. Furthermore, the communication section 922 amplifies a radio signal received via the antenna 921, performs frequency-conversion on the amplified radio signal, and acquires a received signal. The communication section 922 then demodulates and decodes the received signal to decode the electronic mail data, and outputs the decoded electronic mail data to the control section 931. The control section 931 controls the display section 930 to display a content of the electronic mail, and supplies the electronic mail data to the recording/reproducing section 929 to cause the recording/reproducing section 929 to write the electronic mail data into a storage medium of the recording/reproducing section 929.

The recording/reproducing section 929 has an arbitrary storage medium from and to which data can be read and written. For example, the storage medium may be a built-in storage medium such as a RAM or a flash memory, or may be an external storage medium such as a hard disc, a magnetic disc, a magneto-optical disc, a USB (Universal Serial Bus) memory, or a memory card.

Furthermore, in the photographing mode, the camera section 926, for example, images a subject to generate image data, and outputs the generated image data to the image processing section 927. The image processing section 927 codes the image data input from the camera section 926, supplies a coded stream to the recording/reproducing section 929, and causes the recording/reproducing section 929 to write the coded stream to the storage medium thereof.

Moreover, in an image display mode, the recording/reproducing section 929 reads the coded stream recorded in the storage medium and outputs the coded stream to the image processing section 927. The image processing section 927 decodes the coded stream input from the recording/reproducing section 929, supplies image data to the display section 930, and causes the display section 930 to display images of the image data.

Furthermore, in the video telephone mode, the demultiplexing section 928, for example, multiplies the video picture stream coded by the image processing section 927 with the audio stream input from the audio codec 923, and outputs a multiplexed stream to the communication section 922. The communication section 922 codes and modulates the stream and generates a transmission signal. The communication section 922 then transmits the generated transmission signal to the base station (not depicted) via the antenna 921. Furthermore, the communication section 922 amplifies a radio signal received via the antenna 921, performs frequency-conversion on the amplified radio signal, and acquires a received signal. The transmission signal and the received signal may contain coded bit streams. The communication section 922 then demodulates and decodes the received signal to decode the stream, and outputs the decoded stream to the demultiplexing section 928. The demultiplexing section 928 demultiplexes the input stream into the video picture stream and the audio stream, outputs the video picture stream to the image processing section 927, and outputs the audio stream to the audio codec 923. The image processing section 927 decodes the video picture stream and generates video picture data. The video picture data is supplied to the display section 930 and the display section 930 displays a series of images. The audio codec 923 decompresses the audio stream, performs D/A conversion on the decompressed audio stream, and generates an analog audio signal. The audio codec 923 then supplies the generated audio signal to the loudspeaker 924 to cause the loudspeaker 924 to output audio therefrom.

In the cellular telephone 920 configured in this way, the image processing section 927, for example, may have the functions of the encoding device 11 described above. In other words, the image processing section 927 may code the image data by the method described in each of the above embodiments. By doing so, the cellular telephone 920 can improve performance at a time of performing special reproduction.

Furthermore, in the cellular telephone 920 configured in this way, the image processing section 927, for example, may have the functions of the decoding device 12 described above. In other words, the image processing section 927 may decode the coded data by the method described in each of the above embodiments. By doing so, the cellular telephone 920 can improve performance at a time of performing special reproduction.

(Third Application Example: Recording/Reproducing Device)

Figure 29:
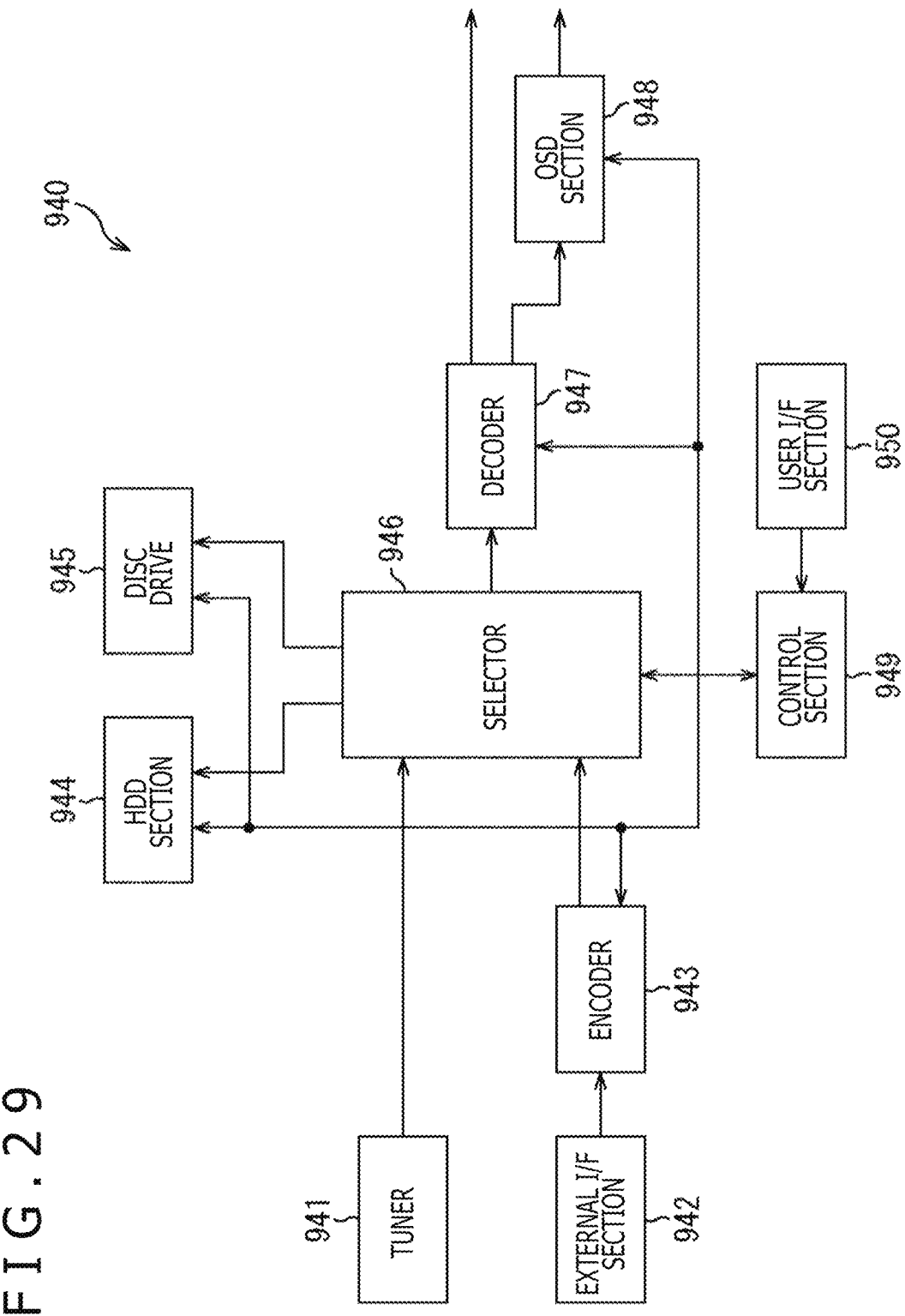
FIG. 29 illustrates an example of a configuration of a recording/reproducing device to which the present disclosure is applied.

FIG. 29 illustrates an example of a schematic configuration of a recording/reproducing device to which the embodiments described above are applied. A recording/reproducing device 940 codes, for example, audio data and video picture data regarding a received broadcast program, and records the coded audio data and the coded video picture data in a recording medium. Further, the recording/reproducing device 940 may code, for example, audio data and video picture data acquired from another device, and record the coded audio data and the coded video picture data in the recording medium. Moreover, the recording/reproducing device 940 reproduces, for example, data recorded in the recording medium on a monitor and a loudspeaker in response to a user's instruction. At this time, the recording/reproducing device 940 decodes the audio data and the video picture data.

The recording/reproducing device 940 includes a tuner 941, an external interface (I/F) section 942, an encoder 943, an HDD (Hard Disk Drive) section 944, a disc drive 945, a selector 946, a decoder 947, an OSD (On-Screen Display) section 948, a control section 949, and a user interface (I/F) section 950.

The tuner 941 extracts a signal in a desired channel from a broadcast signal received via an antenna (not depicted), and demodulates the extracted signal. The tuner 941 then outputs a coded bit stream obtained by demodulation to the selector 946. In other words, the tuner 941 acts as a transmission section in the recording/reproducing device 940.

The external interface section 942 is an interface that connects the recording/reproducing device 940 to an external device or a network. The external interface section 942 may be, for example, an IEEE (Institute of Electrical and Electronic Engineers) 1394 interface, a network interface, a USB interface, or a flash memory interface. For example, video picture data and audio data received via the external interface section 942 are input to the encoder 943. In other words, the external interface section 942 acts as the transmission section in the recording/reproducing device 940.

The encoder 943 codes the video picture data and the audio data input from the external interface section 942 in a case in which the video picture data and the audio data are not coded. The encoder 943 then outputs a coded bit stream to the selector 946.

The HDD section 944 records the coded bit stream in which content data regarding video pictures, audio, and the like is compressed, various programs, and other data in an internal hard disc. In addition, the HDD section 944 reads these pieces of data from the hard disc at a time of reproducing the video pictures and the audio.

The disc drive 945 records and reads data in and from a recording medium attached thereto. The recording medium attached to the disc drive 945 may be, for example, a DVD (Digital Versatile Disc) disc (DVD-Video, DVD-RAM (DVD-Random Access Memory), DVD-R (DVD-Recordable), DVD-RW (DVD-Rewritable), DVD+R (DVD+Recordable), DVD+RW (DVD+Rewritable), or the like), or may be a Blu-ray (registered trademark) disc.

At a time of recording the video pictures and the audio, the selector 946 selects the coded bit stream input from the tuner 941 or the encoder 943, and outputs the selected coded bit stream to the HDD 944 or the disc drive 945. Furthermore, at a time of reproducing the video pictures and the audio, the selector 946 outputs the coded bit stream input from the HDD 944 or the disc drive 945 to the decoder 947.

The decoder 947 decodes the coded bit stream and generates video picture data and audio data. The decoder 947 then outputs the generated video picture data to the OSD section 948. In addition, the decoder 947 outputs the generated audio data to an external loudspeaker.

The OSD section 948 reproduces the video picture data input from the decoder 947 and displays video pictures. Additionally, the OSD section 948 may superimpose an image of a GUI such as a menu, a button, or a cursor on the video pictures to be displayed.

The control section 949 has a processor such as a CPU and memories such as a RAM and a ROM. The memories store a computer program executed by the CPU, program data, and the like. The program stored by the memories is read and executed by the CPU at a time of, for example, activating the recording/reproducing device 940. The CPU executes the program, thereby controlling operations of the recording/reproducing device 940 in response to an operation signal input from, for example, the user interface section 950.

The user interface section 950 is connected to the control section 949. The user interface section 950 has, for example, a button and a switch for a user to operate the recording/reproducing device 940, a receiving section that receives a remote control signal, and the like. The user interface section 950 detects user's operation via these constituent elements to generate the operation signal, and outputs the generated operation signal to the control section 949.

In the recording/reproducing device 940 configured in this way, the encoder 943 may have the functions of the encoding device 11 described above. In other words, the encoder 943 may code the image data by the method described in each of the above embodiments. By doing so, the recording/reproducing device 940 can improve performance at a time of performing special reproduction.

Furthermore, in the recording/reproducing device 940 configured in this way, the decoder 947, for example, may have the functions of the decoding device 12 described above. In other words, the decoder 947 may decode the coded data by the method described in each of the above embodiments. By doing so, the recording/reproducing device 940 can improve performance at a time of performing special reproduction.

(Fourth Application Example: Imaging Device)

Figure 30:
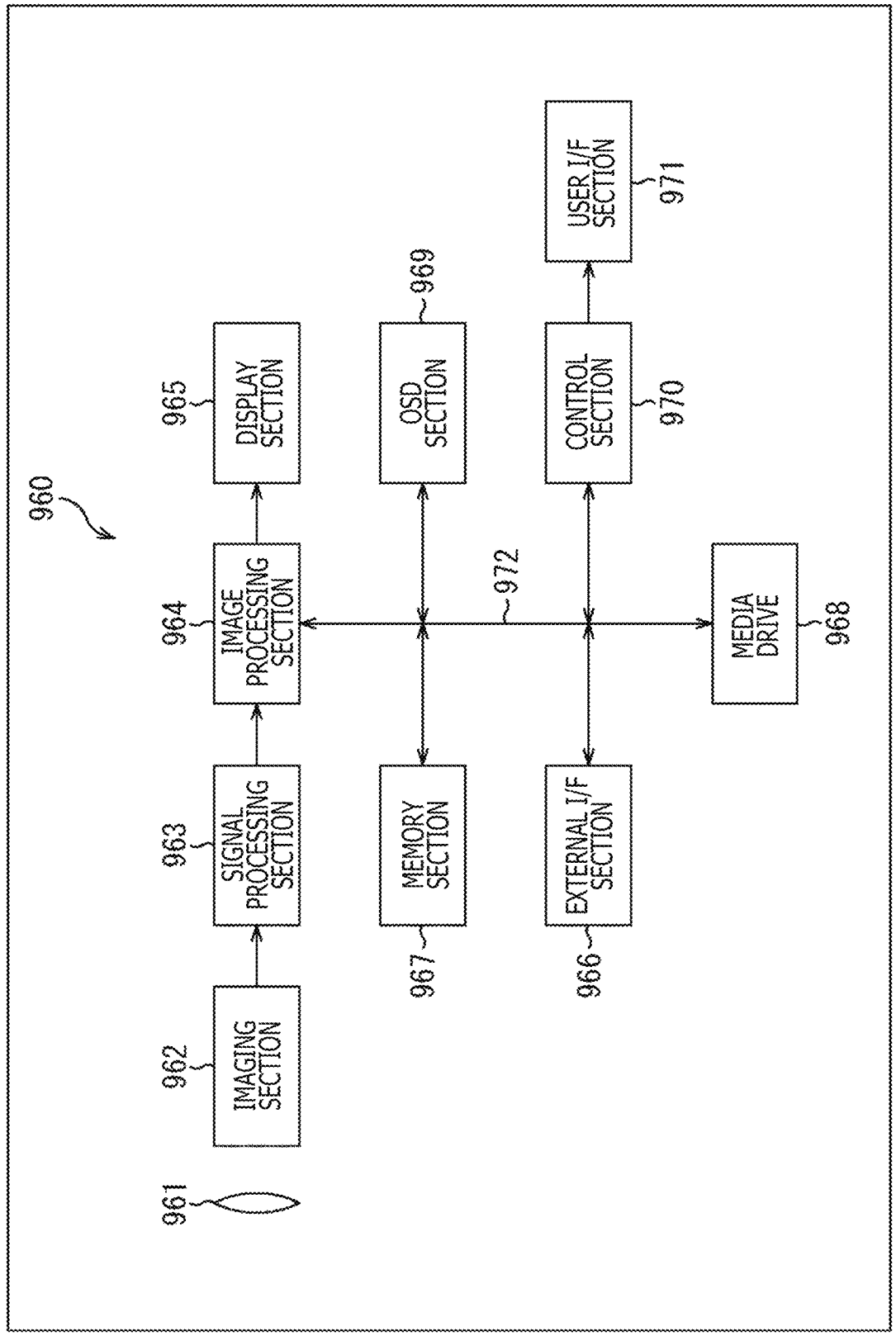
FIG. 30 illustrates an example of a configuration of an imaging device to which the present disclosure is applied.

FIG. 30 illustrates an example of a schematic configuration of an imaging device to which the embodiments described above are applied. An imaging device 960 images a subject to generate an image, codes image data, and records the image data in a recording medium.

The imaging device 960 includes an optical block 961, an imaging section 962, a signal processing section 963, an image processing section 964, a display section 965, an external interface (I/F) section 966, a memory section 967, a media drive 968, an OSD section 969, a control section 970, a user interface (I/F) section 971, and a bus 972.

The optical block 961 is connected to the imaging section 962. The imaging section 962 is connected to the signal processing section 963. The display section 965 is connected to the image processing section 964. The user interface section 971 is connected to the control section 970. The bus 972 mutually connects the image processing section 964, the external interface section 966, the memory section 967, the media drive 968, the OSD section 969, and the control section 970.

The optical block 961 has a focus lens, a diaphragm mechanism, and the like. The optical block 961 forms an optical image of the subject on an imaging surface of the imaging section 962. The imaging section 962 has an image sensor such as a CCD (Charge Coupled Device) or a CMOS (Complementary Metal Oxide Semiconductor), and converts the optical image formed on the imaging surface into an image signal as an electrical signal by photoelectric conversion. The imaging section 962 then outputs the image signal to the signal processing section 963.

The signal processing section 963 performs various camera signal processes such as knee correction, gamma correction, and color correction on the image signal input from the imaging section 962. The signal processing section 963 outputs image data having been subjected to the camera signal processes to the image processing section 964.

The image processing section 964 codes the image data input from the signal processing section 963 and generates coded data. The image processing section 964 then outputs the generated coded data to the external interface section 966 or the media drive 968. In addition, the image processing section 964 decodes coded data input from the external interface section 966 or the media drive 968 and generate image data. The image processing section 964 then outputs the generated image data to the display section 965. Moreover, the image processing section 964 may output the image data input from the signal processing section 963 to the display section 965 to cause the display section 965 to display images. Further, the image processing section 964 may superimpose display data acquired from the OSD section 969 on the images to be output to the display section 965.

The OSD section 969 generates an image of a GUI such as a menu, a button, or a cursor, and outputs the generated image to the image processing section 964.

The external interface section 966 is configured as, for example, a USB input/output terminal. The external interface section 966 connects the imaging device 960 to a printer at a time of, for example, printing an image. Furthermore, a drive is connected to the external interface section 966 as needed. For example, a removable medium such as a magnetic disc or an optical disc is attached to the drive, a program read from the removable medium can be installed into the imaging device 960. Moreover, the external interface section 966 may be configured as a network interface connected to a network such as a LAN or the Internet. In other words, the external interface section 966 acts as a transmission section in the imaging device 960.

A recording medium attached to the media drive 968 may be an arbitrary removable medium from and to which data can be read and written such as a magnetic disc, a magneto-optical disc, an optical disc, or a semiconductor memory. Furthermore, the recording medium may be fixedly attached to the media drive 968, and may configure a non-portable storage section such as a built-in hard disc drive or an SSD (Solid State Drive).

The control section 970 has a processor such as a CPU and memories such as a RAM and a ROM. The memories store a computer program executed by the CPU, program data, and the like. The program stored by the memories is read and executed by the CPU at a time of, for example, activating the imaging device 960. The CPU executes the program, thereby controlling operations of the imaging device 960 in response to an operation signal input from, for example, the user interface section 971.

The user interface section 971 is connected to the control section 970. The user interface section 971 has, for example, a button and a switch for a user to operate the imaging device 960. The user interface section 971 detects user's operation via these constituent elements to generate the operation signal, and outputs the generated operation signal to the control section 970.

In the imaging device 960 configured in this way, the image processing section 964, for example, may have the functions of the encoding device 11 described above. In other words, the image processing section 964 may code the image data by the method described in each of the above embodiments. By doing so, the imaging device 960 can improve performance at a time of performing special reproduction.

Furthermore, in the imaging device 960 configured in this way, the image processing section 964, for example, may have the functions of the decoding device 12 described above. In other words, the image processing section 964 may decode the coded data by the method described in each of the above embodiments. By doing so, the imaging device 960 can improve performance at a time of performing special reproduction.

7. Seventh Embodiment (Other Application Examples)

It is noted that the present technique can be also applied to HTTP streaming under, for example, MPEG-DASH for selecting appropriate coded data from among a plurality of pieces of coded data prepared in advance and different in resolution and the like in units of segments and using the selected coded data. In other words, it is possible to share information associated with coding and decoding among such a plurality of pieces of coded data.

Furthermore, while the examples of the devices, the systems, and the like to which the present technique is applied have been described so far, the present technique is not limited to these examples but can be carried out as all configurations mounted to such a device or a device configuring such a system. For example, the present technique can be carried out as a processor serving as a system LSI (Large Scale Integration), a module using a plurality of processors or the like, a unit using a plurality of modules or the like, a set to which other functions are further added to the unit (that is, configuration of part of a device).

(Video Set)

Figure 31:
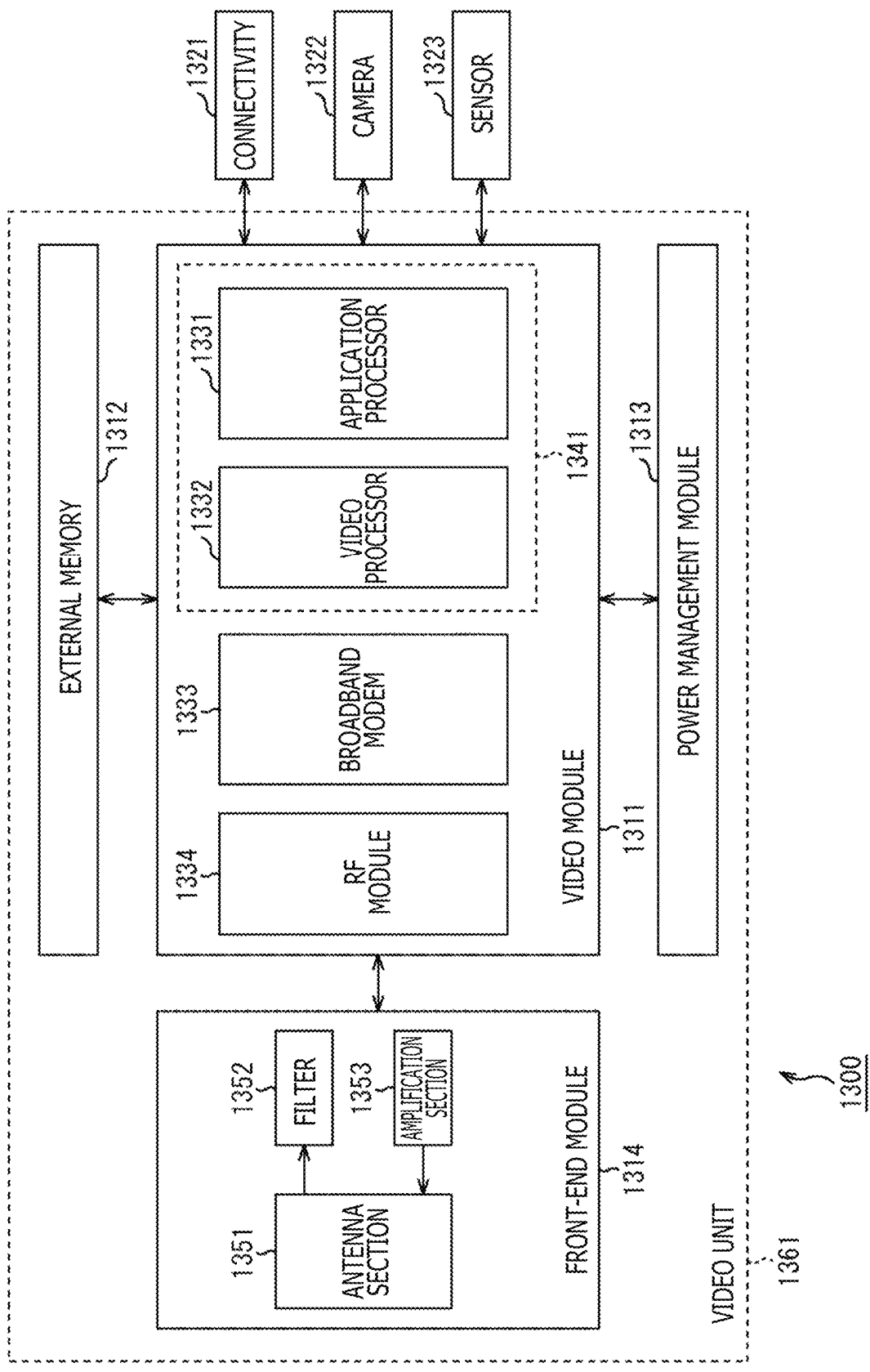
FIG. 31 illustrates an example of a schematic configuration of a video set to which the present disclosure is applied.

An example in a case of carrying out the present technique as a set will be described with reference to FIG. 31. FIG. 31 illustrates an example of a schematic configuration of a video set to which the present technique is applied.

Recently, multi-functioning of electronic devices has been underway. In a case of carrying out configurations of part of the multi-functional electronic devices by selling, providing, or the like in the course of development and manufacturing of the electronic devices, not only a configuration having one function but also a combination of a plurality of configurations having associated functions have been carried out as one set having a plurality of functions in many cases.

A video set 1300 illustrated in FIG. 31 has such a multi-functional configuration and is a combination of a device having functions related to (one of or both of) coding and decoding of images and a device having other functions associated with the functions.

As illustrated in FIG. 31, the video set 1300 has a module group including a video module 1311, an external memory 1312, a power management module 1313, a front-end module 1314, and the like, and a device having associated functions such as a connectivity 1321, a camera 1322, and a sensor 1323.

A module is an assembly of some partial functions associated with one another and provided as a component having cohesive functions. While the module has an arbitrary, specific physical configuration, the configuration such that, for example, a plurality of processors, electronic circuit elements such as a resistor and a capacitor, other devices, and the like are disposed on an interconnection substrate or the like and integrated is conceivable. Furthermore, a configuration such that other modules, processors, and the like are combined with the module to provide a new module is conceivable.

In a case of the example of FIG. 31, the video module 1311 is a combination of configurations having functions related to image processing, and has an application processor, a video processor, a broadband modem 1333, and an RF module 1334.

The processors are each obtained by integrating configurations having a predetermined function on a semiconductor chip by SoC (System On a Chip), and include, for example, a processor referred to as LSI (Large Scale Integration) or the like. The configurations having this predetermined function may be a logical circuit (hardware configuration), a CPU, a ROM, a RAM, and the like as well as a program (software configuration) executed using these elements, or may be a combination of both the hardware configuration and the software configuration. For example, each processor may have a logical circuit, a CPU, a ROM, a RAM, and the like, part of functions may be realized by a logical circuit (hardware configuration), and the other functions may be realized by a program (software configuration) executed by the CPU.

The application processor 1331 of FIG. 31 is a processor that executes an application related to the image processing. The application executed in this application processor 1331 can not only perform a computation process but also control the configurations such as the video processor 1332 inside or outside of the video module 1311 as needed.

The video processor 1332 is a processor having functions related to (one of or both of) image coding and decoding.

The broadband modem 1333 converts data (a digital signal) transmitted by either wired or wireless (or both wired and wireless) broadband communication held via a broadband line such as the Internet or a public telephone line network into an analog signal by digital modulation or the like, and demodulates an analog signal received by the broadband communication to convert the analog signal into data (a digital signal). The broadband modem 1333 processes arbitrary information including, for example, image data processed by the video processor 1332, a stream in which image data is coded, an application program, and setting data.

The RF module 1334 is a module that performs frequency conversion, modulation/demodulation, amplification, a filter process, and the like on RF (Radio Frequency) signals transmitted and received via an antenna. For example, the RF module 1334 performs frequency conversion or the like on a baseband signal generated by the broadband modem 1333 to generate an RF signal. Further, for example, the RF module 1334 performs frequency conversion or the like on an RF signal received via the front-end module 1314 to generate a baseband signal.

As indicated by a dotted line 1341 in FIG. 31, the application processor 1331 and the video processor 1332 may be integrated to be configured as one processor.

The external memory 1312 is a module that is provided outside of the video module 1311 and that is used by the video module 1311. A storage device of this external memory 1312 may be realized by any physical configuration but is desirably realized by a relatively inexpensive, large-capacity semiconductor memory, for example, a DRAM (Dynamic Random Access Memory) since the storage device is normally, often used to store large-capacity data such as image data in units of frames.

The power management module 1313 manages and controls supply of electric power to the video module 1311 (each configuration within the video module 1311).

The front-end module 1314 is a module that provides a front-end function (a circuit on an antenna-side transmission and reception terminal) to the RF module 1334. As illustrated in FIG. 31, the front-end module 1314 has, for example, an antenna section 1351, a filter 1352, and an amplification section 1353.

The antenna section 1351 has an antenna that transmits and receives radio signals and configurations peripheral therefor. The antenna section 1351 transmits a signal supplied from the amplification section 1353 as a radio signal, and supplies a received radio signal to the filter 1352 as an electrical signal (RF signal). The filter 1352 performs a filter process or the like on an RF signal received via the antenna section 1351, and supplies the processed RF signal to the RF module 1334. The amplification section 1353 amplifies an RF signal supplied from the RF module 1334 and supplies the resultant RF signal to the antenna section 1351.

The connectivity 1321 is a module that has a function related to connection to outside. A physical configuration of the connectivity 1321 is an arbitrary one. For example, the connectivity 1321 has a configuration having a communication function other than communication standards to which the broadband modem 1333 conforms, an external input/output terminal, and the like.

For example, the connectivity 1321 may have a module having a communication function conforming to radio communication standards such as Bluetooth (registered trademark), IEEE 802.11 (for example, Wi-Fi (Wireless Fidelity, registered trademark)), NFC (Near Field Communication), or IrDA (InfraRed Data Association), and an antenna and the like transmitting and receiving signals conforming to the standards. Furthermore, for example, the connectivity 1321 may have a module having a communication function conforming to wired communication standards such as a USB (Universal Serial Bus), an HDMI (registered trademark) (High-Definition Multimedia Interface), or the like, and a terminal conforming to the standards. Moreover, for example, the connectivity 1321 may have other data (signal) transmission function and the like such as analog signal input/output terminals.

The connectivity 1321 may include a device of a data (signal) transmission destination. For example, the connectivity 1321 may have a drive (which may include not only a removable media drive but also a hard disc, an SSD (Solid State Drive), a NAS (Network Attached Storage), and the like) for reading and writing data from and to a recording medium such as a magnetic disc, an optical disc, a magneto-optical disc, or a semiconductor memory. Furthermore, the connectivity 1321 may have image or audio output devices (a monitor, a loudspeaker, and the like).

The camera 1322 is a module that has functions to image a subject and to obtain image data regarding the subject. The image data obtained by imaging by the camera 1322 is supplied to and coded by, for example, the video processor 1332.

The sensor 1323 is a module that has an arbitrary sensor function, for example, an audio sensor, an ultrasonic sensor, an optical sensor, an illuminance sensor, an infrared sensor, an image sensor, a rotation sensor, an angle sensor, an angular speed sensor, a speed sensor, an acceleration sensor, an inclination sensor, a magnetic identification sensor, an impact sensor, or a temperature sensor. Data detected by the sensor 1323 is supplied to, for example, the application processor 1331 and used by the application or the like.

The configurations described so far as modules may be realized as processors, and conversely, the configurations described as processors may be realized as modules.

In the video set 1300 configured as described above, the present technique can be applied to the video processor 1332 as described later. Therefore, the video set 1300 can be carried out as a set to which the present technique is applied.

<Configuration of Video Processor>

Figure 32:
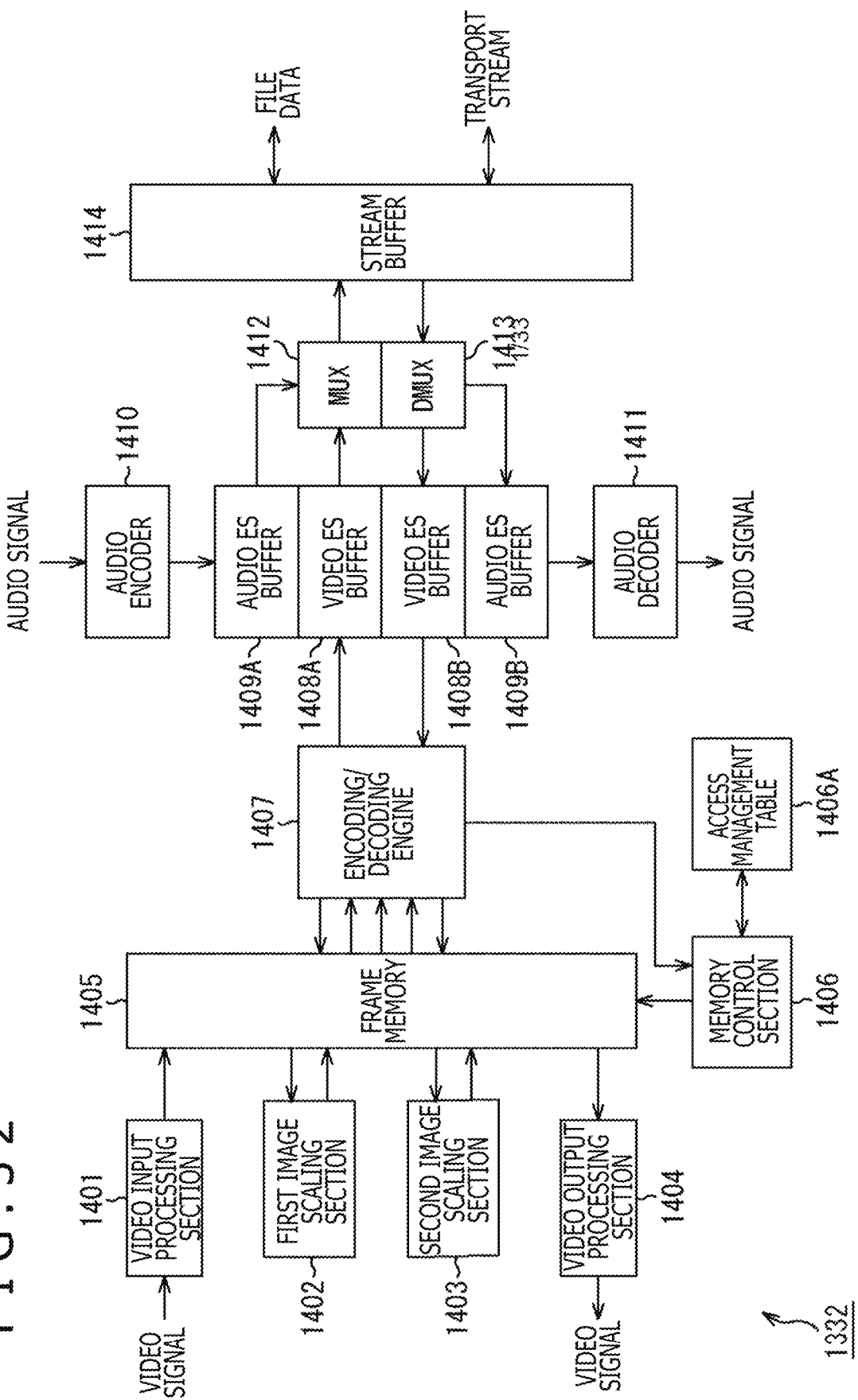
FIG. 32 illustrates an example of a schematic configuration of a video processor to which the present disclosure is applied.

FIG. 32 illustrates an example of a schematic configuration of the video processor 1332 (FIG. 31) to which the present technique is applied.

In a case of this example, the video processor 1332 has a function to which a video signal and an audio signal are input and which codes these signals by a predetermined scheme, and a function to decode the coded video data and the coded audio data and to reproduce and output the video signal and the audio signal.

As illustrated in FIG. 32, the video processor 1332 has a video input processing section 1401, a first image scaling section 1402, a second image scaling section 1403, a video output processing section 1404, a frame memory 1405, and a memory control section 1406. The video processor 1332 also has an encoding/decoding engine 1407, video ES (elementary Stream) buffers 1408A and 1408B, and audio ES buffers 1409A and 1409B. The video processor 1332 further has an audio encoder 1410, an audio decoder 1411, a multiplexing section (MUX (Multiplexer)) 1412, a demultiplexing section (DMUX (Demultiplexer)) 1413, and a stream buffer 1414.

The video input processing section 1401 acquires a video signal input from, for example, the connectivity 1321 (FIG. 31), and converts the video signal into digital image data. The first image scaling section 1402 performs format conversion, an image scaling process, and the like on the image data. The second image scaling section 1403 performs an image scaling process on the image data in response to a format conforming to an output destination to which the image data is output via the video output processing section 1404, and performs format conversion, the image scaling process, and the like similar to those performed by the first image scaling section 1402. The video output processing section 1404 performs format conversion, digital-to-analog signal conversion, and the like on the image data, and outputs the resultant image data to, for example, the connectivity 1321 or the like as a reproduced video signal.

The frame memory 1405 is an image data memory shared among the video input processing section 1401, the first image scaling section 1402, the second image scaling section 1403, the video output processing section 1404, and the encoding/decoding engine 1407. The frame memory 1405 is realized as, for example, a semiconductor memory such as a DRAM.

The memory control section 1406 receives a synchronous signal from the encoding/decoding engine 1407, and controls, in response to the synchronous signal, write/read access to the frame memory 1405 in accordance with a schedule of access to the frame memory 1405 written in an access management table 1406A. The access management table 1406A is updated by the memory control section 1406 in response to processes executed by the encoding/decoding engine 1407, the first image scaling section 1402, the second image scaling section 1403, and the like.

The encoding/decoding engine 1407 performs an encoding process on the image data and a decoding process on a video stream that is data in which the image data is coded. For example, the encoding/decoding engine 1407 codes the image data read from the frame memory 1405, and sequentially writes the coded image data to the video ES buffer 1408A as a video stream. For example, the encoding/decoding engine 1407 also reads and decodes the video stream from the video ES buffer 1408B sequentially, and writes the decoded video stream to the frame memory 1405 as image data sequentially. The encoding/decoding engine 1407 uses the frame memory 1405 as a work area in the coding and decoding. Furthermore, the encoding/decoding engine 1407 outputs a synchronous signal to the memory control section 1406 at timing, for example, of starting a process per macroblock.

The video ES buffer 1408A buffers a video stream generated by the encoding/decoding engine 1407 and supplies the video stream to the multiplexing section (MUX) 1412. The video ES buffer 1408B buffers a video stream supplied from the demultiplexing section (DMUX) 1413 and supplies the video stream to the encoding/decoding engine 1407.

The audio ES buffer 1409A buffers an audio stream generated by the audio encoder 1410 and supplies the audio stream to the multiplexing section (MUX) 1412. The audio ES buffer 1409B buffers an audio stream supplied from the demultiplexing section (DMUX) 1413 and supplies the audio stream to the audio decoder 1411.

The audio encoder 1410 convers an audio signal input from, for example, the connectivity 1321 into a digital signal and codes the digital signal by a predetermined scheme such as MPEG audio scheme or AC3 (AudioCode number 3) scheme. The audio encoder 1410 sequentially writes an audio stream which is data in which the audio signals are coded to the audio ES buffer 1409A. The audio decoder 1411 decodes the audio stream supplied from the audio ES buffer 1409B, convers the decoded audio stream into, for example, analog signals, and supplies the analog signals to, for example, the connectivity 1321 as reproduced audio signals.

The multiplexing section (MUX) 1412 multiplexes the video stream with the audio stream. This multiplexing method (that is, a format of a bit stream generated by multiplexing) is an arbitrary method. In addition, the multiplexing section (MUX) 1412 can add predetermined header information and the like to the bit stream at a time of this multiplexing. In other words, the multiplexing section (MUX) 1412 can convert a format of the stream by multiplexing. For example, the multiplexing section (MUX) 1412 multiplexes the video stream with the audio stream, thereby converting the video stream and the audio stream into a transport stream that is a bit stream in a transfer format. Furthermore, for example, the multiplexing section (MUX) 1412 multiplexes the video stream with the audio stream, thereby converting the video stream and the audio stream into data (file data) in a recording file format.

The demultiplexing section (DMUX) 1413 demultiplexes the bit stream in which the video stream and the audio stream are multiplexed by a method corresponding to multiplexing by the multiplexing section (MUX) 1412. In other words, the demultiplexing section (DMUX) 1413 extracts the video stream and the audio stream from the bit stream read from the stream buffer 1414 (demultiplexes the bit stream into the video stream and the audio stream). In other words, the demultiplexing section (DMUX) 1413 can convert the format of the stream by demultiplexing (perform inverse conversion of conversion by the multiplexing section (MUX) 1412). For example, the demultiplexing section (DMUX) 1413 acquires a transport stream supplied from, for example, the connectivity 1321 or the broadband modem 1333 via the stream buffer 1414 and demultiplexes the transport stream, thereby making it possible to convert the transport stream into the video stream and the audio stream. Further, for example, the demultiplexing section (DMUX) 1413 acquires file data read from any of various recording media by, for example, the connectivity 1321 via the stream buffer 1414 and demultiplexes the file data, thereby making it possible to convert file data into the video stream and the audio stream.

The stream buffer 1414 buffers the bit stream. For example, the stream buffer 1414 buffers the transport stream supplied from the multiplexing section (MUX) 1412, and supplies the transport stream to, for example, the connectivity 1321 or the broadband modem 1333 at predetermined timing or on the basis of an external request or the like.

Furthermore, for example, the stream buffer 1414 buffers the file data supplied from the multiplexing section (MUX) 1412, supplies the file data to, for example, the connectivity 1321 at predetermined timing or on the basis of an external request or the like, and causes the file data to be recorded in any of various recording media.

Moreover, the stream buffer 1414 buffers the transport stream acquired via, for example, the connectivity 1321 or the broadband modem 1333, and supplies the transport stream to the demultiplexing section (DMUX) 1413 at predetermined timing or on the basis of an external request or the like.

Furthermore, the stream buffer 1414 buffers the file data read from any of various recording media by, for example, the connectivity 1321, and supplies the file data to the demultiplexing section (DMU) 1413 at predetermined timing or an external request or the like.

An example of operations of the video processor 1332 having such configurations will next be described. For example, video signals input to the video processor 1332 from the connectivity 1321 or the like are converted into digital image data conforming to a predetermined scheme such as 4:2:2Y/Cb/Cr scheme by the video input processing section 1401, and sequentially written to the frame memory 1405. This digital image data is read by the first image scaling section 1402 or the second image scaling section 1403, and subjected to format conversion to conform to a predetermined scheme such as 4:2:0Y/Cb/Cr scheme and subjected to a scaling process, and the resultant image data is written again to the frame memory 1405. This image data is coded by the encoding/decoding engine 1407 and written to the video ES buffer 1408A as a video stream.

Furthermore, the audio signals input to the video processor 1332 from the connectivity 1321 or the like are coded by the audio encoder 1410, and written to the audio ES buffer 1409A as an audio stream.

The video stream in the video ES buffer 1408A and the audio stream in the audio ES buffer 1409A are read and multiplexed by the multiplexing section (MUX) 1412, and converted into a transport stream, file data, or the like. The transport stream generated by the multiplexing section (MUX) 1412 is buffered by the stream buffer 1414 and then output to an external network via, for example, the connectivity 1321 or the broadband modem 1333. Furthermore, the file data generated by the multiplexing section (MUX) 1412 is buffered by the stream buffer 1414, is then output to, for example, the connectivity 1321, and recorded in any of various recording media.

Moreover, the transport stream input from the external network to the video processor 1332 via, for example, the connectivity 1321 or the broadband modem 1333 is buffered by the stream buffer 1414 and then demultiplexed by the demultiplexing section (DMUX) 1413. Furthermore, the file data read from any of various recording media by, for example, the connectivity 1321 and input to the video processor 1332 is buffered by the stream buffer 1414 and then demultiplexed by the demultiplexing section (DMUX) 1413. In other words, the transport stream or the file data input to the video processor 1332 is demultiplexed into the video stream and the audio stream by the demultiplexing section (DMUX) 1413.

The audio stream is supplied to and decoded by the audio decoder 1411 via the audio ES buffer 1409B, and audio signals are reproduced. In addition, after being written to the video ES buffer 1408B, the video stream is sequentially read and decoded by the encoding/decoding engine 1407 and written to the frame memory 1405. The decoded image data is subjected to the scaling process by the second image scaling section 1403 and written to the frame memory 1405. The decoded image data is then read by the video output processing section 1404, subjected to format conversion into a format conforming to the predetermined scheme such as 4:2:2Y/Cb/Cr scheme and further converted into analog signals, and video signals are reproduced and output.

In a case of applying the present technique to the video processor 1332 configured in this way, the present technique according to each of the above embodiments may be applied to the encoding/decoding engine 1407. In other words, the encoding/decoding engine 1407 may have, for example, the functions of the encoding device 11 or the functions of the decoding device 12 described above or both of the functions thereof. By doing so, the video processor 1332 can obtain similar effects to those of the embodiments described with reference to FIGS. 1 to 19.

It is noted that in the encoding/decoding engine 1407, the present technique (that is, the functions of the encoding device 11 or the functions of the decoding device 12 or both of the functions thereof) may be realized by hardware such as a logical circuit, realized by software such as an incorporated program, or realized by both the hardware and the software.

<Another Example of Configuration of Video Processor>

Figure 33:
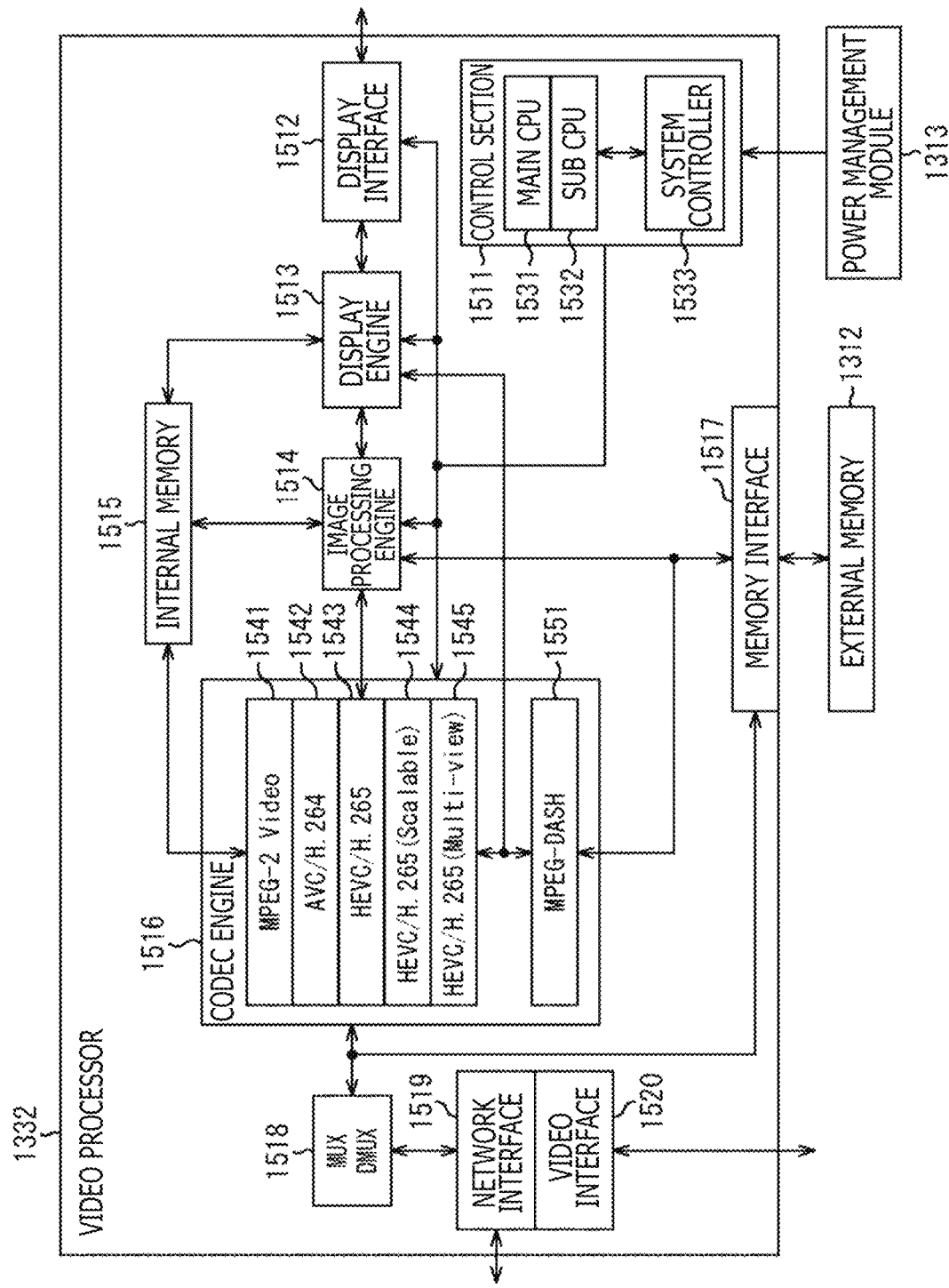
FIG. 33 illustrates another example of the schematic configuration of the video processor to which the present disclosure is applied.

FIG. 33 illustrates another example of the schematic configuration of the video processor 1332 to which the present technique is applied. In a case of the example of FIG. 33, the video processor 1332 has a function to code/decode video data by a predetermined scheme.

More specifically, as illustrated in FIG. 33, the video processor 1332 has a control section 1511, a display interface 1512, a display engine 1513, an image processing engine 1514, and an internal memory 1515. The video processor 1332 also has a codec engine 1516, a memory interface 1517, a multiplexing/demultiplexing section (MUX DMUX) 1518, a network interface 1519, and a video interface 1520.

The control section 1511 controls operations of the processing sections within the video processor 1332 such as the display interface 1512, the display engine 1513, the image processing engine 1514, and the codec engine 1516.

As illustrated in FIG. 33, the control section 1511 has, for example, a main CPU 1531, a sub CPU 1532, and a system controller 1533. The main CPU 1531 executes a program or the like for controlling the operations of the processing sections within the video processor 1332. The main CPU 1531 generates a control signal in accordance with the program or the like and supplies the control signal to the processing sections (that is, controls the operations of the processing sections). The sub CPU 1532 acts to assist the main CPU 1531. For example, the sub CPU 1532 executes a child process, a sub routine, or the like of the program or the like executed by the main CPU 1531. The system controller 1533 exercises control over operations of the main CPU 1531 and the sub CPU 1532 such as designation of the programs executed by the main CPU 1531 and the sub CPU 1532.

The display interface 1512 outputs image data to, for example, the connectivity 1321 under control of the control section 1511. For example, the display interface 1512 converts the image data that is digital data into analog signals, and outputs the analog signals to a monitor device or the like of the connectivity 1321 as reproduced video signals, or outputs the image data that is the digital data as it is.

The display engine 1513 performs various conversion processes such as format conversion, size conversion, and color gamut conversion on the image data to conform to hardware specifications of the monitor device or the like on which the images are displayed, under control of the control section 1511.

The image processing engine 1514 performs predetermined image processes such as a filter process for improving an image quality on the image data under control of the control section 1511.

The internal memory 1515 is a memory provided within the video processor 1332 and shared among the display engine 1513, the image processing engine 1514, and the codec engine 1516. The internal memory 1515 is used, for example, transmission and reception of data performed among the display engine 1513, the image processing engine 1514, and the codec engine 1516. For example, the internal memory 1515 stores data supplied from the display engine 1513, the image processing engine 1514, or the codec engine 1516, and supplies the data to the display engine 1513, the image processing engine 1514, or the codec engine 1516 as needed (for example, in response to a request). This internal memory 1515 may be realized by any storage device but is desirably realized by a semiconductor memory, for example, a SRAM (Static Random Access Memory) at a relatively (compared to the external memory 1312, for example) small-capacity but a high response speed since the memory is normally, often used to store small-capacity data such as image data in units of blocks and parameters.

The codec engine 1516 performs processes related to coding and decoding of image data. A coding/decoding scheme to which this codec engine 1516 can handle is an arbitrary scheme and the number of schemes may be one or two or more. For example, the codec engine 1516 may include a plurality of coding/decoding codec functions, and may code image data or decode coded data by the codec function selected from among the plurality of codec functions.

In the example illustrated in FIG. 33, the codec engine 1516 has, for example, as functional blocks of codec related processes, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551.

The MPEG-2 Video 1541 is a functional block that codes and decodes image data by an MPEG-2 scheme. The AVC/H.264 1542 is a functional block that codes and decodes image data by an AVC scheme. The HEVC/H.265 1543 is a functional block that codes and decodes image data by an HEVC scheme. The HEVC/H.265 (Scalable) 1544 is a functional block that performs scalable coding and scalable decoding on image data by an HEVC scheme. The HEVC/H.265 (Multi-view) 1545 is a functional block that performs multiview coding and multiview decoding on image data by the HEVC scheme.

The MPEG-DASH 1551 is a functional block that transmits and receives image data by an MPEG-DASH (MPEG-Dynamic Adaptive Streaming over HTTP) scheme. The MPEG-DASH is a technique for performing video streaming using an HTTP (HyperText Transfer Protocol) scheme, and one of features of the MPEG-DASH is to select appropriate coded data from among a plurality of pieces of coded data prepared in advance and different in resolution and the like in units of segments and transmitting the segments. The MPEG-DASH 1551 generates a stream conforming to standards and exercises transmission control or the like over the stream, and uses the MPEG-2 Video 1541 to the HEVC/H.265 (Multi-view) 1545 for coding/decoding of the image data.

The memory interface 1517 is an interface for the external memory 1312. Data supplied from the image processing engine 1514 or the codec engine 1516 is supplied to the external memory 1312 via the memory interface 1517. In addition, data read from the external memory 1312 is supplied to the video processor 1332 (image processing engine 1514 or codec engine 1516) via the memory interface 1517.

The multiplexing/demultiplexing section (MUX DMUX) 1518 multiplexes and demultiplexes various pieces of data regarding images such as a bit stream of coded data, image data, and video signals. This multiplexing/demultiplexing method is an arbitrary method. For example, at a time of multiplexing, the multiplexing/demultiplexing section (MUX DMUX) 1518 can not only integrate a plurality of pieces of data into one but also add predetermined header information and the like to the data. In addition, at a time of demultiplexing, the multiplexing/demultiplexing section (MUX DMUX) 1518 can not only demultiplexes one data into a plurality of pieces of data but also add predetermined header information and the like to each piece of demultiplex data. In other words, the multiplexing/demultiplexing section (MUX DMUX) 1518 can convert the format of data by multiplexing/demultiplexing. For example, the multiplexing/demultiplexing section (MUX DMUX) 1518 can convert a bit stream into a transport stream that is a bit stream in the transfer format or into data in the recording file format (file data) by multiplexing the bit stream. Needless to say, the multiplexing/demultiplexing section (MUX DMUX) 1518 can inversely convert the transport stream or the file data by demultiplexing.

The network interface 1519 is an interface for, for example, the broadband modem 1333 or the connectivity 1321. The video interface 1520 is an interface for, for example, the connectivity 1321 or the camera 1322.

An example of operations of such a video processor 1332 will next be described. For example, when a transport stream is received from the external network via the connectivity 1321, the broadband modem 1333, or the like, the transport stream is supplied to and demultiplexed by the multiplexing/demultiplexing section (MUX DMUX) 1518 via the network interface 1519 and decoded by the codec engine 1516. Image data obtained by decoding the transport stream by the codec engine 1516 is, for example, subjected to a predetermined image process by the image processing engine 1514, subjected to the predetermined conversion by the display engine 1513, and supplied to, for example, the connectivity 1321 via the display interface 1512, and resultant images are displayed on a monitor. Furthermore, image data obtained by decoding by the codec engine 1516 is, for example, re-coded by the codec engine 1516, and multiplexed by the multiplexing/demultiplexing section (MUX DMUX) 1518 to be converted into file data, and the file data is output to, for example, the connectivity 1321 via the video interface 1520 and recorded in any of the various recording media.

Furthermore, file data regarding coded data in which image data is coded and read from a recording medium, which is not depicted, by, for example, the connectivity 1321 is supplied to and demultiplexed by the multiplexing/demultiplexing section (MUX DMUX) 1518 via the video interface 1520, and decoded by the codec engine 1516. The image data obtained by decoding the file data by the codec engine 1516 is subjected to a predetermined image process by the image processing engine 1514, subjected to predetermined conversion by the display engine 1513, and supplied to, for example, the connectivity 1321 via the display interface 1512, and resultant images are displayed on the monitor. Furthermore, the image data obtained by decoding the file data by the codec engine 1516 is, for example, re-coded by the codec engine 1516 and multiplexed by the multiplexing/demultiplexing section (MUX DMUX) 1518 to be converted into a transport stream, and the transport stream is supplied to, for example, the connectivity 1321 or the broadband modem 1333 via the network interface 1519 and transmitted to another device which is not depicted.

It is noted that the image data and other data is transmitted and received among the processing sections within the video processor 1332 using, for example, the internal memory 1515 and the external memory 1312. Furthermore, the power management module 1313 controls supply of electric power to, for example, the control section 1511.

In a case of applying the present technique to the video processor 1332 configured in this way, the present technique according to each of the above embodiments may be applied to the codec engine 1516. In other words, the codec engine 1516 may have, for example, the functions of the encoding device 11 or the functions of the decoding device 12 described above or both of the functions thereof. By doing so, the video processor 1332 can obtain similar effects to those of the embodiments described with reference to FIGS. 1 to 19.

It is noted that in the codec engine 1516, the present technique (that is, the functions of the encoding device 11) may be realized by hardware such as a logical circuit, realized by software such as an incorporated program, or realized by both the hardware and the software.

While the two examples of the configuration of the video processor 1332 have been illustrated so far, the configuration of the video processor 1332 may be arbitrary and a configuration other than those in the two examples described above may be adopted. Furthermore, while this video processor 1332 may be configured as one semiconductor chip, the video processor may be configured as a plurality of semiconductor chips. For example, the video processor 1332 may be a three-dimensional stacked LSI in which a plurality of semiconductors are stacked. Moreover, the video processor 1332 may be realized by a plurality of LSI.

<Example of Application to Device>

The video set 1300 can be incorporated into various devices processing image data. The video set 1300 can be incorporated into, for example, the television device 900 (FIG. 27), the cellular telephone 920 (FIG. 28), the recording/reproducing device 940 (FIG. 29), the imaging device 960 (FIG. 30), or the like. Incorporating the video set 1300 into a device enables the device to obtain similar effects to those of the embodiments described above with reference to FIGS. 1 to 19.

Even part of the configurations of the video set 1300 described above can be carried out as a configuration to which the present technique is applied as long as the part of the configurations include the video processor 1332. For example, only the video processor 1332 can be carried out as a video processor to which the present technique is applied. Furthermore, the processors indicated by the dotted line 1341, the video module 1311, or the like, for example, can be carried out as a processor, a module, or the like to which the present technique is applied. Moreover, a combination of, for example, the video module 1311, the external memory 1312, the power management module 1313, and the front-end module 1314 can be carried out as the video unit 1361 to which the present technique is applied. Any of the configurations can obtain similar effects to those of the embodiments described above with reference to FIGS. 1 to 19.

In other words, no matter what configuration can be incorporated into various devices processing image data similarly to the case of the video set 1300 as long as the configuration includes the video processor 1332. The video processor 1332, the processors indicated by the dotted line 1341, the video module 1311, or the video unit 1361 can be incorporated into, for example, the television device 900 (FIG. 27), the cellular telephone 920 (FIG. 28), the recording/reproducing device 940 (FIG. 29), the imaging device 960 (FIG. 36), or the like. Incorporating any of the configurations to which the present technique is applied into a device enables the device to obtain similar effects to those of the embodiments described above with reference to FIGS. 1 to 19, similarly to the case of the video set 1300.

<Others>

While the examples of transmitting various pieces of information from the coding side to the decoding side by multiplexing the information into the coded data (bit stream) have been described in the present specification, a method for transmitting the information is not limited to the examples. For example, these pieces of information may be transmitted or recorded as separate data associated with the coded data without being multiplexed into the coded data. It is noted, herein, that a term "associate" means enabling images (which may be part of the images such as slices or blocks) contained in the coded data and information corresponding to the images to be linked to each other at a time of decoding. In other words, the information associated with this coded data (images) may be transmitted on a channel different from that for transmitting the coded data (images). Furthermore, the information associated with this coded data (images) may be recorded in a recording medium different from that in which the coded data (images) is recorded (or in another recording area in the same recording medium). Moreover, an image and the information corresponding to the image may be associated with each other in arbitrary units, for example, in a plurality of frames, in one frame, or in part of the frame.

Moreover, the embodiments of the present technique are not limited to the embodiments described above and various changes and modifications can be made without departing from the spirit of the present technique.

For example, a system means in the present specification a collection of a plurality of constituent elements (devices, modules (components), and the like), regardless of whether or not all the constituent elements are provided in the same casing. Therefore, a plurality of devices accommodated in different casings and connected to one another via a network and one device in which a plurality of modules are accommodated in one casing can be both referred to as "system."

Furthermore, the configuration described as one device (or processing section), for example, may be divided and configured as a plurality of devices (or processing sections). Conversely, the configurations described so far as a plurality of devices (or processing sections) may be integrated and configured as one device (or processing section). Moreover, needless to say, a configuration other than those described above may be added to the configuration of each device (or each processing section). Furthermore, if the configurations or operations are substantially identical as an entire system, part of the configuration of a certain device (or processing section) may be included in the other device (or other processing section).

Moreover, for example, the present technique can have a cloud computing configuration for causing a plurality of devices to process one function in a sharing or cooperative fashion.

Furthermore, the program described above can be executed by, for example, an arbitrary device. In that case, the device may have necessary functions (functional blocks or the like) to be able to obtain necessary information.

Moreover, each step described in the above flowcharts can be not only executed by one device but also executed by a plurality of devices in a sharing fashion. Furthermore, when one step includes a plurality of processes, the plurality of processes included in the one step can be not only executed by one device but also executed by a plurality of devices in a sharing fashion.

The program executed by a computer may be a program for performing processes of steps describing the program in time series in an order described in the present specification or may be a program for performing the processes either in parallel or at necessary timing such as timing of calling. Furthermore, the processes of the steps describing this program may be executed in parallel to processes of the other program or may be executed in combination with the processes of the other program.

A plurality of present techniques described in the present specification can be carried out independently and solely without generating inconsistency. Needless to say, a plurality of arbitrary present techniques can be combined and carried out. For example, the present technique described in any of the embodiments may be combined with the present technique described in another embodiment and a combination can be carried out. Furthermore, arbitrary present techniques described above can be combined with other techniques that are not described above and a combination of the techniques can be carried out.

It is noted that the present technique can be also configured as follows.

(1) An image processing apparatus including:

a subsampling determination section that determines, from a coded stream, whether or not a slice which configures the coded stream is to be subsampled on the basis of subsampling information which is information associated with subsampling at a time of performing special reproduction; and a decoding section that prohibits the slice from being decoded in a case in which the subsampling determination section determines that the slice is to be subsampled.

(2) The image processing apparatus according to (1), in which the subsampling information is contained in userdata of the coded stream.

(3) The image processing apparatus according to (1) or (2), in which the subsampling information is contained in userdata of SEI (Supplemental Enhancement Information) of the coded stream.

(4) The image processing apparatus according to any one of (1) to (3), in which the subsampling information is inserted into userdata at a time of generating the coded stream.

(5) The image processing apparatus according to any one of (1) to (4), further including:

a header decoding section that decodes a slice header in slice data which configures the coded stream; and a display order confirming section that confirms a display order on the basis of time information acquired from a predetermined number of slice headers decoded by the header decoding section, in which the subsampling determination section determines whether or not the slice data is to be subsampled on the basis of the display order confirmed by the display order confirming section.

(6) An image processing method including:
by an image processing apparatus,
determining, from a coded stream, whether or not a slice which configures the coded stream is to be subsampled on the basis of subsampling information which is information associated with subsampling at a time of performing special reproduction; and prohibiting the slice from being decoded in a case of determining that the slice is to be subsampled.

(7) An image processing apparatus including:
a subsampling information generation section that generates subsampling information which is information associated with subsampling at a time of performing special reproduction;
a coding section that codes image data and generates a coded stream; and
a subsampling information insertion section that inserts the subsampling information generated by the subsampling information generation section into the coded stream generated by the coding section.

(8) The image processing apparatus according to (7), in which
the information insertion section inserts the subsampling information generated by the subsampling information generation section into userdata of the coded stream.

(9) The image processing apparatus according to (7) or (8), in which
the information insertion section inserts the subsampling information generated by the subsampling information generation section into userdata of SEI (Supplemental Enhancement Information) of the coded stream.

(10) The image processing apparatus according to any one of (7) to (9), in which
the subsampling information generation section generates the subsampling information on the basis of a GOP (Group Of Picture) structure.

(11) An image processing method including:
by an image processing apparatus,
generating subsampling information which is information associated with subsampling at a time of performing special reproduction;
coding image data and generating a coded stream; and
inserting the generated subsampling information into the generated coded stream.

(12) An image processing apparatus including:
a header decoding section that decodes a slice header in slice data which configures a coded stream;
a display order confirming section that confirms a display order on the basis of time information acquired from a predetermined number of slice headers decoded by the header decoding section;
a subsampling determination section that determines whether or not the slice data is to be subsampled at a time of performing special reproduction on the basis of the display order confirmed by the display order confirming section; and
a decoding section that prohibits the slice data from being decoded in a case in which the subsampling determination section determines that the slice data is to be subsampled.

(13) The image processing apparatus according to (12), in which
the time information is POC (Picture Order Count) information.

(14) An image processing method including:
by an image processing apparatus,
decoding a slice header in slice data which configures a coded stream;
confirming a display order on the basis of time information acquired from a predetermined number of decoded slice headers;
determining whether or not the slice data is to be subsampled at a time of performing special reproduction on the basis of the confirmed display order; and
prohibiting the slice data from being decoded in a case of determining that the slice data is to be subsampled.

REFERENCE SIGNS LIST

1 Image processing system, 11 Encoding device, 12 Decoding device, 21 Capture section, 22 Reorder section, 23 Subsampling information generation section, 24 Syntax coding section, 25 Slice coding section, 26 Userdata insertion section, 27 Transmission section, 151 GOP structure decision section, 201 Receiving section, 202 Sequence decoding section, 203 Picture decoding section, 204 Subsampling information determination section, 205 Slice decoding section, 251 Syntax decoding section, 252 Slice header decoding section, 253 Display order confirming section, 254 Subsampling information determination section

The invention claimed is:
1. An image processing apparatus, comprising:
a subsampling determination section configured to determine that a slice from a coded stream of image data is to be subsampled for a special reproduction of the image data, wherein the slice is determined to be subsampled based on subsampling information associated with the coded stream; and
a decoding section configured to prohibit a decode of the slice based on the determination that the slice is to be subsampled.

2. The image processing apparatus according to claim 1, wherein the subsampling information is in userdata of the coded stream.

3. The image processing apparatus according to claim 2, wherein the subsampling information is in the userdata of Supplemental Enhancement Information (SEI) of the coded stream.

4. The image processing apparatus according to claim 1, wherein the subsampling information is inserted into userdata at a time of generation of the coded stream.

5. The image processing apparatus according to claim 1, further comprising:
a header decoding section configured to decode a slice header in slice data of the coded stream; and
a display order confirming section configured to confirm a display order based on time information acquired from a determined number of slice headers decoded by the header decoding section, wherein
the subsampling determination section is further configured to determine whether the slice data is to be subsampled based on the confirmed display order.

6. An image processing method, comprising:
in an image processing apparatus:
determining that a slice from a coded stream of image data is to be subsampled for a special reproduction of the image data, wherein the slice is determined to be subsampled based on subsampling information associated with the coded stream; and
prohibiting a decode of the slice based on the determination that the slice is to be subsampled.

7. An image processing apparatus, comprising:
a subsampling information generation section configured to generate subsampling information associated with a subsampling process for a special reproduction of image data;
a coding section configured to:
code the image data to generate a coded stream; and
a subsampling information insertion section configured to insert the generated subsampling information into the generated coded stream, wherein
a slice of the coded stream is determined to be subsampled for the special reproduction based on the subsampling information, and
a decode of the slice determined to be subsampled is prohibited.

8. The image processing apparatus according to claim 7, wherein the subsampling information is inserted into user-data of the coded stream.

9. The image processing apparatus according to claim 8, wherein the subsampling information is inserted into the userdata of Supplemental Enhancement Information (SEI) of the coded stream.

10. The image processing apparatus according to claim 7, wherein the subsampling information is generated based on Group Of Picture (GOP) structure.

11. An image processing method, comprising:
in an image processing apparatus;
generating subsampling information associated with a subsampling process for a special reproduction of image data;
coding the image data to generate a coded stream; and
inserting the generated subsampling information into the generated coded stream, wherein
a slice of the coded stream is determined to be subsampled for the special reproduction based on the subsampling information, and
a decode of the slice determined to be subsampled is prohibited.

12. An image processing apparatus, comprising:
a header decoding section configured to decode a slice header in slice data of a coded stream of image data;
a display order confirming section configured to confirm a display order based on time information acquired from a determined number of slice headers decoded by the header decoding section;
a subsampling determination section configured to determine that the slice data is to subsampled for a special reproduction of the image data, wherein the slice data is determined to be subsampled based on the confirmed display order; and
a decoding section configured to prohibit decode of the slice data based on the determination that the slice data is to be subsampled.

13. The image processing apparatus according to claim 12, wherein the time information is Picture Order Count (POC) information.

14. An image processing method, comprising:
in an image processing apparatus:
decoding a slice header in slice data of a coded stream of image data;
confirming a display order based on time information acquired from a determined number of decoded slice headers;
determining that the slice data is to subsampled for a special reproduction, wherein the slice data is determined to be subsampled based on the confirmed display order; and
prohibiting decode of the slice data based on the determination that the slice data is to be subsampled.

* * * * *